US010315259B2

(12) United States Patent
Dieter et al.

(10) Patent No.: US 10,315,259 B2
(45) Date of Patent: Jun. 11, 2019

(54) METHOD OF MANUFACTURING COLLATED T-NUTS

(75) Inventors: Jonathan Wayne Dieter, Painesville, OH (US); Stephen R. Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 797 days.

(21) Appl. No.: 13/313,570

(22) Filed: Dec. 7, 2011

(65) Prior Publication Data
US 2012/0184384 A1 Jul. 19, 2012

Related U.S. Application Data

(60) Provisional application No. 61/433,300, filed on Jan. 17, 2011.

(51) Int. Cl.
*B21K 1/66* (2006.01)
*B23D 33/02* (2006.01)
(Continued)

(52) U.S. Cl.
CPC .............. *B23D 33/025* (2013.01); *B21K 1/64* (2013.01); *B23D 33/02* (2013.01); *B23P 19/001* (2013.01);
(Continued)

(58) Field of Classification Search
CPC ... B21K 1/46; B21K 1/64; B21K 1/66; B21K 1/56; B21K 1/50; B21K 1/70; B21D 53/24
(Continued)

(56) References Cited

U.S. PATENT DOCUMENTS

| 180,064 A | 7/1876 | Rebasz |
| 244,379 A | 8/1881 | Coulter et al. |

(Continued)

FOREIGN PATENT DOCUMENTS

| DK | PA200401983 | 12/2004 |
| EP | 0894578 | 2/1999 |

(Continued)

OTHER PUBLICATIONS

The International Bureau of WIPO, PCT International Preliminary Report on Patentability, International Application No. PCT/US2012/021195, International Filing Date: Jan. 13, 2012, Priority Date: Jan. 17, 2011, dated Jul. 17, 2013, Applicant: Stafast Productions, Inc., pp. 1-8, Geneva, Switzerland.

(Continued)

*Primary Examiner* — Debra M Sullivan
(74) *Attorney, Agent, or Firm* — Woodling, Krost and Rust

(57) ABSTRACT

A continuous strip of T-Nuts formed on a common strip of metal. Each T-Nut of the strip of T-Nuts is integrally connected to the next adjacent T-Nut by carry tabs. The carry tabs can be frangible themselves or contain a frangible portion. Each T-Nut includes a cylindrical bore therein and a threaded interior. A mechanism feeds and severs the endmost T-Nut in endwise fashion. The mechanism to feed and sever the endmost T-Nut includes a cutting blade positioned vertically below the frangible portion of the carry tab. A shearing ram having a guide positioned axially in line with the cylindrical bore in the endmost T-Nut is adapted to move vertically from an upper to a lower position to engage the cutting blade with the frangible portion and sever the endmost T-Nut.

15 Claims, 36 Drawing Sheets

(51) Int. Cl.
*B21K 1/64* (2006.01)
*B23P 19/00* (2006.01)
*B23P 19/06* (2006.01)
*F16B 27/00* (2006.01)
*F16B 37/02* (2006.01)
*F16B 37/04* (2006.01)

(52) U.S. Cl.
CPC ............. *B23P 19/062* (2013.01); *F16B 27/00* (2013.01); *F16B 37/02* (2013.01); *F16B 37/04* (2013.01); *Y10T 29/49799* (2015.01); *Y10T 29/5198* (2015.01); *Y10T 83/647* (2015.04)

(58) Field of Classification Search
USPC ........... 470/18, 20, 21, 25–27, 34; 72/355.2, 72/355.6
See application file for complete search history.

(56) References Cited

U.S. PATENT DOCUMENTS

| | | |
|---|---|---|
| 397,988 A | 2/1889 | Kimball |
| 797,545 A | 8/1905 | Reed |
| 812,294 A | 2/1906 | Ette |
| 1,112,525 A | 10/1914 | Darling |
| 1,773,146 A | 8/1930 | Kellogg |
| 1,881,836 A | 10/1932 | Mitchell |
| 1,893,067 A | 1/1933 | Arenz |
| 1,919,728 A | 7/1933 | Kellogg |
| 1,990,718 A | 2/1935 | Swanstrom |
| 2,026,757 A | 1/1936 | Swanstrom |
| 2,049,104 A | 7/1936 | Charlton |
| 2,321,497 A | 8/1939 | Luce |
| 2,208,779 A | 7/1940 | Tinnerman |
| 2,267,379 A | 12/1941 | Tinnerman |
| 2,314,756 A | 3/1943 | Bedford, Jr. |
| 2,343,947 A | 3/1944 | Auslander |
| 2,381,936 A | 8/1945 | Sargent |
| 2,383,141 A | 8/1945 | Maage |
| 2,387,983 A | 10/1945 | Dickenson |
| 2,477,430 A | 7/1949 | Swanstrom |
| 2,685,721 A | 8/1954 | Eves |
| 2,783,674 A | 3/1957 | Becker |
| 2,936,668 A | 5/1960 | Meyer |
| 2,968,206 A | 1/1961 | Bunnosuke |
| 3,004,784 A | 10/1961 | Selby |
| 3,037,596 A | 6/1962 | Fordyce |
| 3,050,097 A | 8/1962 | Cochran |
| 3,146,656 A | 9/1964 | Richards |
| 3,165,968 A | 1/1965 | Anstett |
| 3,234,612 A | 2/1966 | Raymond |
| 3,235,917 A | 2/1966 | Skubic |
| 3,270,610 A | 9/1966 | Knowlton |
| 3,289,724 A | 12/1966 | Ernest |
| 3,319,509 A | 5/1967 | Constantino |
| 3,353,580 A | 11/1967 | Benjamin |
| 3,358,727 A | 12/1967 | Hughes |
| 3,403,218 A | 9/1968 | Norden |
| 3,461,936 A | 8/1969 | Rosan, Sr. |
| 3,505,636 A | 4/1970 | McDowell |
| 3,646,982 A | 3/1972 | Cushman |
| 3,704,507 A | 12/1972 | Grube |
| 3,758,703 A | 9/1973 | Golden et al. |
| 3,779,373 A | 12/1973 | Maier |
| 3,809,139 A | 5/1974 | Strain |
| 3,845,860 A | 11/1974 | Ladoucer et al. |
| 3,877,133 A | 4/1975 | Grube |
| 3,878,599 A | 4/1975 | Ladoucer et al. |
| 3,920,059 A | 11/1975 | Grube |
| 3,926,236 A | 12/1975 | Pouch et al. |
| 3,938,657 A | 2/1976 | David |
| 3,962,828 A | 6/1976 | McAllister |
| 3,967,412 A | 7/1976 | Governale |
| 3,985,172 A | 10/1976 | Ballantyne |
| 4,018,257 A | 4/1977 | Jack |
| 4,074,464 A | 2/1978 | McCay |
| 4,172,523 A | 10/1979 | Weglage |
| 4,279,341 A | 7/1981 | Pleickhardt |
| 4,306,654 A | 12/1981 | Grube |
| 4,341,303 A | 7/1982 | Britt |
| 4,352,258 A | 10/1982 | Bursk |
| 4,376,334 A | 3/1983 | Miller |
| 4,377,360 A | 3/1983 | Kennedy |
| 4,379,537 A | 4/1983 | Perrault et al. |
| 4,387,535 A | 6/1983 | Corbo |
| 4,442,584 A | 4/1984 | Smallegan |
| 4,447,987 A | 5/1984 | Lesosky |
| 4,476,653 A | 10/1984 | Speer |
| 4,508,478 A | 4/1985 | Leistner |
| 4,574,473 A | 3/1986 | Sawdon |
| 4,580,322 A | 4/1986 | Wright |
| 4,595,325 A | 6/1986 | Moran |
| 4,599,126 A | 7/1986 | Duffield |
| 4,752,993 A | 6/1988 | Oaks |
| 4,768,907 A | 9/1988 | Gauron |
| 4,770,275 A | 9/1988 | Williams |
| 4,790,701 A | 12/1988 | Baubles |
| 4,805,824 A | 2/1989 | Erickson |
| 4,860,513 A | 8/1989 | Whitman |
| 4,903,831 A | 2/1990 | Francis |
| 4,913,609 A | 4/1990 | Mauer |
| 4,945,680 A | 8/1990 | Giguere |
| 4,961,553 A | 10/1990 | Todd |
| 4,971,499 A | 11/1990 | Ladoucer |
| 4,991,365 A | 2/1991 | Jackson |
| 5,010,690 A | 4/1991 | Geoffrey |
| 5,078,537 A | 1/1992 | Nomura |
| 5,096,350 A | 3/1992 | Peterson |
| 5,108,238 A | 4/1992 | Ewing |
| 5,114,014 A | 5/1992 | Ascalon et al. |
| 5,136,814 A | 8/1992 | Headrick |
| 5,138,814 A | 8/1992 | Giles et al. |
| 5,152,582 A | 10/1992 | Magnuson |
| 5,179,804 A | 1/1993 | Young |
| 5,195,854 A | 3/1993 | Nagayama |
| 5,199,836 A | 4/1993 | Gogarty |
| 5,214,843 A | 6/1993 | Bromley et al. |
| 5,230,181 A | 7/1993 | Geoffrey |
| 5,238,344 A | 8/1993 | Nagayama |
| 5,244,326 A | 9/1993 | Henriksen |
| 5,273,351 A | 12/1993 | Rubel |
| 5,297,851 A | 3/1994 | Van Hekken |
| 5,299,686 A | 4/1994 | Bromley et al. |
| 5,314,427 A | 5/1994 | Goble et al. |
| 5,323,531 A | 6/1994 | Leistner et al. |
| 5,327,645 A | 7/1994 | Bromley et al. |
| 5,348,432 A | 9/1994 | Nagayama |
| 5,388,940 A | 2/1995 | Herren |
| 5,391,031 A | 2/1995 | Medal |
| D356,479 S | 3/1995 | Chen |
| 5,423,645 A | 6/1995 | Muller et al. |
| 5,426,894 A | 6/1995 | Headrick |
| 5,429,466 A | 7/1995 | Nagayama |
| 5,445,483 A | 8/1995 | Fultz |
| 5,489,173 A | 2/1996 | Hofle |
| 5,501,558 A | 3/1996 | Figge |
| 5,503,596 A | 4/1996 | Nagayama |
| 5,517,788 A | 5/1996 | McGough |
| 5,522,687 A | 6/1996 | Chen |
| 5,524,391 A | 6/1996 | Joffe |
| 5,560,099 A | 10/1996 | Leistner et al. |
| 5,564,873 A | 10/1996 | Ladouceur et al. |
| 5,588,266 A | 12/1996 | Headrick |
| 5,611,173 A | 3/1997 | Headrick |
| 5,618,144 A | 4/1997 | Leistner |
| 5,624,217 A | 4/1997 | Hungerford |
| 5,638,641 A | 6/1997 | Joffe |
| 5,722,131 A | 3/1998 | Leistner |
| 5,762,190 A | 6/1998 | Leistner |
| 5,803,691 A | 9/1998 | Huang |
| 5,863,164 A | 1/1999 | Leistner |
| 5,879,119 A | 3/1999 | Robinson |
| 5,893,538 A | 4/1999 | Onishi et al. |
| 5,904,461 A | 5/1999 | McKarge |

(56) References Cited

U.S. PATENT DOCUMENTS

| | | |
|---|---|---|
| 5,908,664 A | 6/1999 | Nagayama |
| 5,918,738 A | 7/1999 | Leistner |
| 5,993,320 A | 11/1999 | Selle |
| 6,036,013 A | 3/2000 | Chen |
| 6,041,992 A | 3/2000 | Poinelli et al. |
| 6,055,716 A | 5/2000 | Ayres et al. |
| 6,071,052 A | 6/2000 | Kerr |
| 6,089,437 A | 7/2000 | Blacket et al. |
| 6,095,738 A | 8/2000 | Selle |
| 6,109,849 A | 8/2000 | Nagayama |
| 6,129,431 A | 10/2000 | Hansen, Jr. et al. |
| 6,129,493 A | 10/2000 | Leistner |
| 6,131,347 A | 10/2000 | Hornberger et al. |
| 6,174,117 B1 | 1/2001 | Kawatani et al. |
| 6,183,181 B1 | 2/2001 | Leistner |
| 6,185,870 B1 | 2/2001 | Mettler |
| 6,203,231 B1 | 3/2001 | Salice |
| 6,209,722 B1 | 4/2001 | Leistner |
| 6,272,814 B1 | 8/2001 | Ikuta et al. |
| 6,305,888 B1 | 10/2001 | Leistner |
| 6,345,477 B1 | 2/2002 | Headrick |
| 6,349,907 B1 | 2/2002 | Hollington et al. |
| 6,381,821 B1 | 5/2002 | Panyon, Jr. |
| 6,407,351 B1 | 6/2002 | Meyer |
| 6,637,994 B2 | 10/2003 | Leistner |
| 6,640,968 B2 | 11/2003 | Selle |
| 6,701,570 B2 | 3/2004 | Henriott et al. |
| 6,832,696 B2 | 12/2004 | Donner |
| 6,854,943 B2 | 2/2005 | Nagayama |
| 7,021,221 B2 | 4/2006 | Del Frari |
| 7,287,732 B2 | 10/2007 | Balistreri |
| 7,427,180 B2 | 9/2008 | Ladoucer et al. |
| 7,484,700 B2 | 2/2009 | Selle |
| 7,524,129 B2 | 4/2009 | Selle |
| 7,540,699 B2 | 6/2009 | Selle |
| 7,674,081 B2 | 3/2010 | Selle |
| 8,409,021 B2 * | 4/2013 | Saito et al. .................. 470/25 |
| 2003/0116458 A1 | 6/2003 | Donner |
| 2003/0127346 A1 | 7/2003 | Chen et al. |
| 2003/0213339 A1 | 11/2003 | Bellanca |
| 2004/0234356 A1 | 11/2004 | Parker et al. |
| 2005/0031435 A1 | 2/2005 | Curley, Jr. et al. |
| 2005/0232724 A1 | 10/2005 | Selle |
| 2007/0020062 A1 | 1/2007 | Leistner |
| 2008/0069660 A1 | 3/2008 | Selle |
| 2008/0193254 A1 | 8/2008 | Selle |
| 2009/0022565 A1 | 1/2009 | Foxby |
| 2011/0111868 A1 | 5/2011 | Saito et al. |
| 2012/0181197 A1 | 7/2012 | Dieter et al. |
| 2012/0180286 A1 | 9/2012 | Dieter et al. |

FOREIGN PATENT DOCUMENTS

| | | |
|---|---|---|
| GB | 2290774 | 10/1996 |
| WO | 2006066589 A2 | 6/2006 |

OTHER PUBLICATIONS

Dieter, Jonathan Wayne, and Selle, Stephen R., Apparatus and Method for Severing and Inserting Collated T-Nuts, Utility U.S. Appl. No. 13/313,657, filed Dec. 7, 2011, Earliest Publication No. US2012-0180286A1, Earliest Publication Date July 19, 2012, USA.

Dieter, Jonathan Wayne, and Selle, Stephen R., Collated T-Nut Apparatus, Utility U.S. Appl. No. 13/313,414, filed Dec. 7, 2011, Earliest Publication No. US2012-0181197A1, Earliest Publication Date July 19, 2012, USA.

United States Patent Application Entitled: Collated T-Nut Apparatus, U.S. Appl. No. 13/313,414, Applicants Dieter and Selle, Filing Date: Dec. 7, 2011.

United States Patent Application Entitled: Method of Manufacturing Collated T-Nuts, U.S. Appl. No. 13/313,570, Applicants Dieter and Selle, Filing Date: Dec. 7, 2011.

United States Patent Application Entitled: Apparatus and Method for Severing and Inserting Collated T-Nuts, U.S. Appl. No. 13/313,657, Applicants Dieter and Selle, Filing Date: Dec. 7, 2011.

United States Patent Application Entitled: Fastener, U.S. Appl. No. 11/673,525, Applicant Selle, Date: Feb. 9, 2007.

United States Patent Application Entitled: Fastener, U.S. Appl. No. 12/621,441, Applicant Selle, Filing Date: Nov. 18, 2009.

European Patent Office, Extended European Search Report, dated Apr. 25, 2014, pp. 1-7, Applicant: Stafast Products Inc., Application No. 12736940.3, PCT Application No. PCT/US2012021195.

European Patent Office, Communication, dated May 13, 2014, p. 1, Applicant: Stafast Products Inc., Application No. 12736940.3, PCT Application No. PCT/US2012021195.

International Search Report of the International Searching Authority (ISA) dated May 1, 2012, United States Patent and Trademark Office, PCT/US2012/021195, International Filing Date Jan. 13, 2012, Applicant: Stafast Products, Inc., p. 1-3.

Written Opinon of the Internation Searching Authority (ISA) dated May 1, 2012, United States Patent and Trademark Office, PCT/US2012/021195, International Filing Date Jan. 13, 2012, Applicant: Stafast Products, Inc., p. 1-20.

Foxby, John Erik, A Method of Driving a T-Nut Into a Pre-Drilled Hole in a Work Piece, An Apparatus for Carrying out the Method, A T-Nut Strip and a T-Nut, U.S. Appl. No. 11/722,168, International Application No. PCT/DK05/00809, filed Feb. 6, 2008 in the USPTO.

International Searching Authority, Patent Cooperation Treaty, Notification of Transmittal of the International Search Report and the Written Opinion of the International Searching Authority, or Declaration, International Application No. PCT/US2012/021195, International Filing Date: Jan. 13, 2012, dated May 1, 2012, pp. 1-23.

* cited by examiner

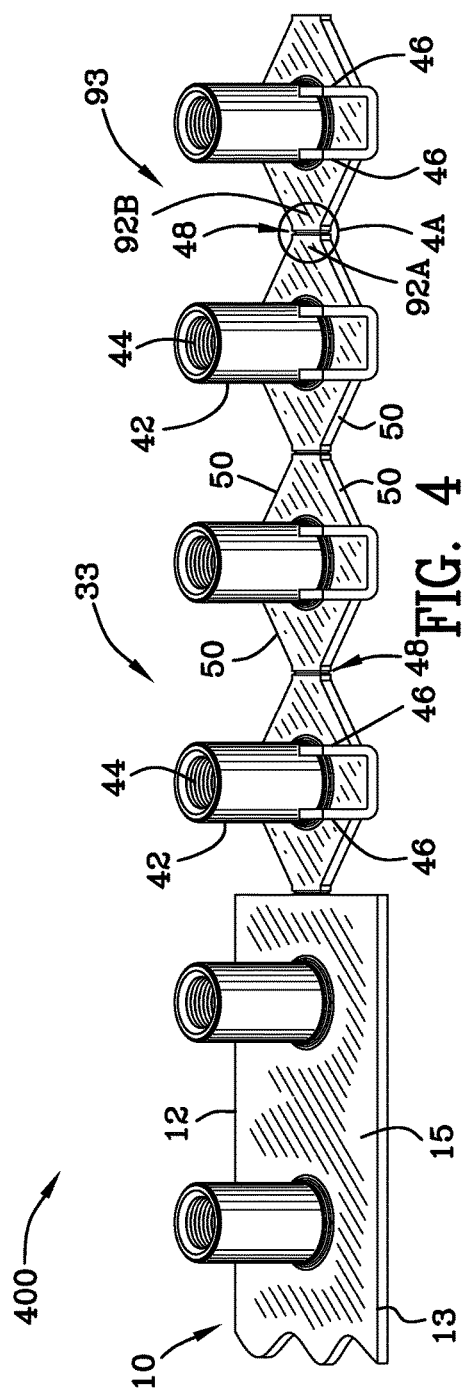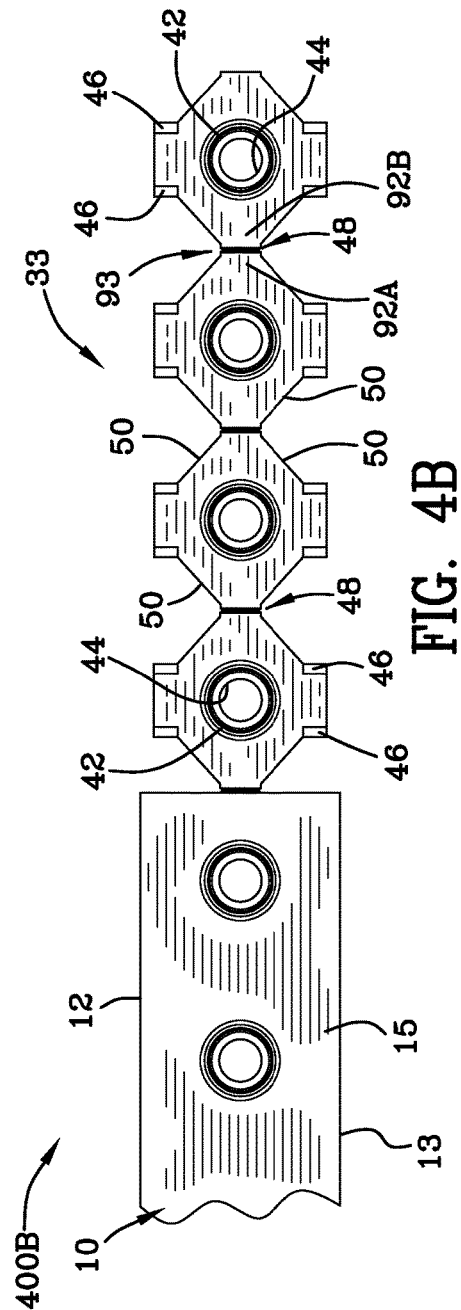

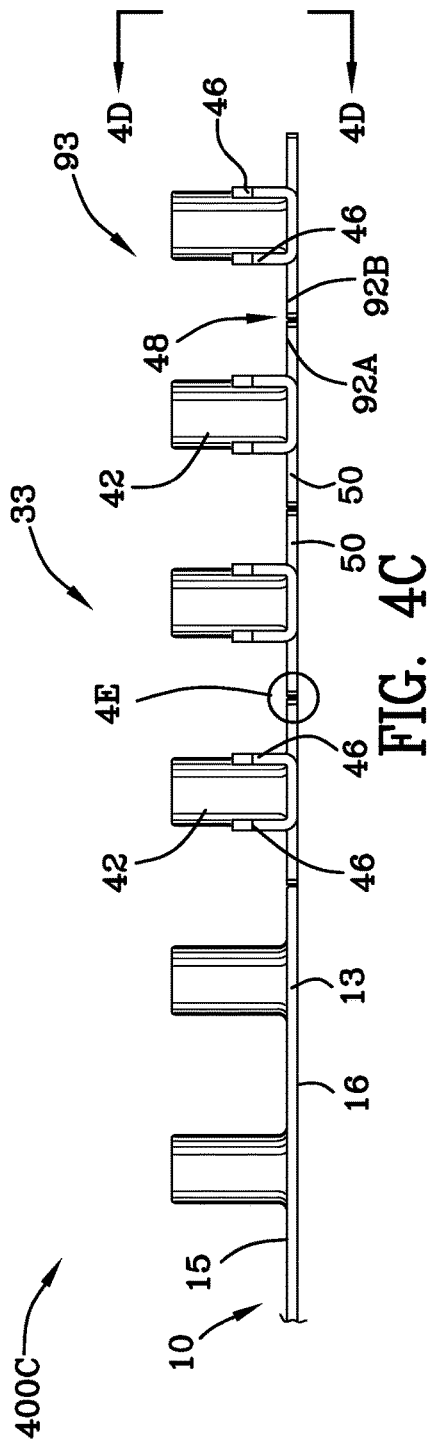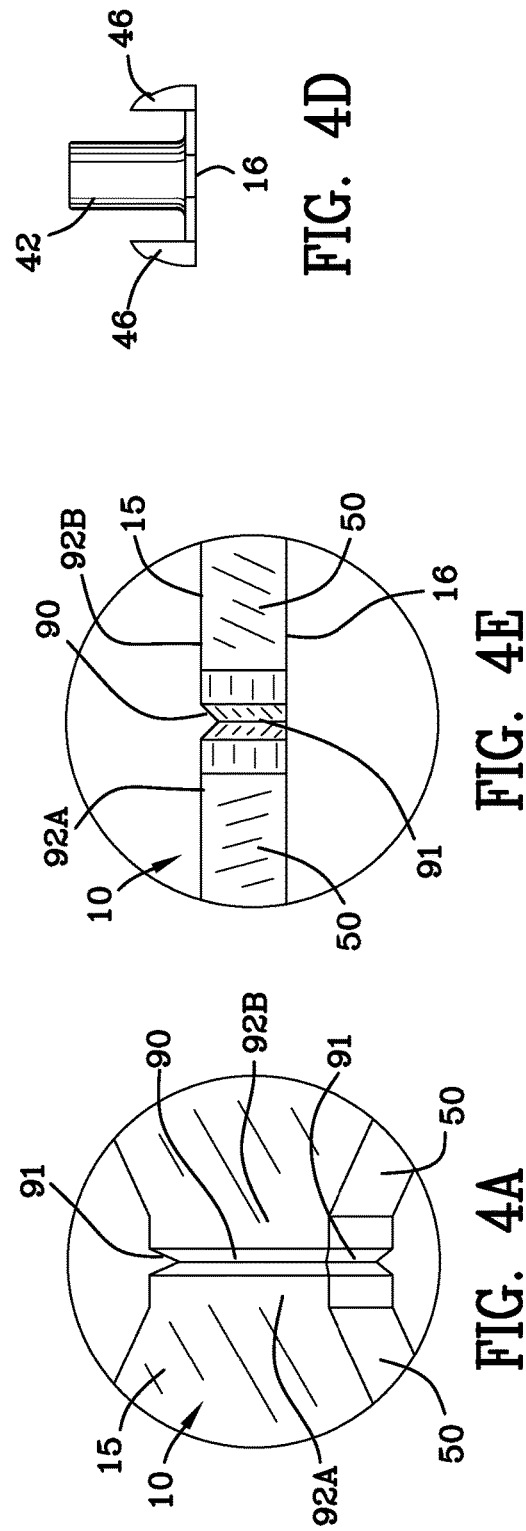

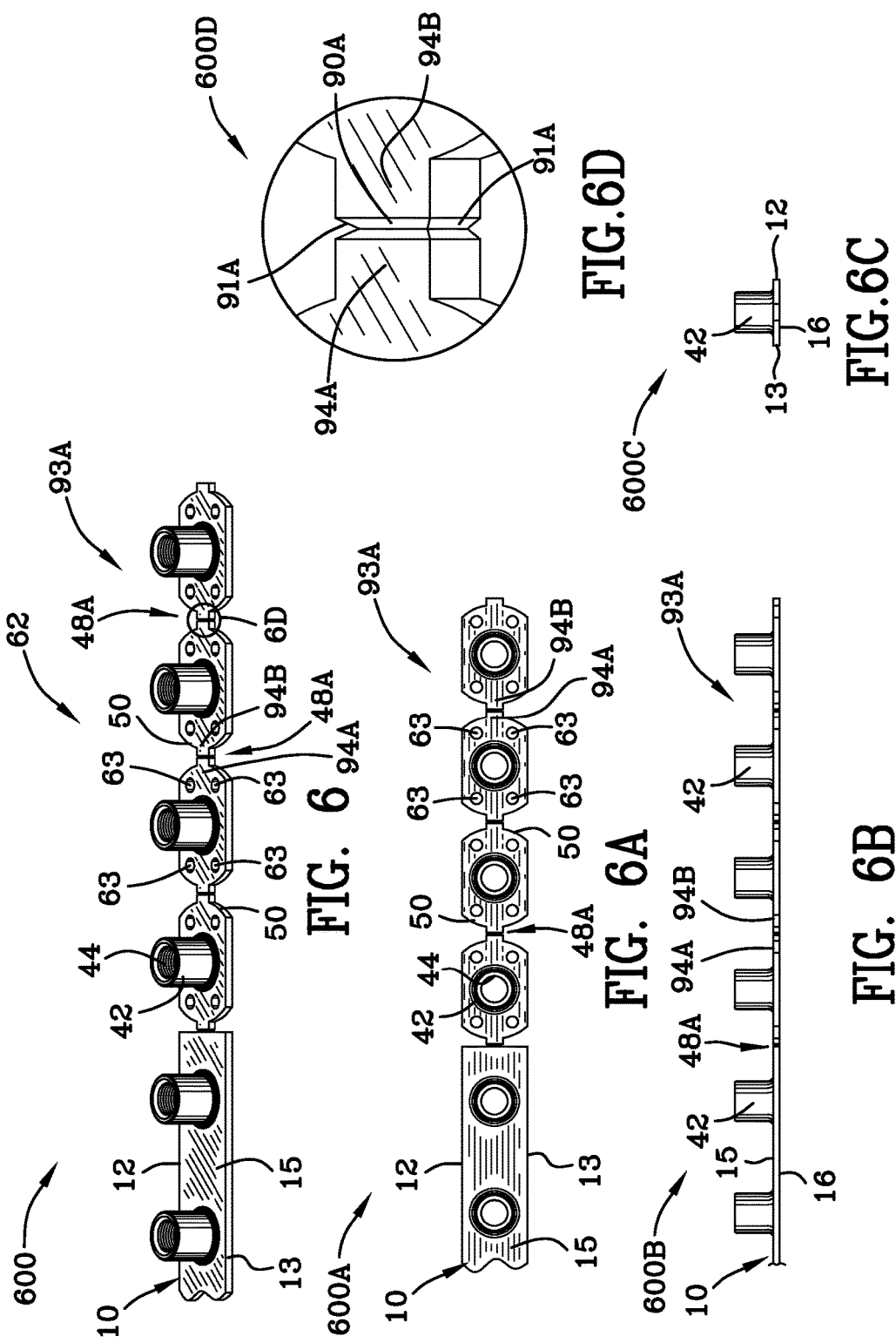

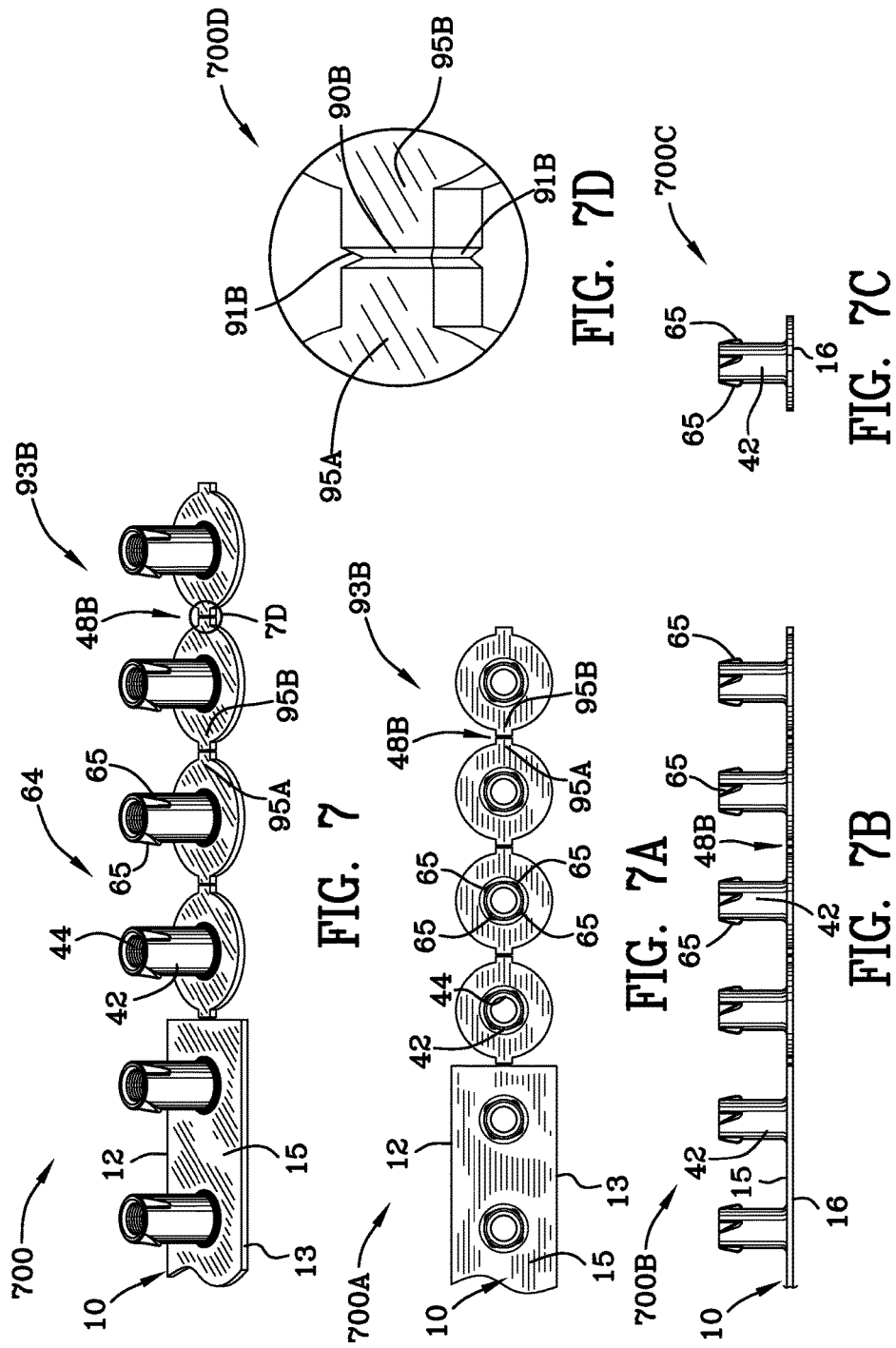

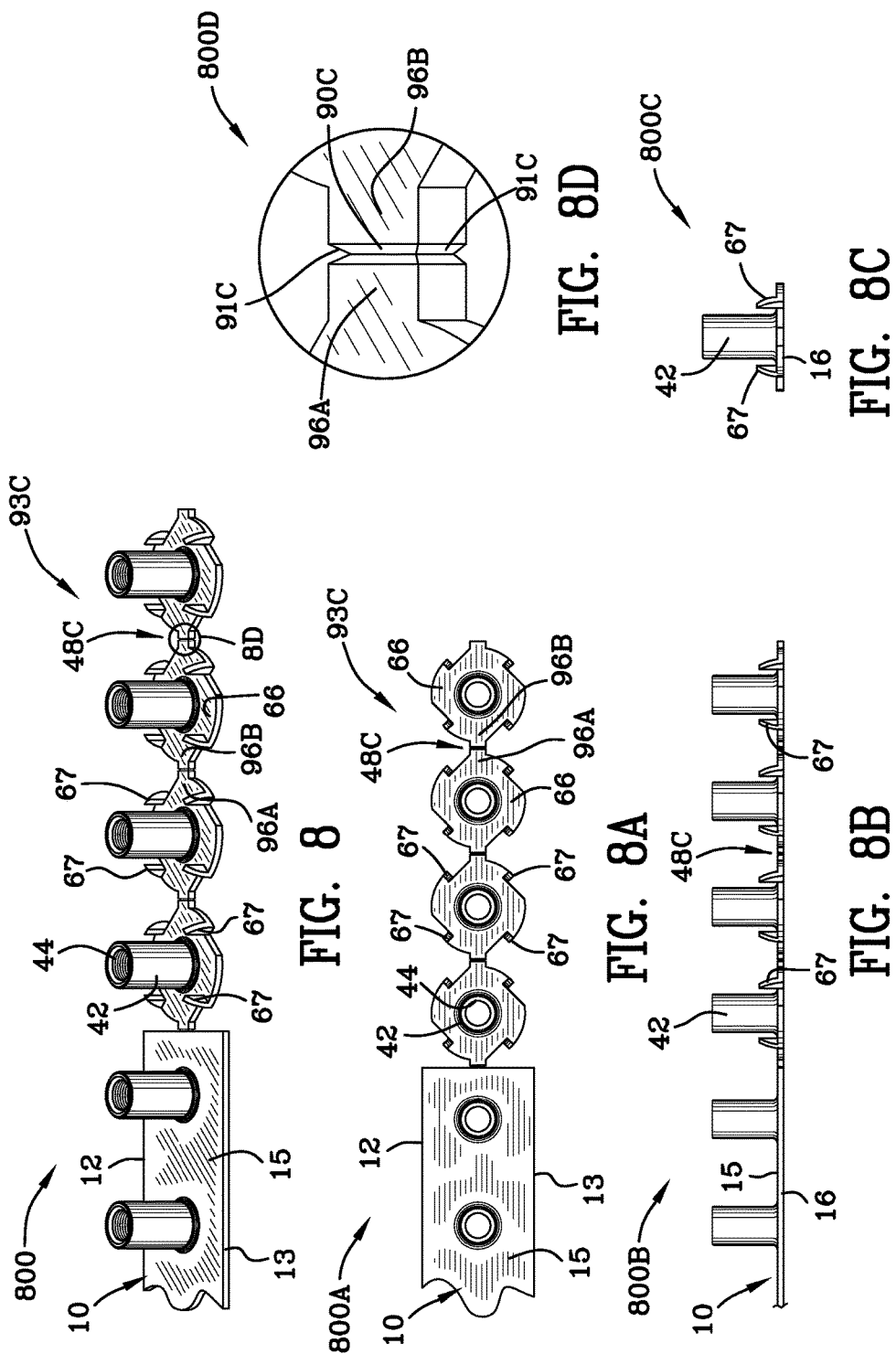

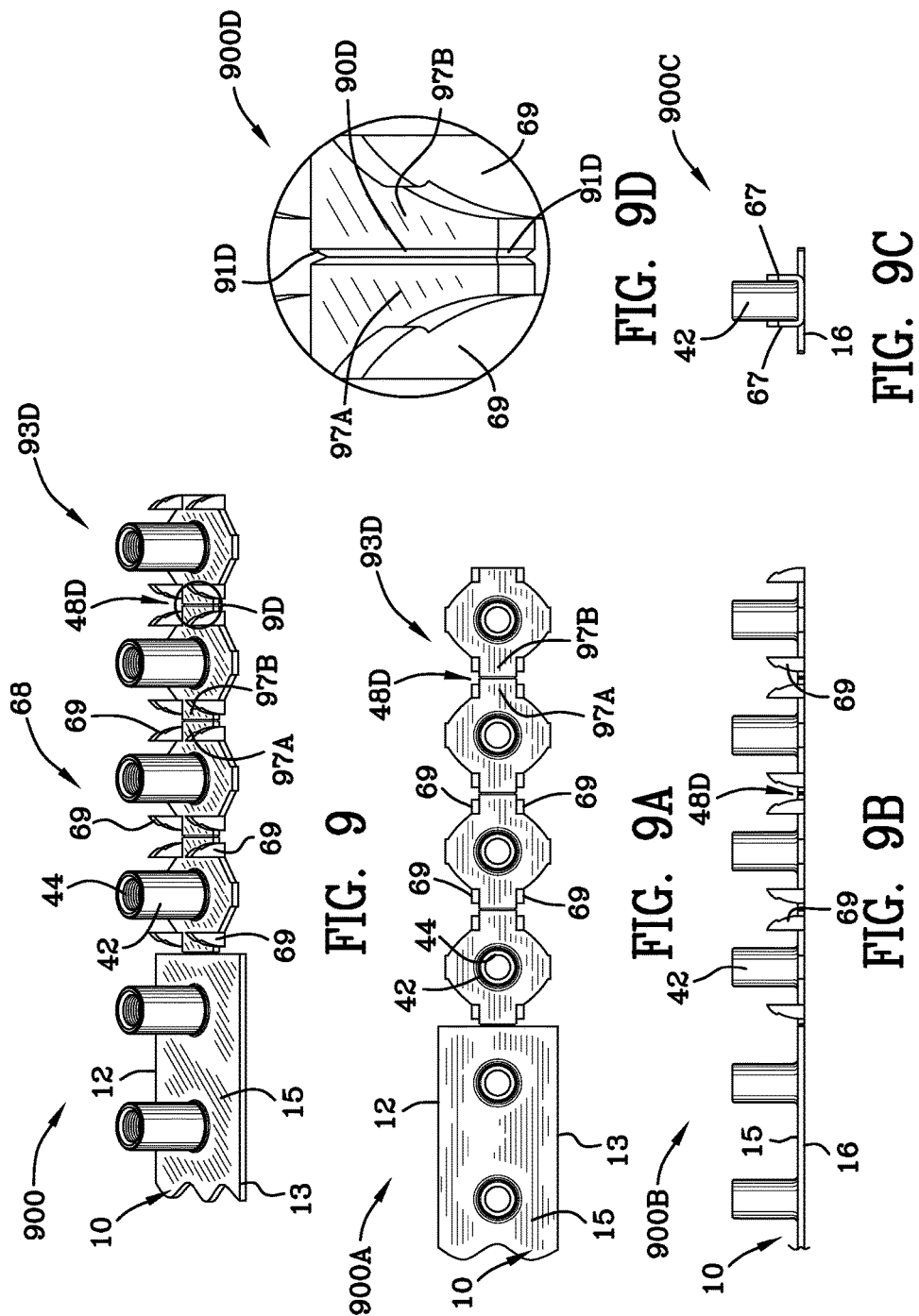

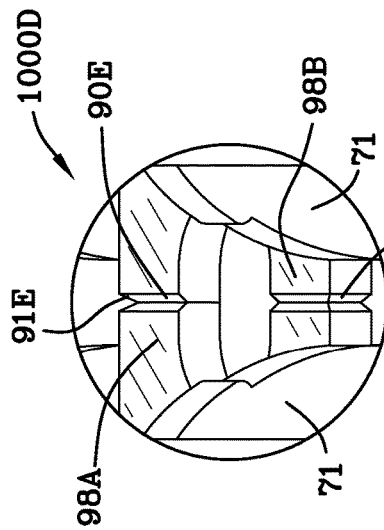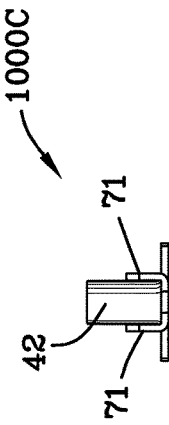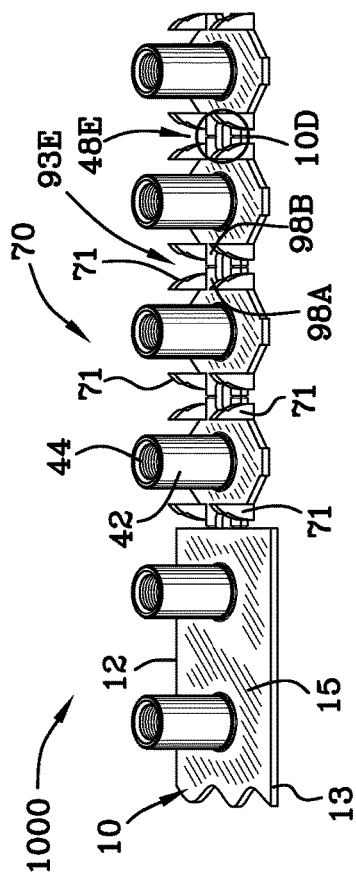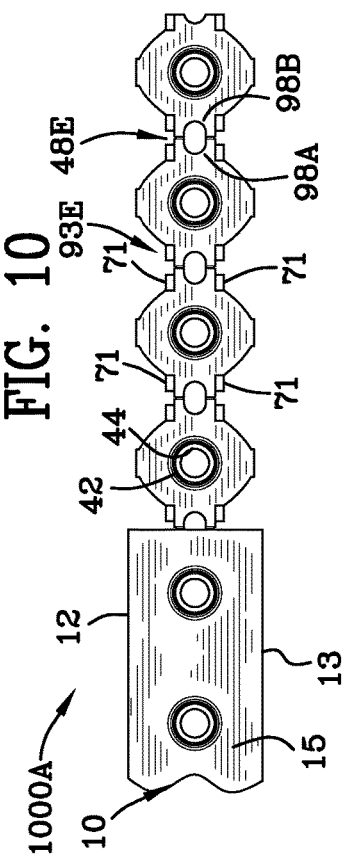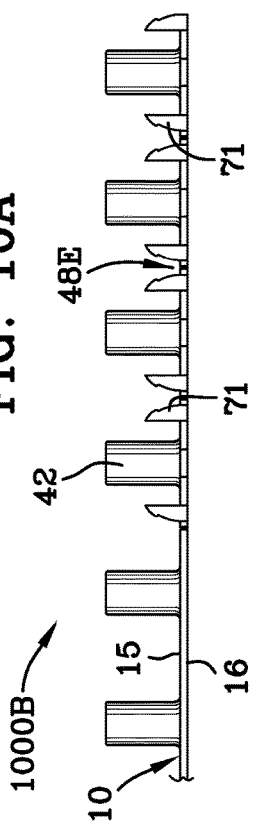

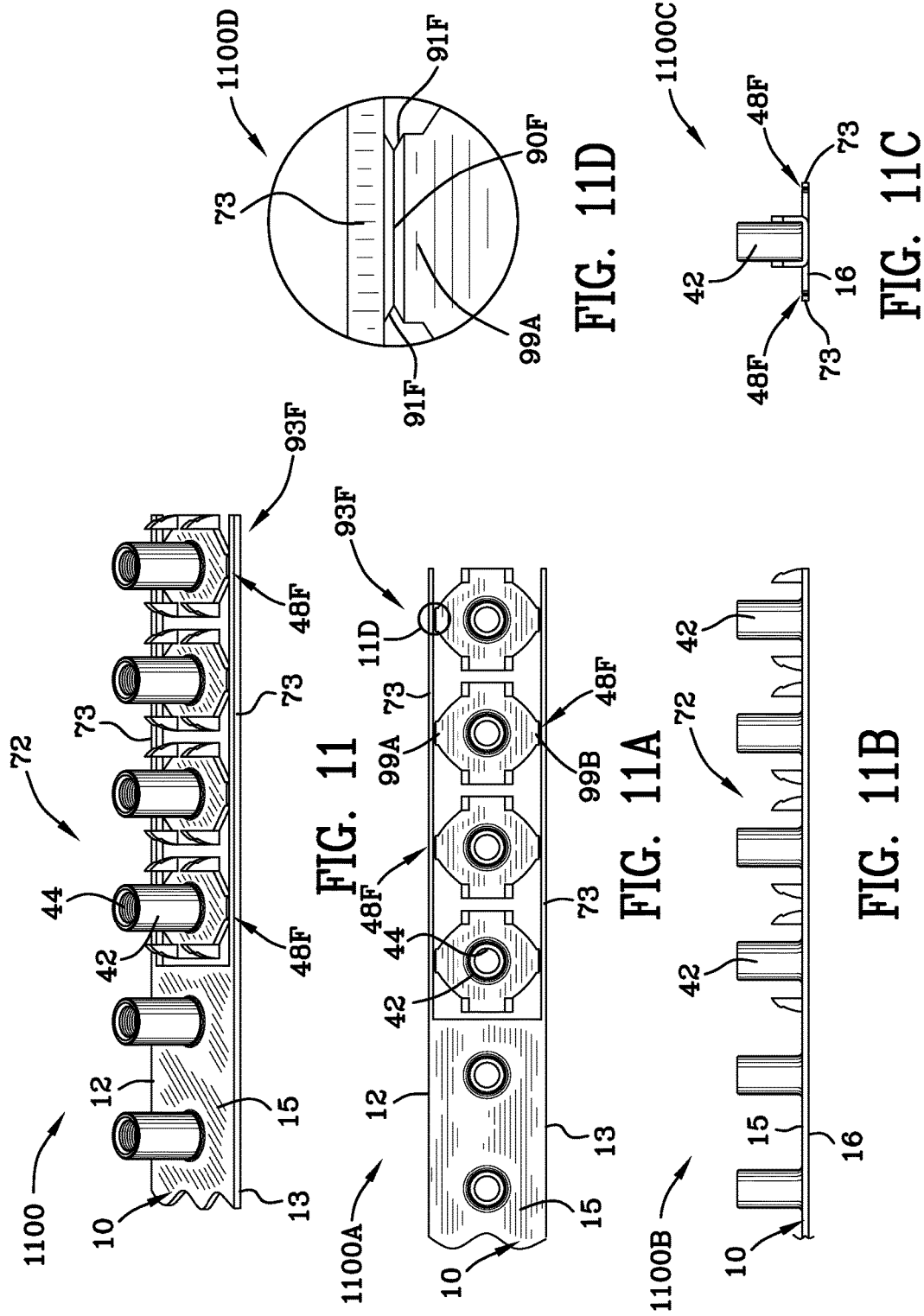

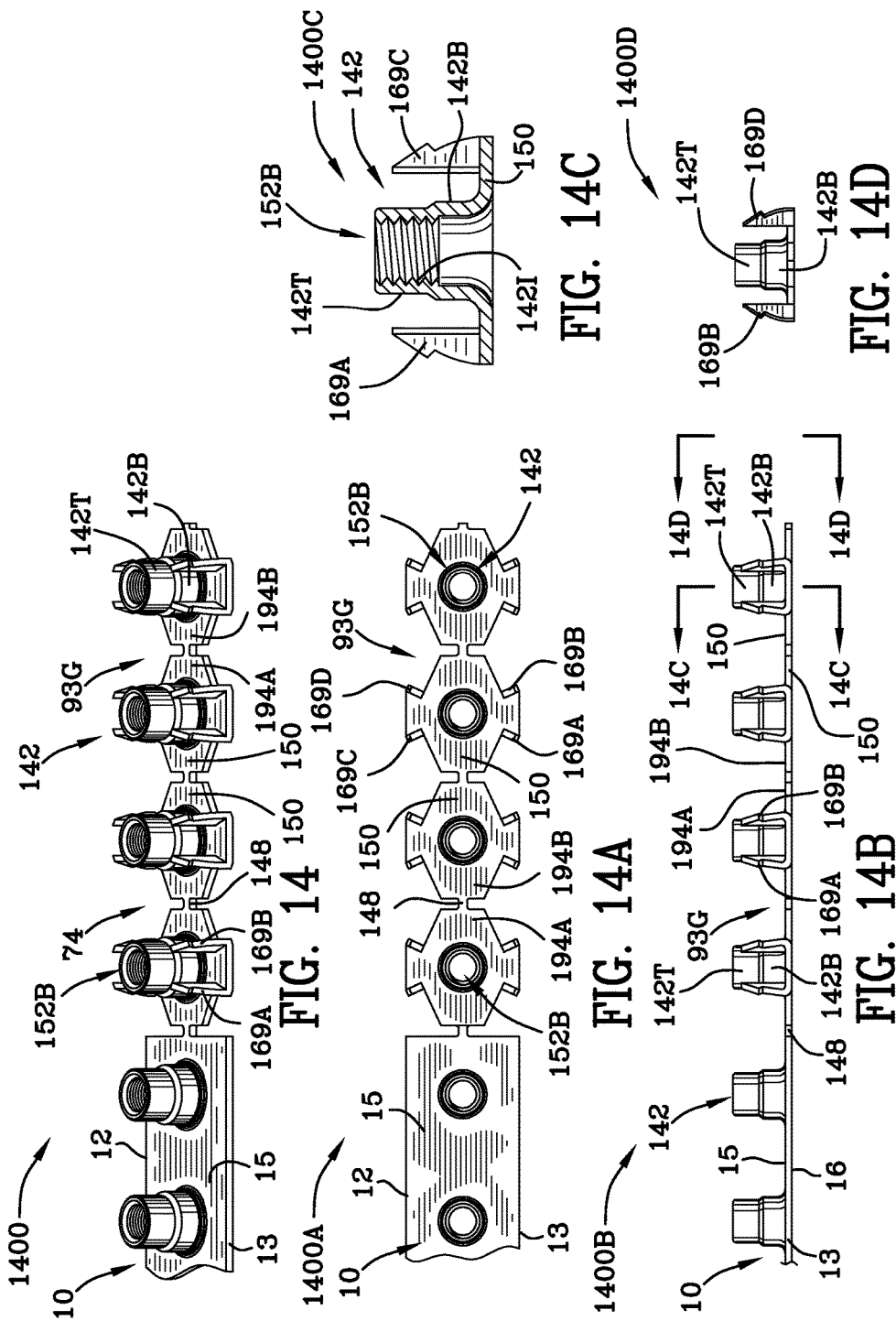

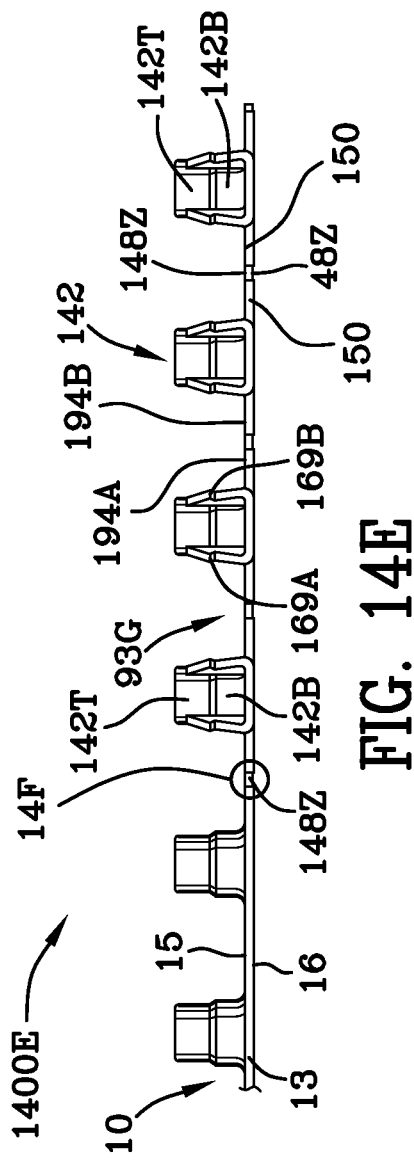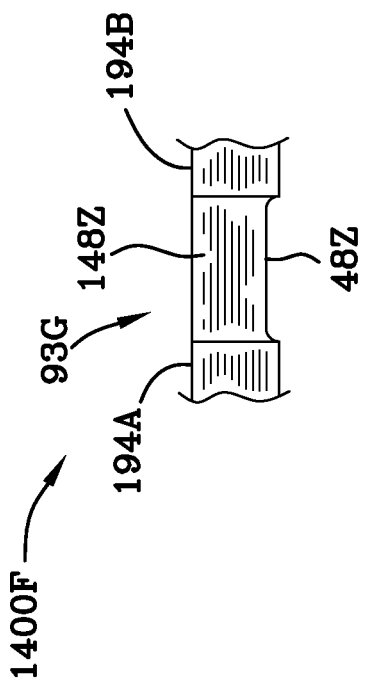
FIG. 14E
FIG. 14F

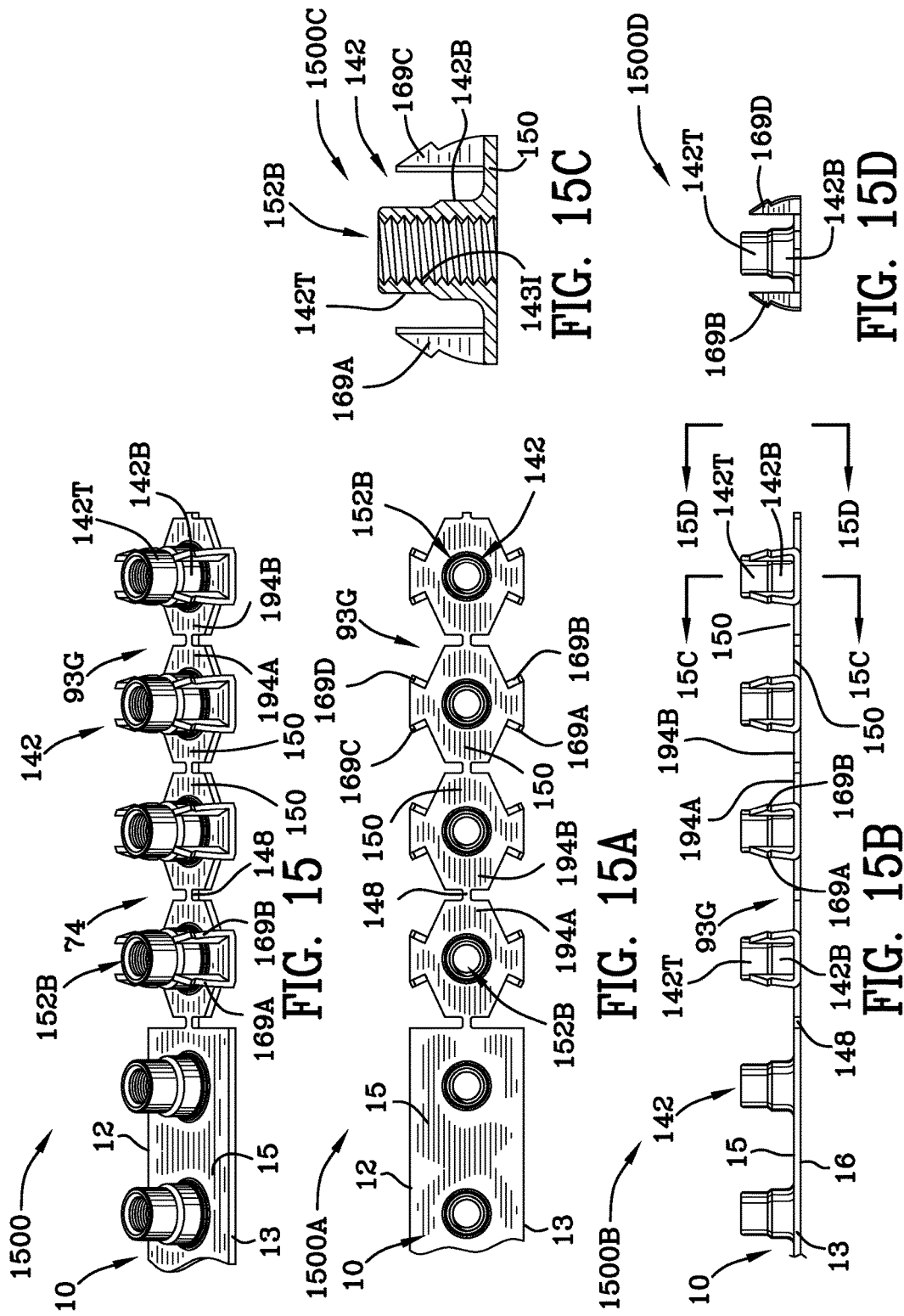

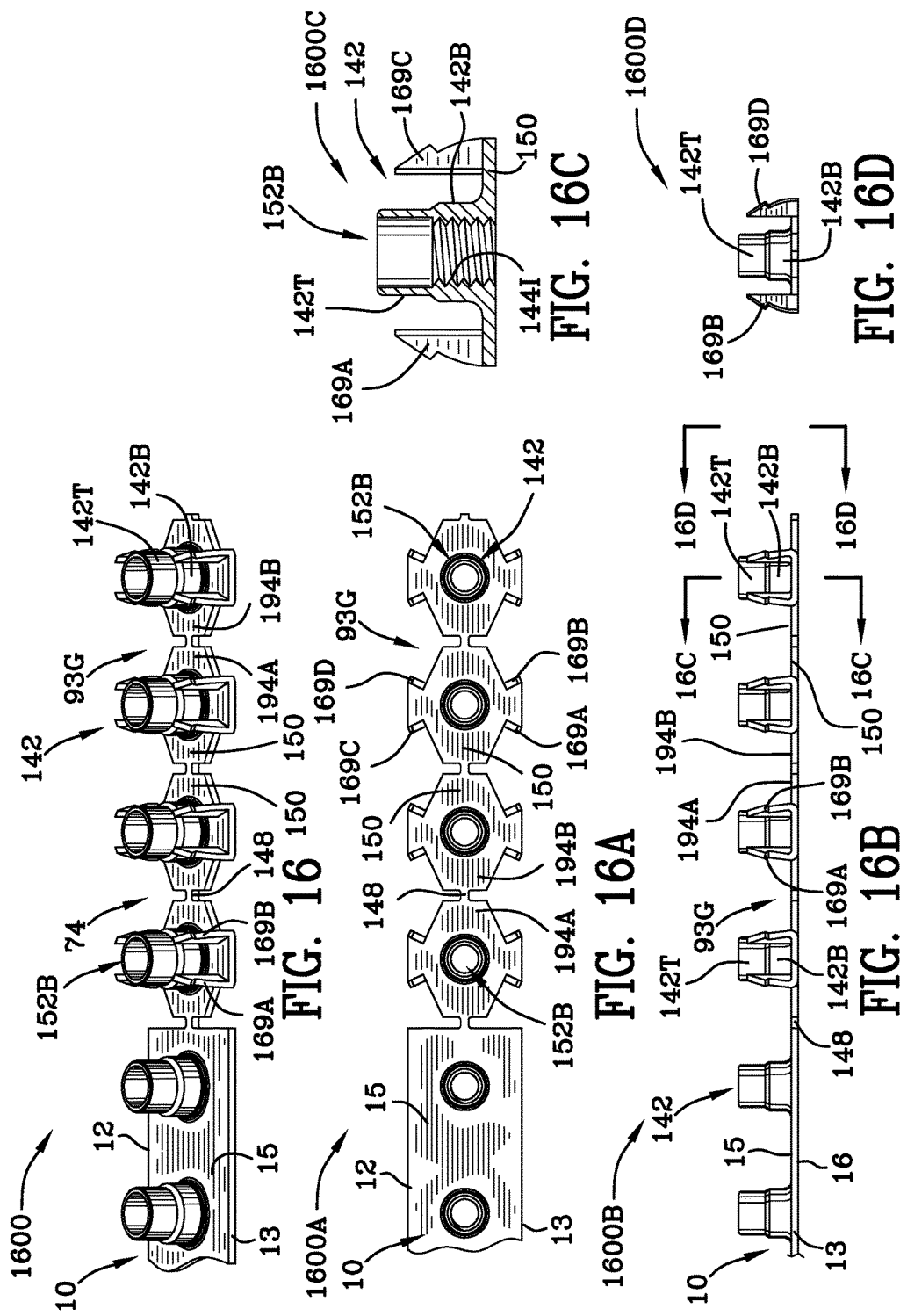

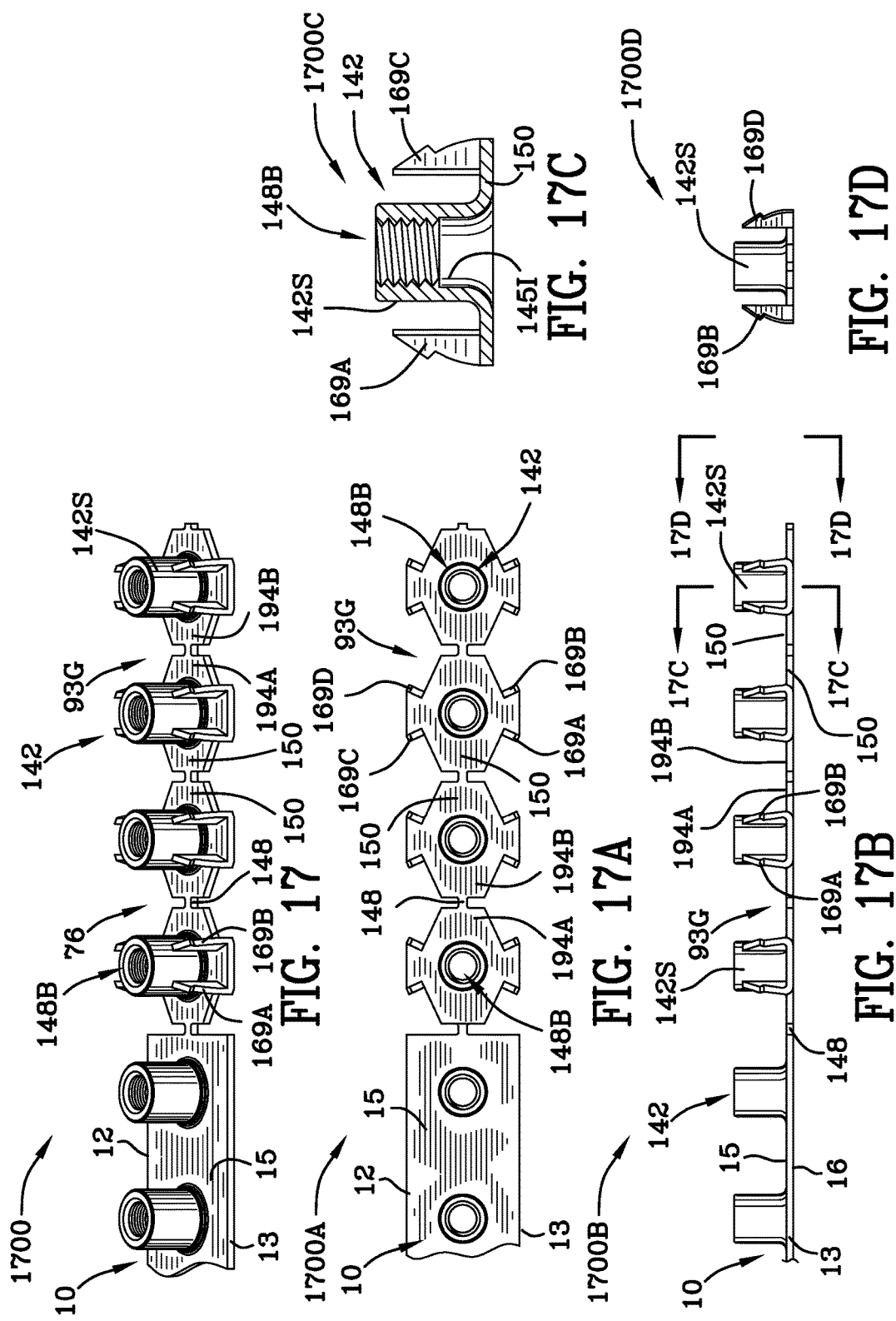

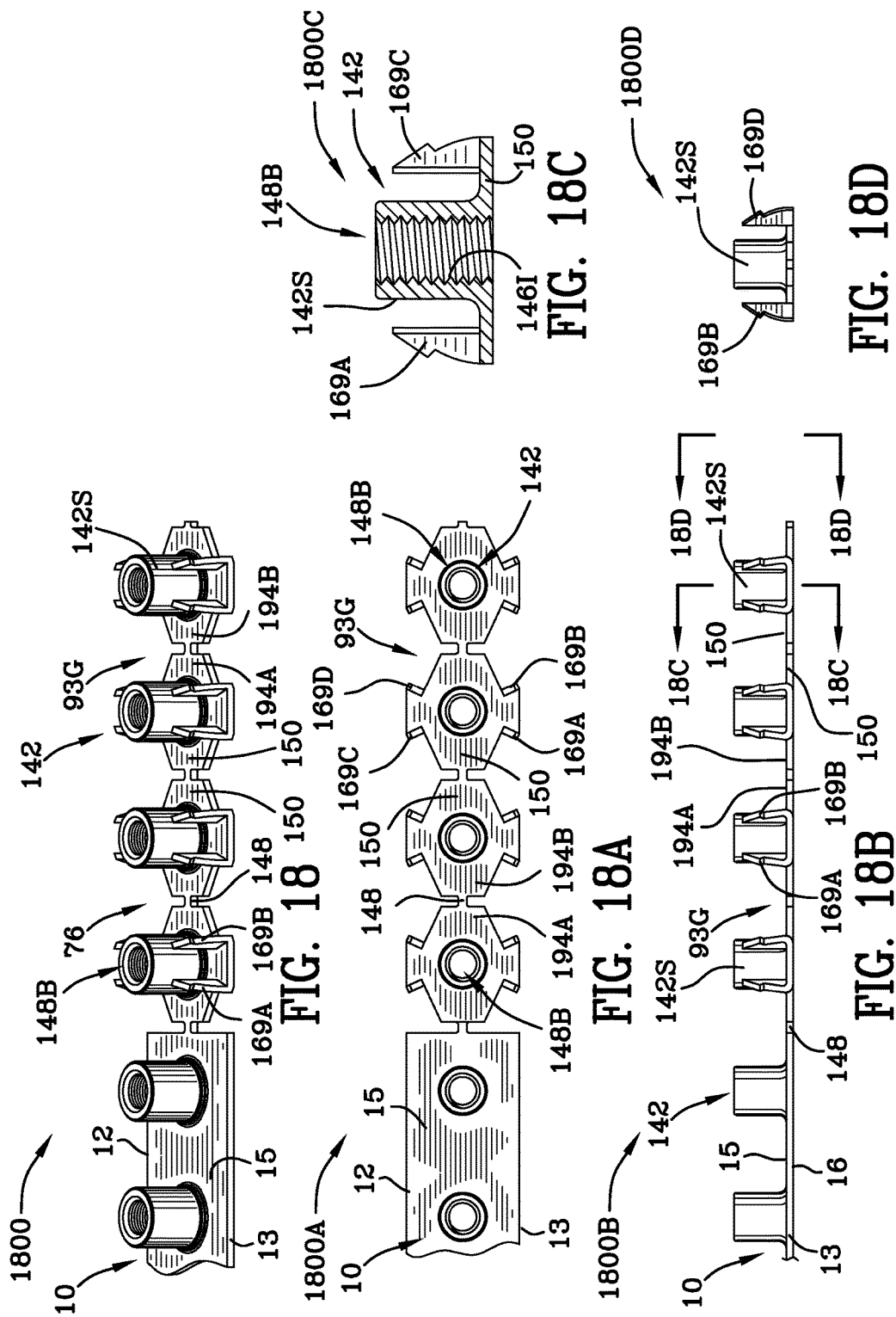

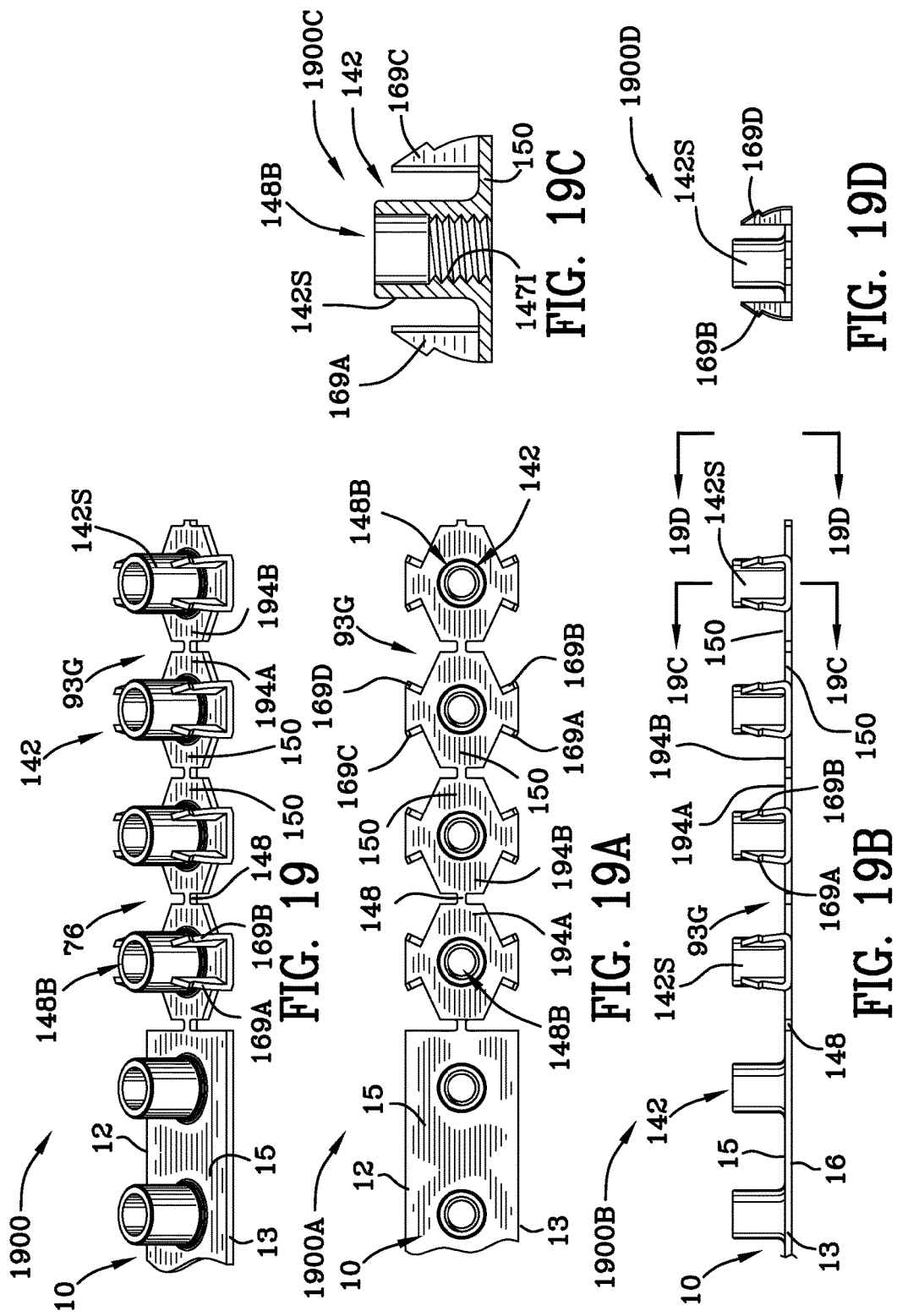

METHOD OF MANUFACTURING COLLATED T-NUTS

This application claims priority to and the benefit of copending United States Provisional Patent Application Ser. No. 61/433,300 filed Jan. 17, 2011. United States Provisional Patent Application Ser. No. 61/433,300 filed Jan. 17, 2011 is incorporated in its entirety by reference hereto.

FIELD OF INVENTION

The invention is in the field of fasteners.

BACKGROUND OF THE INVENTION

Existing collated fasteners are manufactured and then collated using a secondary process. One process uses a progressive die method to cut the T-Nuts off from the steel or stainless steel strip and then tap the threads in a secondary process. The secondary process commonly uses glue to hold the fasteners together for later dispensation. Fasteners which are glued together include staples, nails, screws, clips, etc.

One known method for collating T-Nuts includes adhering the T-Nuts to tape and rolling them into a coil during a secondary operation. FIG. 13 is a view 1300 illustrating a prior art backing strip 1301 securing individual T-Nuts 1302 thereto by means of adhesive as illustrated in U.S. Pat. No. 5,214,843. FIG. 13A is a view 1300A illustrating a prior art device illustrated in U.S. Pat. No. 5,214,843 with wires 1304, 1305 welded to individual T-Nuts 1302.

Presently known methods of collating T-Nuts using tape have several disadvantages. First, T-Nuts can easily become detached or 'unstuck' from the tape. Factors such as temperature and humidity can have an adverse reaction on the adhesive properties of tape. Second, taped T-Nuts on a coil do not withstand impact well. Common forces involved with activities such as shipping and/or handling can cause T-Nuts to detach. Third, the tape is flexible and the coil of T-Nuts does not have very rigid structure. Tape coiled T-Nuts must be laid-out and kept flat. If they are moved into a vertical angle they can lose their coiled form and begin to unravel. All current methods of collating T-Nuts involve a secondary process to collate the fasteners.

In the most common manufacture of individual T-Nuts, a band or metal strip of steel is drawn wherein the barrels of the T-Nuts are formed. Once the barrels of the T-Nuts are formed, the T-Nuts are severed from the strip. Threads are then tapped in the barrels of the T-Nuts and prongs may be added if not previously formed in the drawing step.

In a less common manufacture of individual T-Nuts, a band or metal strip of steel is drawn wherein the barrels of a plurality of T-Nuts are formed and then multiple spindles tap the plurality of barrels of T-Nuts while they are still integral with the metal strip. Thereafter, prongs (pawls) of the are formed on the T-Nuts and the individual T-Nuts are severed from the band or metal strip.

SUMMARY OF THE INVENTION

The disclosed method of collating T-Nuts does not involve a secondary process. Because the disclosed method taps the T-Nuts while they are still on and integral with the metal strip a secondary process is not necessary. Collation of fasteners is used to ease the installation process of the fasteners. When fasteners are collated they are correctly assembled and consistently arranged in a fixed orientation. Formed and collated T-Nuts arranged in a steel strip are used in conjunction with T-Nut delivery system.

The invention includes a plurality of collated T-Nuts that reside in a steel strip. The collated T-Nuts are installed by automation equipment that shears individual T-Nuts from the coil. T-Nuts are commonly installed into, but not limited to, the following materials: wood, particle board, medium-density fiberboard (MDF), plywood, and various plastics.

Any reasonable thickness, width, and length strip of low carbon steel or stainless steel may be used to form T-Nuts collated by carry tabs between the flanges of each T-nut. In other words, the T-Nuts are formed in and from a continuous metal strip. Carry tabs include a frangible portion which enables severing of the T-Nuts.

The T-Nuts may take many forms. They may have a straight barrel or the barrel may have a stepped exterior. The barrel may be tapered. The barrel may include a counterbore therein and the counterbore may be threaded or unthreaded. A bore through the T-Nut may be fully threaded completely therethrough. Alternatively, the bore through the T-Nut may be partially threaded therethrough. The barrel length can vary. Threads may be any size and fit of imperial or metric standards.

Barrels can have the option of having skives on them. Skives cause the T-Nut to twist upon insertion and help increase retention of the T-Nut in the component. This type of T-Nut is known as a Propell nut. The Propell T-Nut has various flange sizes and geometries. The flanges may have various features such as prongs, holes, and welding bosses of any size and configuration. Carry tabs are used to connect each T-Nut to another. Carry tabs are either frangible themselves or include a frangible portion. Size, shape and location of the carry tabs can vary. All T-nut configurations disclosed herein may have various flange sizes and geometries.

These steel or stainless steel coil T-Nuts are manufactured using a progressive die method. This process starts with a coil of steel or stainless steel being fed into a press containing several stages of dies. The dies draw the steel or stainless steel at several locations and form barrels.

After the barrels are formed the steel or stainless steel strip advances to a station where the barrels are tapped. After the barrels are tapped the strip is cut to form the flange shape and carry tab. Many different shapes and configurations of the flanges and carry tabs are disclosed herein.

The next stage of the process is to form flange features such as prongs, holes, or bosses. This stage is typically carried out in conjunction with cutting the T-Nut from the strip. Dies also create other features such as prongs (pawls) and apertures in the metal strip. In order to keep the T-Nuts collated on the coil, the prongs will be formed but the carry tab will remain intact. Instead of using the carry tab, other structure such as a railing or plural rails may be used to hold the T-Nuts together. After this the T-Nuts can be rolled up securely into a coil and the coil is sufficiently rigid so that the coil does not unravel.

Steel or stainless steel coil T-Nuts have advantages over individual detached T-Nuts. Complete manufacturing is executed in one single operation or series of operations. T-Nuts are formed, tapped, and rolled up on a coil without requiring any secondary operations. The time to produce T-Nuts decreases and production costs are reduced. Because T-Nuts are collated on a coil they can be wound up on a reel instead of being packaged in cardboard boxes, which reduces packaging costs. Some T-Nuts have geometries that typically present feeding issues in vibratory bowls and tracks. Collated T-Nuts of the invention simplify the feeding process by eliminating the need for a vibratory bowl and track. T-Nut machines that feed T-Nuts using a vibratory bowl and track can experience feeding issues in a dusty/dirty environment.

T-Nut users in woodworking related industries experience problems with sawdust. Sawdust in the atmosphere can settle on the T-Nuts and cause jamming in vibratory bowls and tracks. Collated T-Nuts on a steel or stainless steel coil do not require vibratory bowls and tracks, therefore eliminating potential jamming. The collated parts disclosed herein that are fed into automation equipment do not require an electrical vibratory system to feed parts. Steel or stainless steel coil T-Nuts can be easily fed into automation equipment.

The need for lifting boxes of individual T-Nuts and pouring them into a vibratory machine hopper is eliminated by the invention. Multiple steel or stainless steel coils of the T-Nuts rolled up into a coil as disclosed herein can be stored directly on the machine frame and easily reloaded as needed. Also, since the T-Nut coils disclosed herein are stable, a larger coil can be loaded onto a pallet reel and fed into an installation machine to run even larger quantities of T-Nuts before having to reload.

Installation of steel or stainless steel coil T-Nuts is automated. To automate the installation of the steel or stainless steel coil T-Nuts, a feeding system is utilized to advance the T-Nuts. Some slack must be available to allow the T-Nuts to advance.

The T-Nuts on the coil, once completely formed, are advanced using a pneumatic cylinder(s) to push/pull the T-Nuts. The pneumatic cylinder is fitted with an engaging tool. In one example, the barrels of the T-Nuts may be engaged by the engaging tool.

When in position a shearing in-body will push the T-Nuts downward over the blade shearing an individual T-Nut from the strip. Once sheared from the strip, the detached T-Nut is free to be advanced further down and into the pilot hole of the component (substrate).

A method of making a continuous length of integrally connected T-Nuts is disclosed and claimed. The method includes the steps of: selecting a continuous length of deformable metal material which is generally flat in configuration and which has first and second side portions and top and bottom portions; introducing the deformable metal material progressively into successive die stations which act to successively form spaced and generally hollow cylindrical configurations on the upper surface of the metal material of successively greater diameter and axial length; moving the generally cylindrical configurations successively to another station whereat threads are formed on a hollow interior thereof; moving the threaded generally cylindrical configurations progressively to a still further station wherein heads are formed for the T-Nuts in the nature of flanges which define the perimeter of the heads and also form carry tabs, the carry tabs are frangible connections or include frangible connections between adjacent T-Nuts; and, arranging the integrally connected T-Nuts into a tight helical configuration for shipment or for manufacturing use.

Additionally, the method may include the steps of: feeding the continuous length of integrally connected T-Nuts into proximity of its use and severing the endmost T-Nut from the length of T-Nuts; and, attaching the severed endmost T-Nut to a substrate, the step of attaching the severed endmost T-Nut to a substrate includes inserting the cylindrical configuration thereof into a cylindrical opening in the substrate. Still additionally, the method includes the steps of: forming prongs, holes and/or bosses on the flanges.

The apparatus of a continuous length of integrally connected T-Nuts is disclosed and claimed as well. The apparatus of a continuous length of integrally connected T-Nuts, includes: a continuous length of deformable metal material which is generally flat in configuration; the continuous length of deformable metal material includes first and second side portions, a top portion and a bottom portion; a plurality of spaced and generally hollow cylindrical configurations extending vertically from the top portion of the metal member; the generally hollow cylindrical portions include interior threads therein; wall means on each of the T-Nuts defining a head therefor; the wall means further defines a carry tab intermediate adjacent T-Nuts, and, the carry tab comprises a weakened connection between the adjacent T-Nuts for ease in separating the T-Nuts. The apparatus may further include T-Nuts having prongs, holes and/or bosses formed on the head/flange.

Another example of a continuous length of integrally connected T-Nuts, includes: a continuous length of deformable metal material which is generally flat in configuration; the continuous length of deformable metal material includes first and second side portions, a top portion and a bottom portion; a plurality of spaced and generally hollow cylindrical configurations on each of the T-Nuts extending vertically from the top portion of the metal member, the generally hollow cylindrical portions include a bore therethrough with interior threads therein, and, the generally hollow cylindrical portions of the T-Nuts defining barrels therefor; wall means on each of the T-Nuts defining a head or flange therefor; and, the wall means further define a continuous rail interconnecting said T-Nuts.

An apparatus for severing a T-Nut from the end of a strip of T-Nuts is also disclosed and claimed, and includes: the strip of T-Nuts being formed on a common strip of metal; each of the T-Nuts of the strip of T-Nuts being integrally connected together at a frangible portion with a next adjacent T-Nut; each of the T-Nuts includes a cylindrical bore therein; a mechanism to feed and sever the strip of T-Nuts in endwise fashion, the mechanism includes a positioning member, and an endmost T-Nut being in engagement with the positioning member; the mechanism to feed and sever the strip of T-Nuts in endwise fashion further includes: a cutting blade positioned vertically below the position of the frangible portion when the endmost T-Nut is in engagement with the positioning member; and, the mechanism to feed and sever the strip of T-Nuts includes a shearing ram (shearing inbody) having a guide finger positioned axially in line with the cylindrical bore in the endmost T-Nut and adapted to move vertically from an upper to a lower position to engage the cutting blade with the frangible portion and sever the endmost T-Nut from the strip of T-Nuts. The apparatus for severing a T-Nut from the end of a strip of T-Nuts may further include a guide finger which resides in the cylindrical bore of the endmost T-Nut to carry the severed endmost T-Nut to another position separated from the strip of T-Nuts. Still additionally, the apparatus for severing may include components for inserting the T-Nut into a substrate wherein the substrate includes an opening therein.

The guide finger resides in the cylindrical bore of the endmost T-Nut to carry the severed endmost T-Nut to the opening in the substrate where the T-Nut is to reside to perform a support function in later use. A guide mechanism is located below the end of the strip of T-Nuts and includes a support wall surface to engage the penultimate T-Nut of the strip so as to maintain its integrity with the strip until the penultimate T-Nut is severed from the strip. means for moving the shearing ram vertically between upper and lower positions are also disclosed.

Another apparatus for severing a T-Nut from a strip of collated T-Nuts is disclosed. In this apparatus example, a double acting pneumatic cylinder drives a tool which is notched for engagement with the pawl of the T-Nuts. The tool is notched such that at least two gripping surfaces engage the pawl. Two pneumatic cylinders may be used to engage the strip of T-Nuts, the first cylinder operates from the first side of an escapement and the second cylinder operates from the second side of the escapement. The escapement is the device which feeds and severs the T-Nuts and enables the insertion into a substrate for use. The escapement includes a generally rectangularly shaped T-Nut passageway which enables T-Nuts to be pushed therethrough by one or more pawl engaging tools driven by pneumatic cylinders. The pneumatic cylinders index the collated strips of T-Nuts into a position where they can be subsequently severed under the force of a shearing inbody which is piston driven. The escapement includes a pivotal bottom arm which allows the strip of T-Nuts to be forced downwardly where a frangible or severable portion of the T-Nut assembly is brought into engagement with a shearing blade. The shearing inbody includes a guide (stud) which enters the bore of the T-Nut to be severed so as to ensure separation of the T-Nut from the collated strip of T-Nuts when the frangible portion (weakened portion) is brought into engagement with the shearing blade of the escapement. The strip of T-Nuts, during the feeding operation (the installation operation of the T-Nuts into a substrate), resides in the passageway of the escapement and as the T-Nuts are forced downwardly to be severed, the pivotal bottom arm rotates downwardly approximately the height of one T-Nut. The height of the T-Nut is measured from the top of the flange to the end of the barrel of the T-Nut. As the T-Nut to be severed is forced down such that its frangible portion (weakened portion) engages the shearing blade of the escapement, the strip of T-Nuts is rotated slightly downwardly. Therefore, there must be some slack in the strip of T-Nuts being fed into the escapement. The end of the coil closest to where the T-Nuts are to be installed must allow for flexibility in the vertical direction. The reason for this is to allow the T-Nuts to advance above the shearing blade.

The another apparatus for severing a T-Nut from the end of a strip of T-Nuts uses a common strip of metal. The common strip of metal includes a plurality of T-Nuts thereon. Each of the plurality of T-Nuts of the common strip of T-Nuts includes a flange integrally connected by a frangible portion with a flange of a next adjacent T-Nut. The plurality of T-Nuts of the common strip includes an endmost T-Nut. The endmost T-Nut is severed from the plurality of T-Nuts of the common strip. Each of the T-Nuts includes a bore therein and a pair of pawls. An escapement includes a T-Nut passageway. The T-Nut passageway includes a first side member, a second side member, an upper member and a pivotable bottom plate. The upper member is affixed to the first and second side members. The hinged bottom portion rotates between first and second positions. The escapement further includes a chamber for severing the endmost T-Nut. A gripping tool is affixed to a double acting piston. The escapement severs the endmost T-Nut of the plurality of T-Nuts of the common strip in endwise fashion. The escapement includes an opening and the gripping tool resides in the opening of the escapement positioned to alternately engage and disengage one pawl of the pair of pawls of one of the T-Nuts. The double acting piston (also sometimes referred to herein as a shearing inbody) forcefully moves in a first direction urging the gripping tool into engagement with the one pawl of the pair of pawls of one of the T-Nuts urging the endmost T-Nut into the chamber. The double piston and the gripping tool affixed thereto retracting, in a second direction, away from and out of engagement with the one pawl of the pair of pawls of one of the T-Nuts of the plurality of T-Nuts of the common strip of T-Nuts. The escapement further includes a cutting blade positioned vertically below the frangible portion of the endmost T-Nut when the endmost T-Nut is in the chamber. The shearing piston resides in the chamber and the shearing piston is movable between a first upper position and a second lower position. The shearing piston includes a guide for interengagement with the bore of the endmost T-Nut. An elastic band member operates between the fixed upper portion of the escapement and the hinged bottom portion of the escapement. As the piston moves from the first upper position to the second lower position, the guide of the shearing piston engages the bore of the endmost T-Nut. The piston engages the flange of the endmost T-Nut, and the plurality of T-Nuts of the common strip rotate the hinged bottom portion between first and second positions. The frangible portion of the endmost T-Nut is lowered to, and brought into engagement with, the cutting surface of the cutting blade severing the endmost T-Nut from the plurality of T-Nuts of the common strip.

The method of inserting a T-Nut from a common strip of metal including a plurality of T-Nuts into an opening in a substrate, wherein each of the T-Nuts being integrally connected together by a frangible portion (weakened portion) thereof intermediate adjacent T-Nuts and each of the T-Nuts includes a cylindrical portion, includes the steps of: feeding the strip of T-Nuts in endwise fashion to a severing position; cutting the endmost T-Nut at the frangible portion (weakened portion) to sever the endmost T-Nut from the common strip of metal; carrying the severed T-Nut to and inserting the cylindrical portion of the severed T-Nut into the opening in the substrate; and, supporting the end of the strip of the T-Nuts adjacent the severed endmost T-Nut being severed maintaining integrity of the T-Nuts adjacent the strip until they are in position to be severed.

It is an object of the invention to provide a coiled roll of T-Nuts which is stable and secure for feeding the T-Nuts into a machine which severs the T-Nuts and places them securely in a substrate.

It is an object of the invention to provide a strip of collated T-Nuts having a flexible connection between each T-Nut enabling the T-Nuts to be rolled up in a coil.

It is an object of the invention to provide a coiled roll of T-Nuts wherein each of the T-Nuts is secured to the next adjacent T-Nut by a frangible portion of the coiled roll of T-Nuts.

It is an object of the present invention to provide a coiled roll of T-Nuts wherein each of the T-Nuts is secured to the next adjacent T-Nut by carry tabs joined together by a frangible (weakened) portion which can later be severed in the installation or separation of the T-Nuts.

It is an object of the invention to include carry tabs between adjacent T-Nuts which are either frangible or include frangible portions thereof.

It is an object of the invention to provide a plurality of T-Nuts formed on and of a metal strip and to provide a frangible portion between adjacent spaced apart T-Nuts.

It is an object of the invention to provide T-Nuts formed on and of a metal strip and to provide various flanges, holes and prongs as features of the T-Nuts.

It is an object of the invention to form T-Nuts on and of a metal strip such that the T-Nuts may be reliably separated and installed in a wooden substrate.

It is an object of the invention to secure T-Nuts on and of a metal strip through use of one or more rails.

It is an object of the invention to provide an escapement and a chamber associated therewith which feed and severs the endmost T-Nut from a continuous strip of T-Nuts.

BRIEF DESCRIPTION OF THE DRAWINGS

FIG. 4 is an isometric illustration similar to FIG. 3B showing a slightly longer length of the connected and formed T-Nuts and slightly enlarged for detail.

FIG. 4A is an enlarged portion of FIG. 4 illustrating the connection between adjacent T-Nuts and the location at which they will be severed at about their ultimate location of use.

FIG. 4B is a plan view of FIG. 4.

FIG. 4C is an elevational view of FIG. 4B.

FIG. 4D is an end view of FIG. 4C.

FIG. 4E is an enlargement of the side portion of FIG. 4C.

FIGS. 6, 6A, 6B and 6C are views of another configuration of T-Nuts made in accordance with the present invention.

FIG. 6D is an enlargement of the frangible portion of FIG. 6 which illustrates a slot in the upper portion of the frangible portion and vertical slots on both sides of the frangible portion.

FIGS. 7, 7A, 7B and 7C are views of a further configuration of T-Nuts made in accordance with the present invention.

FIG. 7D is an enlargement of the frangible portion of FIG. 7 which illustrates a slot in the upper portion of the frangible portion and vertical slots on both sides of the frangible portion.

FIGS. 8, 8A, 8B and 8C are views of a still further configuration of T-Nuts made in accordance with the present invention.

FIG. 8D is an enlargement of the frangible portion of FIG. 8 which illustrates a slot in the upper portion of the frangible portion and vertical slots on both sides of the frangible portion.

FIGS. 9, 9A, 9B and 9C are views of yet another configuration of T-Nuts made in accordance with the present invention.

FIG. 9D is an enlargement of the frangible portion of FIG. 9 which illustrates a slot in the upper portion of the frangible portion and vertical slots on both sides of the frangible portion.

FIGS. 10, 10A, 10B and 10C are views of an additional configuration of T-Nuts made in accordance with the present invention.

FIG. 10D is an enlargement of the frangible portion of FIG. 10 which illustrates a slot in the upper portion of the frangible portion and vertical slots on both sides of the frangible portion.

FIGS. 11, 11A, 11B and 11C are views of an additional configuration of T-Nuts made in accordance with the present invention.

FIG. 11D is an enlargement of the frangible portion of FIG. 11 which illustrates a slot in the upper portion of the frangible portion and vertical slots on both sides of the frangible portion.

FIG. 14 is an isometric illustration of a length of the strip of another example of collated T-Nuts slightly enlarged wherein the barrel has a first diameter having a first circumference and a second diameter having a second circumference.

FIG. 14A is a slightly enlarged top schematic view of the collated T-Nuts of FIG. 14 illustrating the frangible connection between adjacent T-Nuts.

FIG. 14B is a plan view of FIG. 14.

FIG. 14C is a cross-sectional view of FIG. 14B taken along the lines 14C-14C illustrating interior threads in the first diameter having a first circumference.

FIG. 14D is an end view of FIG. 14B taken along the lines 14D-14D.

FIG. 14E is a plan view similar to FIG. 14B with a frangible connection having a slight underside indentation.

FIG. 14F is an enlargement of a portion of FIG. 14E illustrating the frangible connection having a slight indentation.

FIG. 15 is an isometric illustration of a length of the strip of another example of collated T-Nuts slightly enlarged wherein the barrel has a first diameter having a first circumference and a second diameter having a second circumference similar to FIG. 14, except with interior threads completely through the barrel.

FIG. 15A is a slightly enlarged top schematic view of the collated T-Nuts of FIG. 15 illustrating the frangible connection between adjacent T-Nuts.

FIG. 15B is a plan view of FIG. 15.

FIG. 15C is a cross-sectional view of FIG. 15B taken along the lines 15C-15C illustrating a fully threaded barrel.

FIG. 15D is an end view of FIG. 15B taken along the lines 15D-15D.

FIG. 16 is an isometric illustration of a length of the strip of another example of collated T-Nuts slightly enlarged wherein the barrel has a first diameter having a first circumference and a second diameter having a second circumference similar to FIG. 14, except with interior threads residing in the portion of the barrel having a second diameter having a second circumference.

FIG. 16A is a slightly enlarged top schematic view of the collated T-Nuts of FIG. 16 illustrating the frangible connection between adjacent T-Nuts.

FIG. 16B is a plan view of FIG. 16.

FIG. 16C is a cross-sectional view of FIG. 16B taken along the lines 16C-16C illustrating interior threads in the second diameter having a second circumference.

FIG. 16D is an end view of FIG. 16B taken along the lines 16D-16D.

FIG. 17 is an isometric illustration of a length of the strip of another example of collated T-Nuts slightly enlarged wherein the barrel is cylindrically shaped with interior threads in the upper portion of the bore of the cylindrically shaped barrel.

FIG. 17A is a slightly enlarged top schematic view of the collated T-Nuts of FIG. 17 illustrating the frangible connection between adjacent T-Nuts.

FIG. 17B is a plan view of FIG. 17.

FIG. 17C is a cross-sectional view of FIG. 17B taken along the lines 17C-17C illustrating interior threads in the upper portion of the bore.

FIG. 17D is an end view of FIG. 17B taken along the lines 17D-17D.

FIG. 18 is an isometric illustration of a length of the strip of another example of collated T-Nuts slightly enlarged wherein the barrel is cylindrically shaped with interior threads completely through the bore of the cylindrically shaped barrel.

FIG. 18A is a slightly enlarged top schematic view of the collated T-Nuts of FIG. 18 illustrating the frangible connection between adjacent T-Nuts.

FIG. 18B is a plan view of FIG. 18.

FIG. 18C is a cross-sectional view of FIG. 18B taken along the lines 18C-18C illustrating interior threads through the entire bore of the cylindrically shaped barrel.

FIG. 18D is an end view of FIG. 18B taken along the lines 18D-18D.

FIG. 19 is an isometric illustration of a length of the strip of another example of collated T-Nuts slightly enlarged wherein the barrel is cylindrically shaped with interior threads in the lower portion of the bore of the cylindrically shaped barrel.

FIG. 19A is a slightly enlarged top schematic view of the collated T-Nuts of FIG. 19 illustrating the frangible connection between adjacent T-Nuts.

FIG. 19B is a plan view of FIG. 19.

FIG. 19C is a cross-sectional view of FIG. 19B taken along the lines 19C-19C illustrating interior threads in the lower portion of the bore.

FIG. 19D is an end view of FIG. 19B taken along the lines 19D-19D.

The invention will be best understood when reference is made to the description of the invention and to the claims which follow hereinbelow.

DESCRIPTION OF THE INVENTION

Reference may be had to FIG. 4 for a quick understanding of the continuous strip of collated T-Nuts of the invention.

Figure 1:
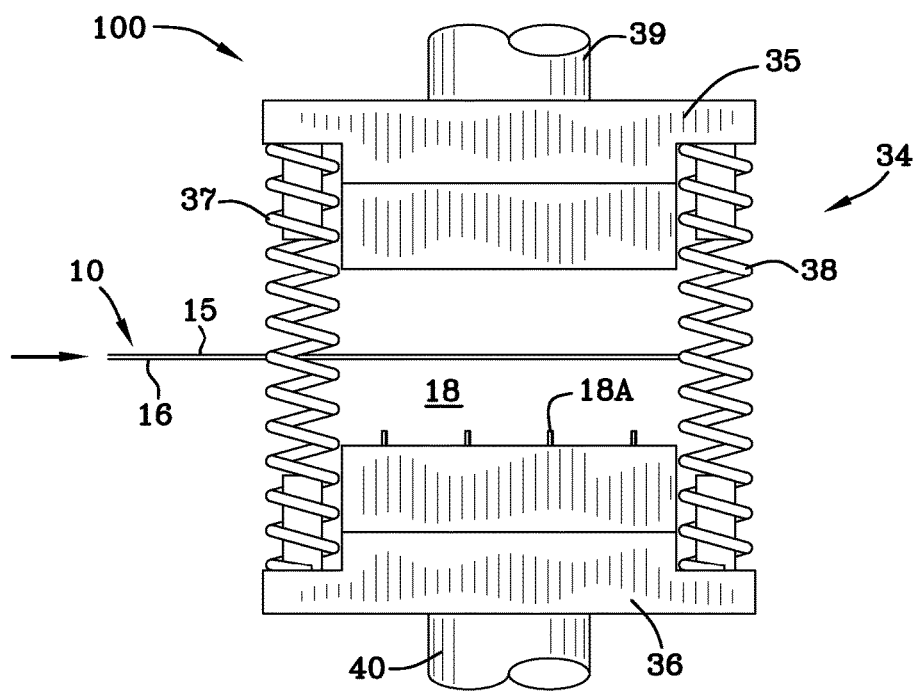
FIGS. 1, 1A and 1B schematically illustrate a die press at a first die station in three successive positions in operating on a strip of metal in performing the method of the present invention.
Figure 1A:
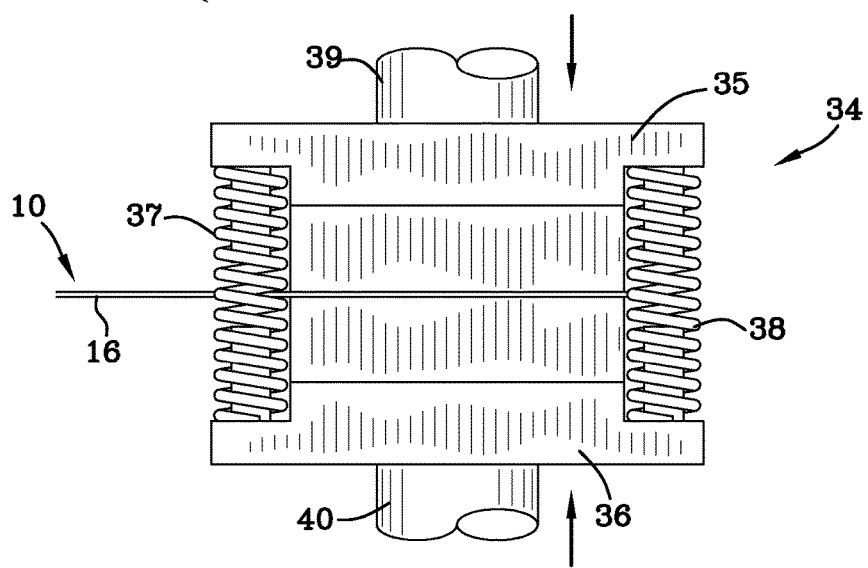
Figure 1B:
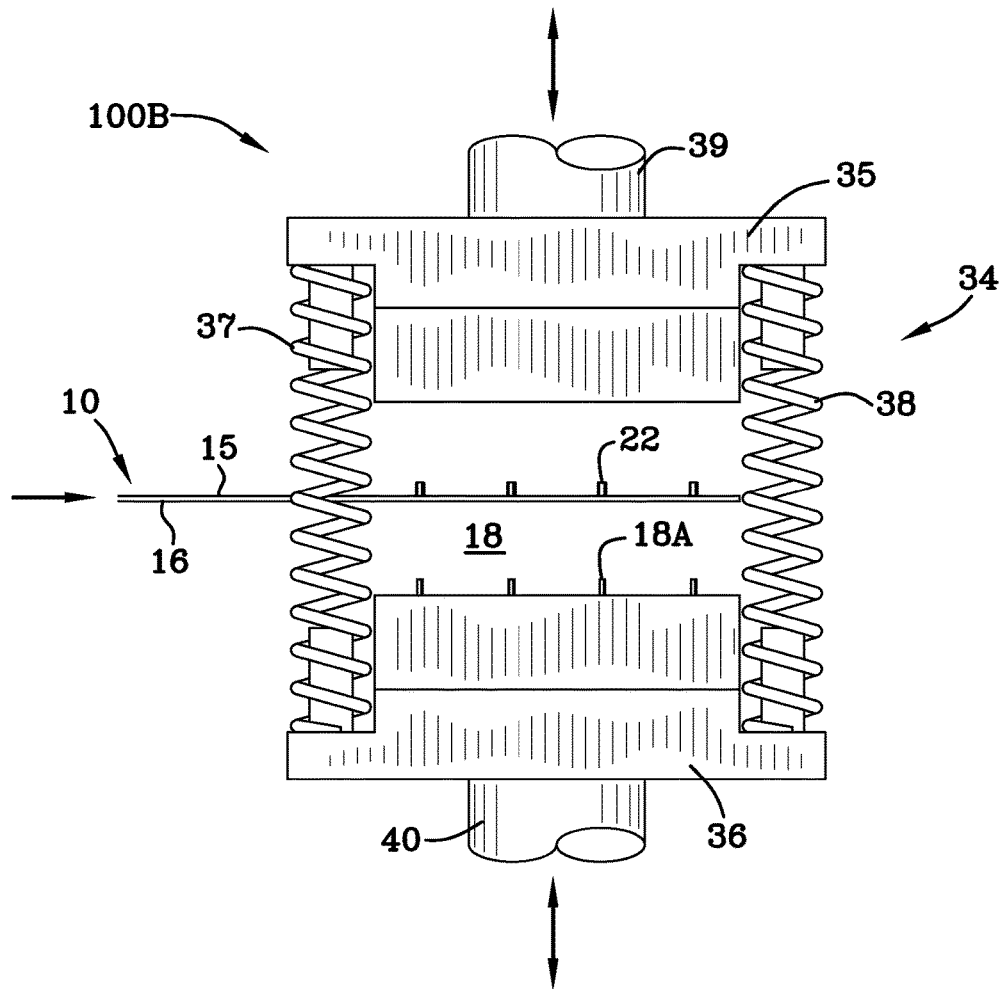
Figure 1C:
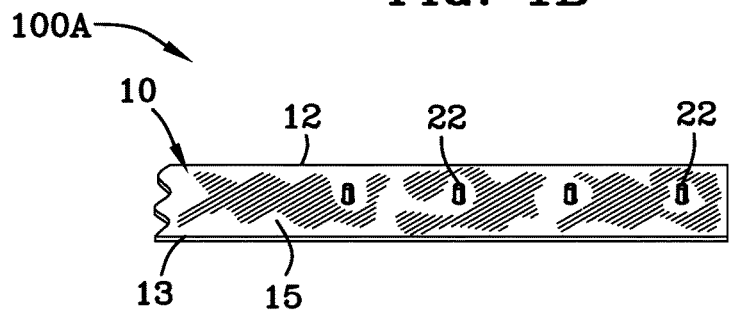
FIG. 1C is a schematic isometric illustration of the end of the strip of metal as it leaves the press illustrated in FIG. 1B.

The continuous strip comprises T-Nuts integrally connected together and spaced apart for later dispensation in a substrate. The integrally connected T-Nuts are formed on and from a continuous steel strip 10. The strip shown in FIG. 4 has been identified by the reference numeral 33. Put another way, reference numeral 33 identifies one example of the completed product, namely, a strip of collated T-Nuts with flanges and parts linked together by carry tabs and frangible portions. As stated previously, the carry tabs may be frangible or portions of the carry tabs may be frangible. The strip of deformable metal material 10 (FIG. 1) has first and second side portions 12, 13 and top and bottom portions 15, 16 and is fed into a first die station 18 (FIGS. 1, 1A, 1B) which is housed in press 34. FIGS. 1, 1A and 1B illustrate a die press at a first die station 18 in three successive positions 100, 100A, 100B in operating on a strip of deformable metal material 10 in performing the method of the present invention. FIG. 1C is an isometric illustration 100C of the end of the strip of metal 10 as it leaves the press 34 illustrated in FIG. 1B.

The strip of metal 10 may be made from many different steels of varying widths and thicknesses. Low carbon steels and 300 series stainless steels are examples. C1006-1008 steel, 304 stainless steel, or any of their international equivalents may be used. The thicknesses of the steels varies, but most will be in the range of 0.039" [1.0 mm] to 0.063" [1.6 mm] thick. The width of the T-nuts also varies, but commonly the widths are in the range of 0.625" [15.9 mm] to 1.000" [25.4 mm] wide. Other widths and thicknesses are specifically contemplated.

The press includes upper and lower platens 35, 36 which are normally urged apart by springs 37, 38 and which press has upper and lower rams 39, 40 which may be hydraulically actuated to bring the platens together to form the steel strip into the configurations described hereafter.

Figure 1D:
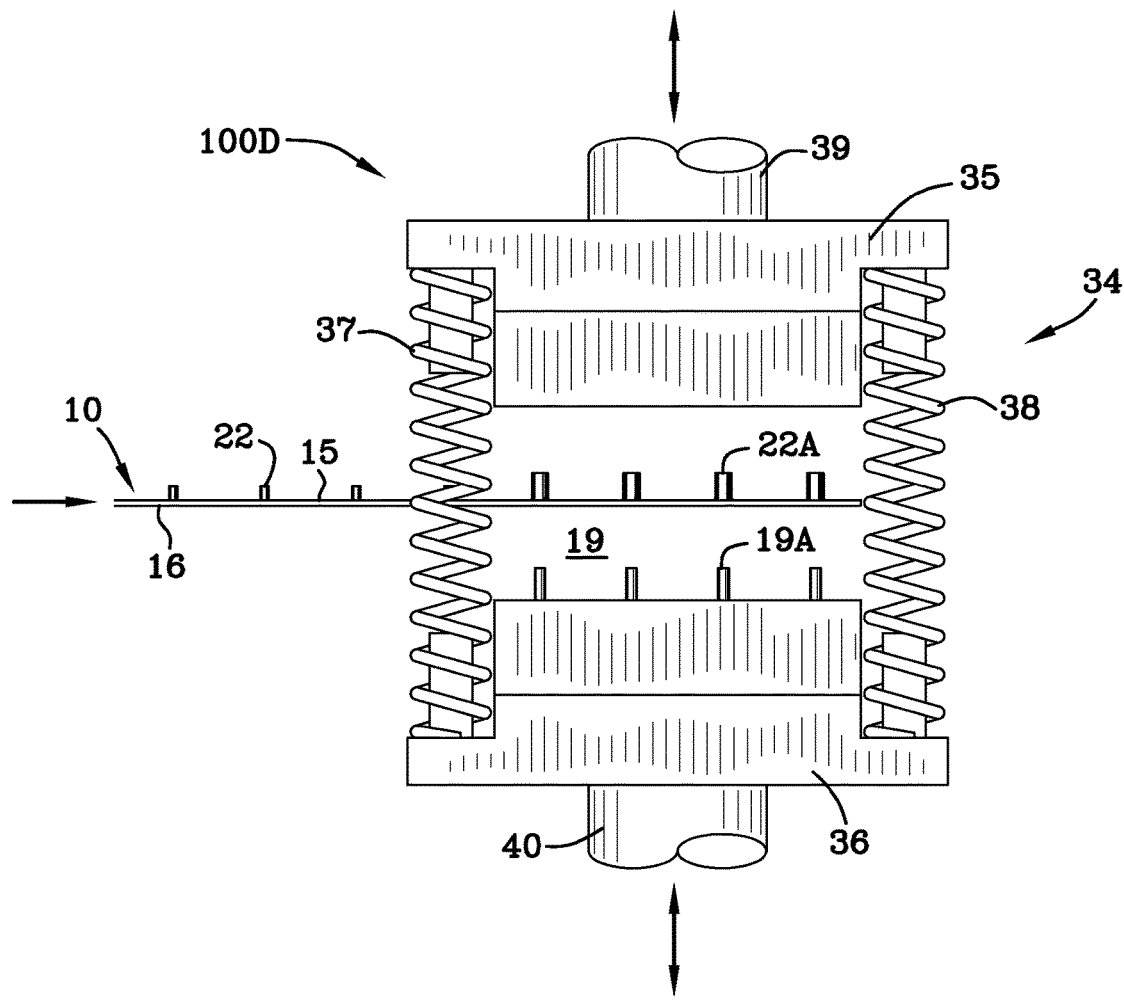
FIG. 1D schematically illustrates a die press at a second die station as operating on the strip of metal after it has left the position of FIG. 1B in the condition of FIG. 1C.
Figure 1E:
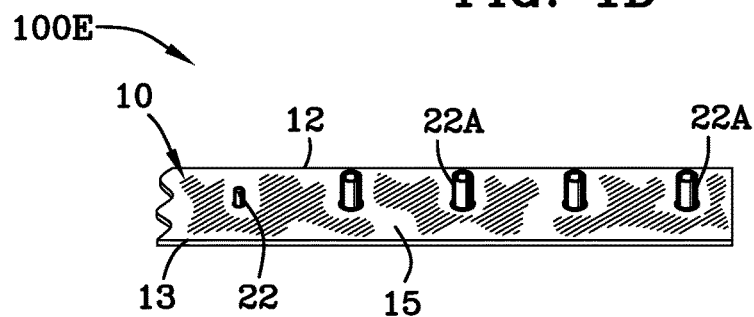
FIG. 1E is a schematic isometric illustration of the end of the strip of metal as operated on in the press of FIG. 1D.

The die station 18 includes die members 18A which act on the metal material 10 when the platens 35, 36 are brought together as illustrated in FIG. 1A and when they are separated as illustrated in FIG. 1B. In FIG. 1B the initial shapes of the cylindrical configurations of the T-Nuts has been formed and they have been identified by the reference numeral 22. Die members 19A at a second die station 19 serve to further enlarge the cylindrical members to the condition 22A shown in FIG. 1D. FIG. 1D is a view 100D illustrating a die press at a second die station 19 as operating on the strip of metal 10 after it has left the position of FIG. 1B in the condition of FIG. 1C. FIG. 1E is an isometric illustration 100E of the end of the strip of metal 10 as operated on in the press of FIG. 1D.

Figure 1F:
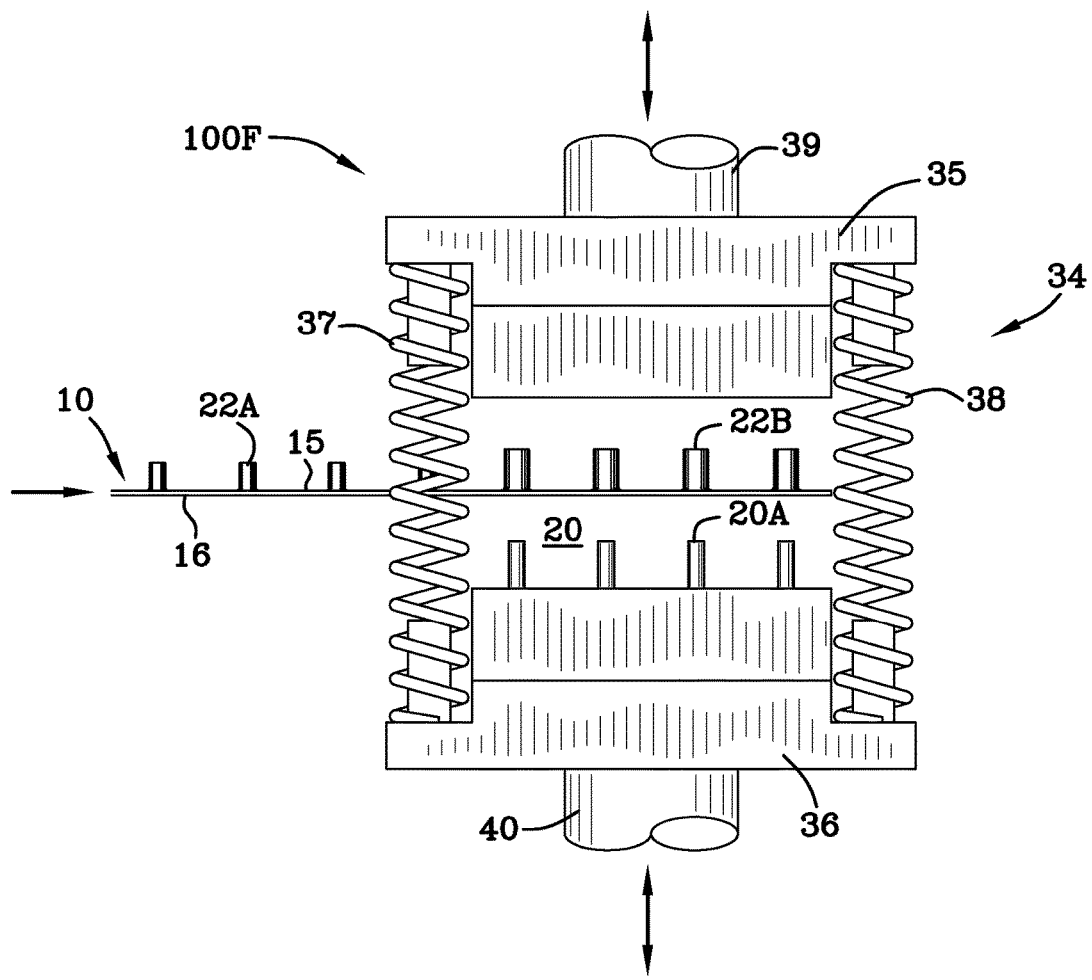
FIG. 1F schematically illustrates a die press at a third die station as operating on the strip of metal after it has left the position of FIG. 1D in the condition of FIG. 1E.
Figure 1G:
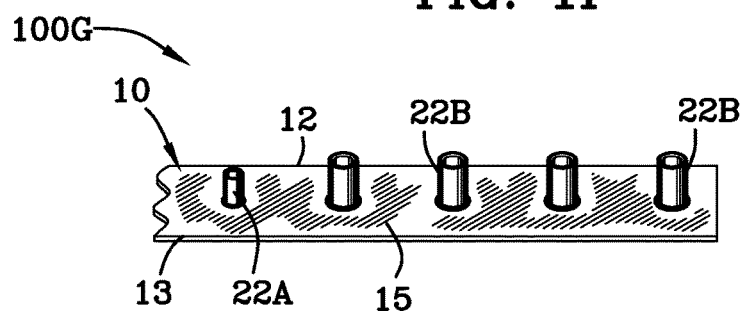
FIG. 1G is a schematic isometric illustration of the end of the strip of metal as operated on in the press of FIG. 1F.

Next the strip of deformable metal material is moved to a third die station 20 (FIG. 1F) where die members 20A act further on the cylindrical members to enlarge them further to the condition of 20B seen in FIGS. 1F and 1G. FIG. 1F is a view 100F illustrating a die press at a third die station 20 as operating on the strip of metal 10 after it has left the position of FIG. 1D in the condition of FIG. 1E. FIG. 1G is an isometric illustration 100G of the end of the strip of metal 10 as operated on in the press of FIG. 1F. FIG. 1G illustrates that the cylindrical members are becoming longer and diametrically larger.

Figure 1H:
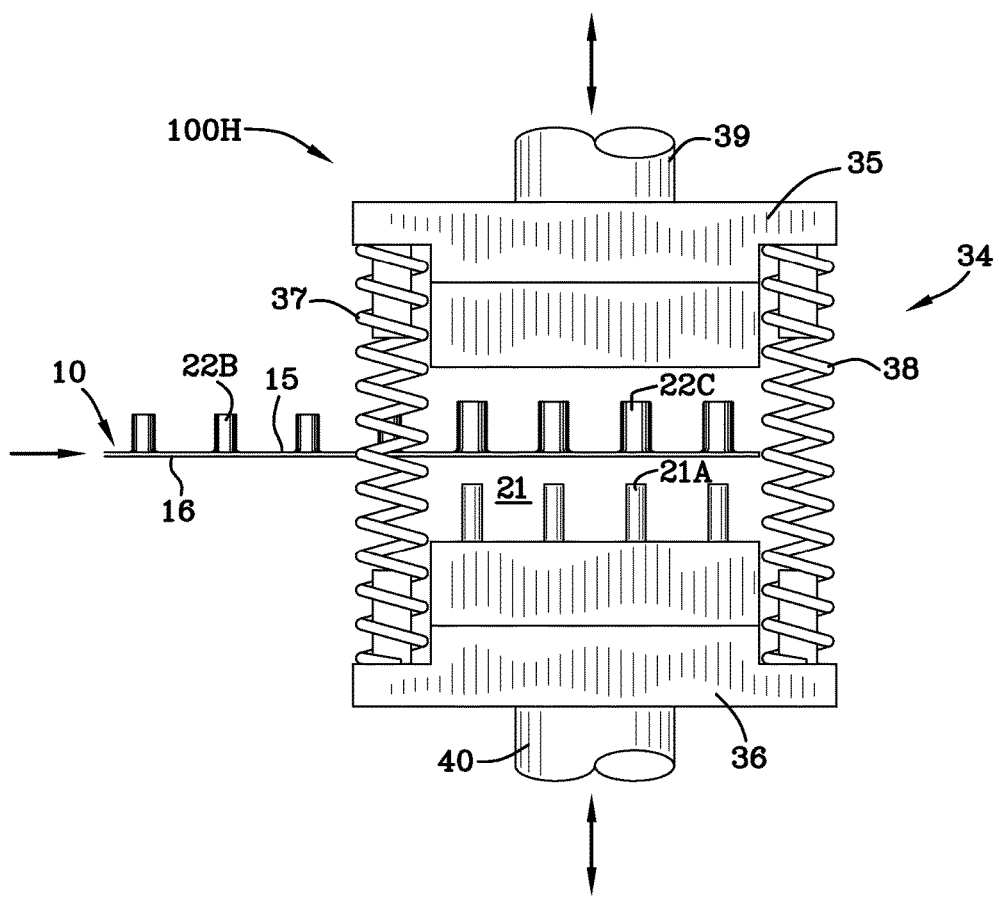
FIG. 1H schematically illustrates a die press at a fourth die station as operating on the strip of metal after it has left the position of FIG. 1F in the condition of FIG. 1G.
Figure 1I:
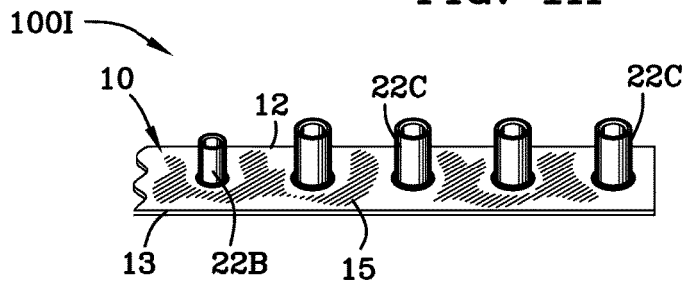
FIG. 1I is a schematic isometric illustration of the end of the strip of metal as operated on in the press of FIG. 1H.

The metal strip is next moved to a fourth die station 21 where dies 21A produce the final cylindrical shape 22C shown in FIGS. 1H and 1I. FIG. 1H is a view 100H illustrating a die press at a fourth die station 21 as operating on the strip of metal 10 after it has left the position of FIG. 1F in the condition of FIG. 1G. FIG. 1I is an isometric illustration 100I of the end of the strip of metal as operated on in the press of FIG. 1H.

Figure 2:
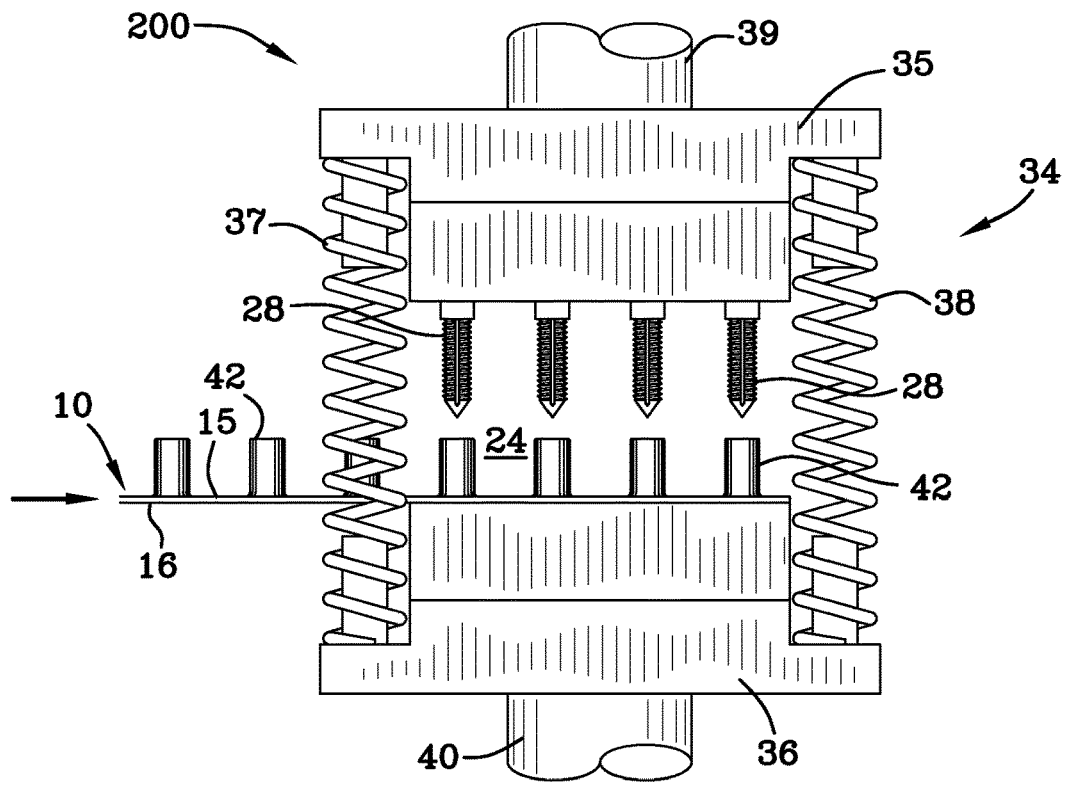
FIGS. 2, 2A and 2B schematically illustrate a fifth die station at which the cylindrical members produced at the previous stations are tapped and provided with threads.
Figure 2A:
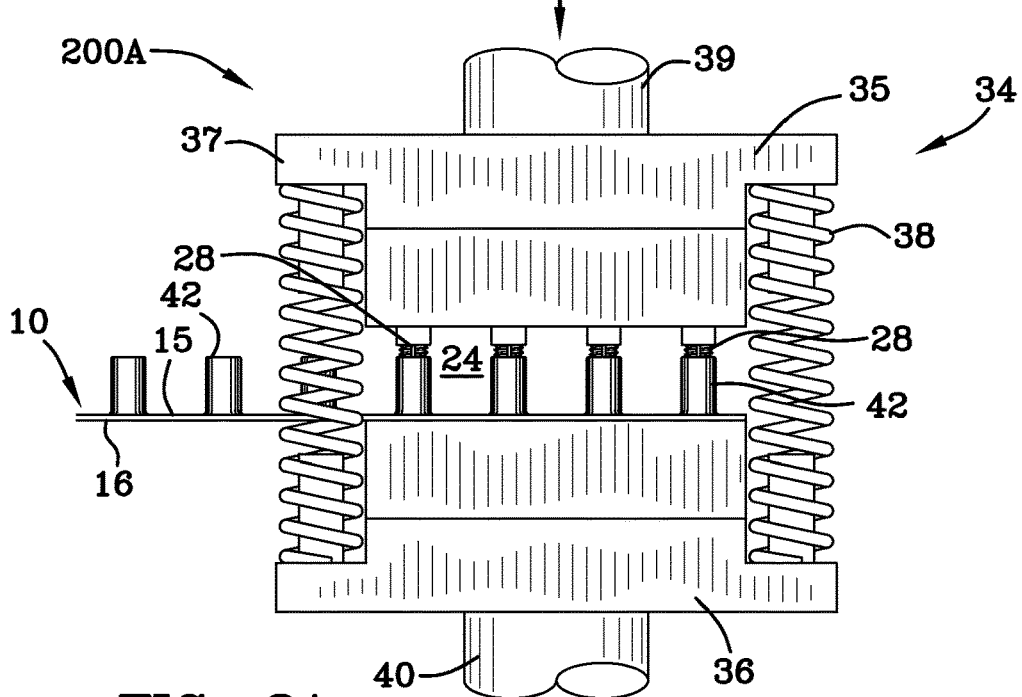
Figure 2B:
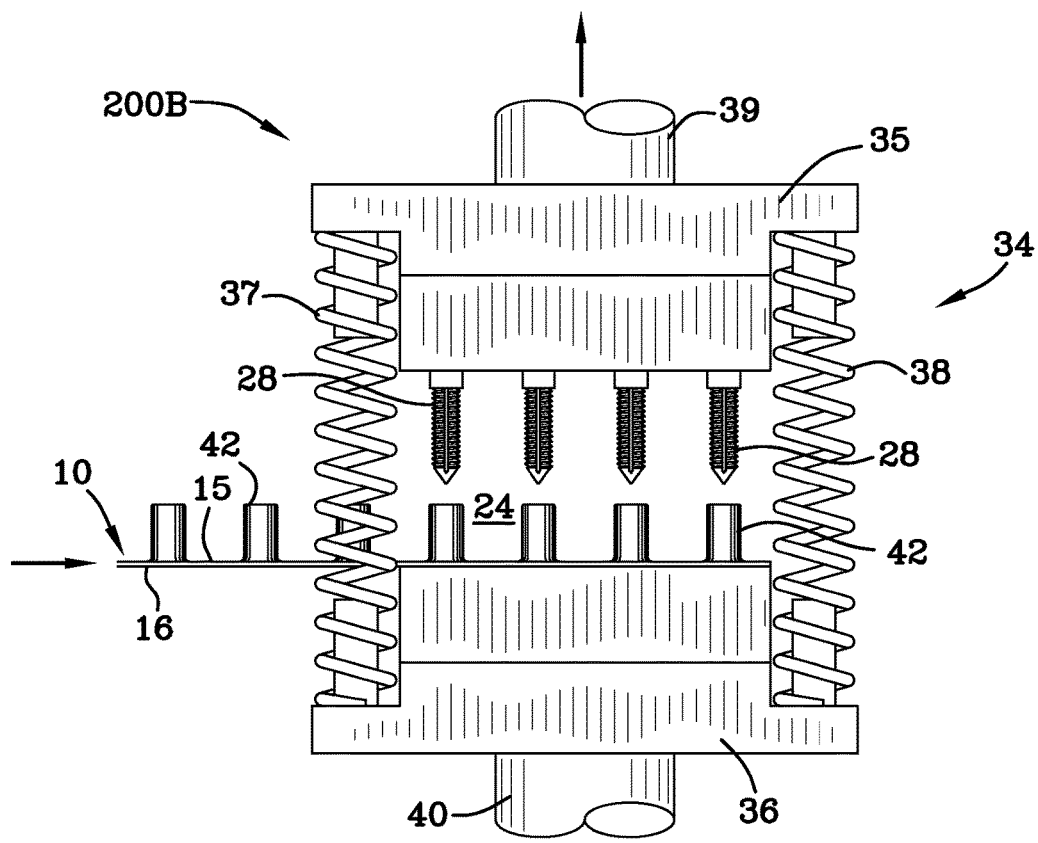
Figure 2C:
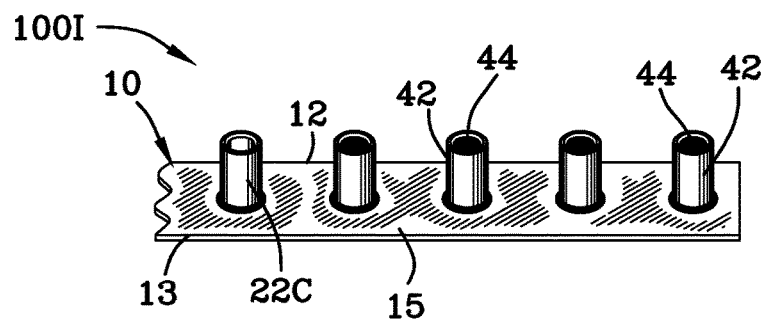
FIG. 2C is a schematic isometric illustration of the end of the strip of metal as operated on at the fifth die station of FIG. 2B.

The strip of metal with the linearly spaced cylindrical members 22C is next moved to a fifth station 24 where taps 28 are provided and are moved axially into members 22C to provide internal threads 44 thereon and produce the internally threaded members now identified at 42. FIGS. 2, 2A and 2B illustrate 200, 200A, 200B, a fifth die station 24 at which the cylindrical members 42 produced at the previous stations are tapped and provided with threads. FIGS. 2, 2A and 2B illustrate successive steps 200, 200A, 200B in tapping the internal threads within the cylindrical members 42. FIG. 2C is an isometric illustration 200C of the end of the strip of metal as operated on at the fifth die station of FIG. 2B.

Figure 3:
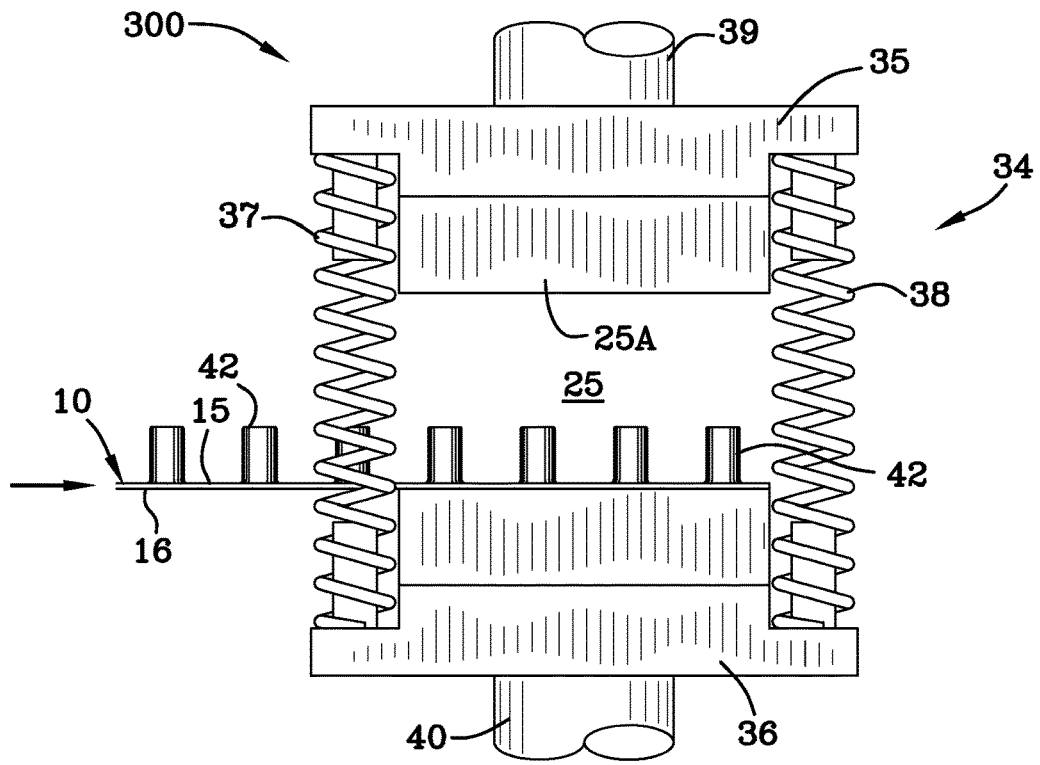
FIGS. 3, 3A and 3B schematically illustrate a sixth station at which the strip of metal between the formed cylindrical members is die cut to produce the heads on the T-Nuts and produce various flange features such as attachment prongs as shown in FIG. 3B.
Figure 3A:
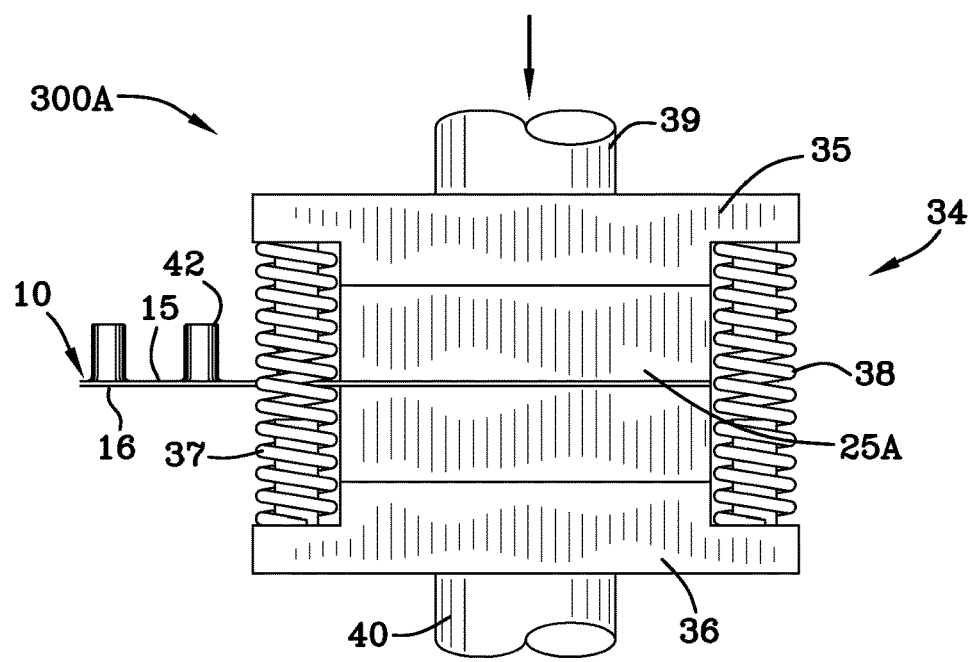
Figure 3B:
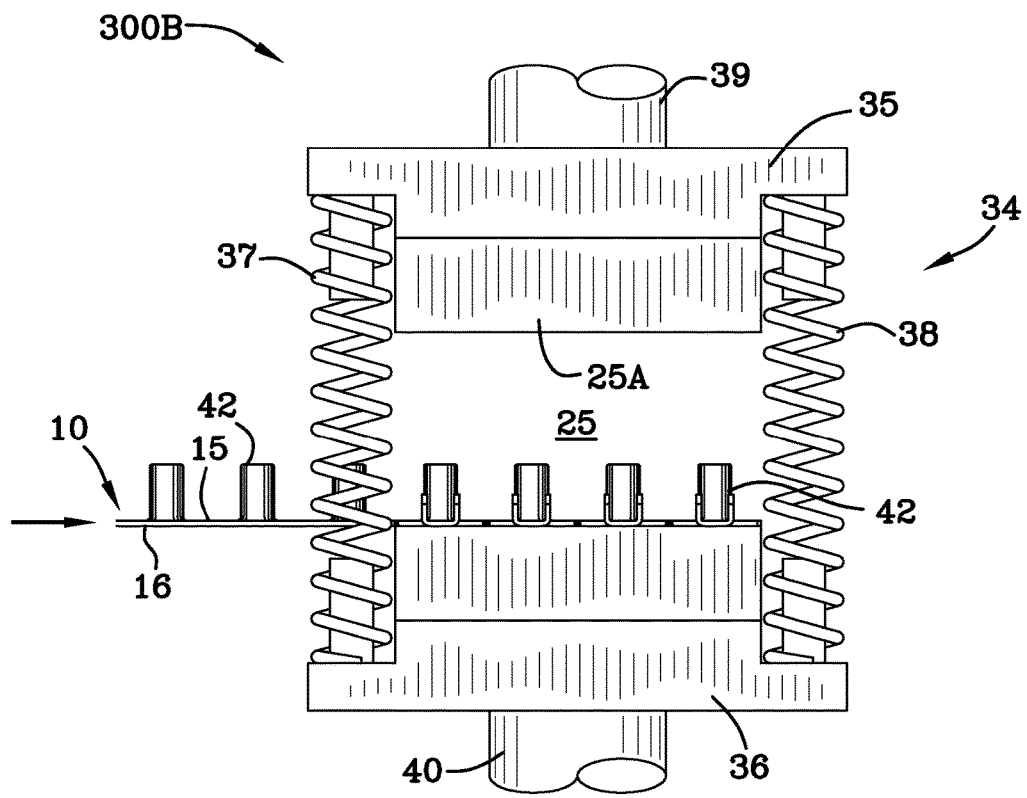
Figure 3C:
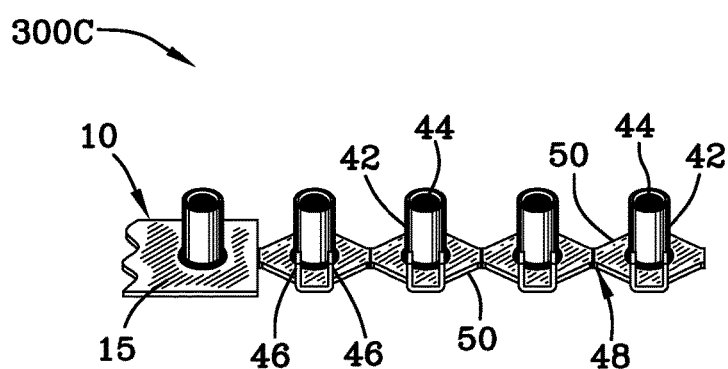
FIG. 3C is a schematic isometric illustration of the end of the strip of metal as operated on at the sixth die station of FIG. 3B.

The next step in the process of producing the collated T-Nut construction of the invention is to die cut the flanged head construction of the nut and to produce any desired flange or attachment feature. To this end, the metal strip 10 is moved to a sixth station 25 where a die 25A, not shown in any specific configuration, but which has a pattern corresponding to the shape produced thereby, produces strip 33 of the finished and integrally connected T-Nuts 33 referred to above in this description. The die 25A takes the necessary configuration to produce T-Nuts as illustrated in FIGS. 4, 6, 7, 8, 9, 10, 11, 14, 15, 16, 17, 18, and 19. Other configurations not shown in FIGS. 4, 6, 7, 8, 9, 10, 11, 14, 15, 16, 17, 18, and 19 are specifically contemplated. FIGS. 3, 3A and 3B are view 300, 300A, 300B, respectively, illustrating a sixth station 25 at which the strip of metal 10 between the formed cylindrical members is die cut to produce the flanged heads on the T-Nuts and produce various flange features such as attachment prongs as shown in FIGS. 3B and 3C. FIG. 3C is an isometric illustration 300C of the end of the strip of metal 10 as operated on at the sixth die station of FIG. 3B.

The finished and completed strip 33 includes the collated T-Nuts which comprise the spaced cylindrically shaped members 42 which are internally threaded at 44 and which have flanged heads 50 with attachment prongs 46 formed at a position which can be said to be at the first and second side portions 12, 13 of the metal strip 10. A frangible portion 48 is formed in the die cutting operation of FIGS. 3, 3A and 3B and serves to define the interconnection between adjacent T-Nuts. A carry tab from each adjacent T-Nut of the strip is connected to the frangible portion. The frangible portion is of such thickness and strength to keep the plurality of T-Nuts connected in shipment and when otherwise being moved and handled. The frangible portion is also of a thickness and strength that it can conveniently be severed from the strip enabling installation in its ultimate place of use, for instance, in an opening in a substrate.

FIG. 4 is an isometric illustration 400 similar to FIG. 3B showing a slightly longer length of the connected and formed T-Nuts and which is slightly enlarged for detail. FIG. 4A is an enlarged portion 400A of FIG. 4 illustrating the carry tabs and frangible portion 48 thereof between adjacent T-Nuts. Frangible portion 48 is the location at which the adjacent T-Nuts will be severed. Carry tabs 92A, 92B are illustrated on either side of frangible portion 48. FIG. 4B is a plan view 400B of FIG. 4. FIG. 4C is an elevational view 400C of FIG. 4B. FIG. 4D is an end view 400D of FIG. 4C. Arrow 93 in FIG. 4 indicates the interconnection between adjacent T-Nuts. A frangible portion 48 in combination with tabs 92A, 92B join adjacent T-Nuts together. Sometimes the tabs 92A, 92B are referred to herein as carry tabs. Carry tabs 92A, 92B and the frangible portion 48 thereof are used to join the T-Nuts together and enable further processing of the T-Nuts and installation of the T-Nuts into a substrate. FIG. 4A is an enlargement 400A of the frangible portion 48 which illustrates slot 90 in the upper portion of the frangible portion and vertical slots 91, 91 on both sides of the frangible portion. FIG. 4E is an enlargement 400E of the side portion of FIG. 4C illustrating vertical slot 91 in the frangible portion 48.

Figure 5:
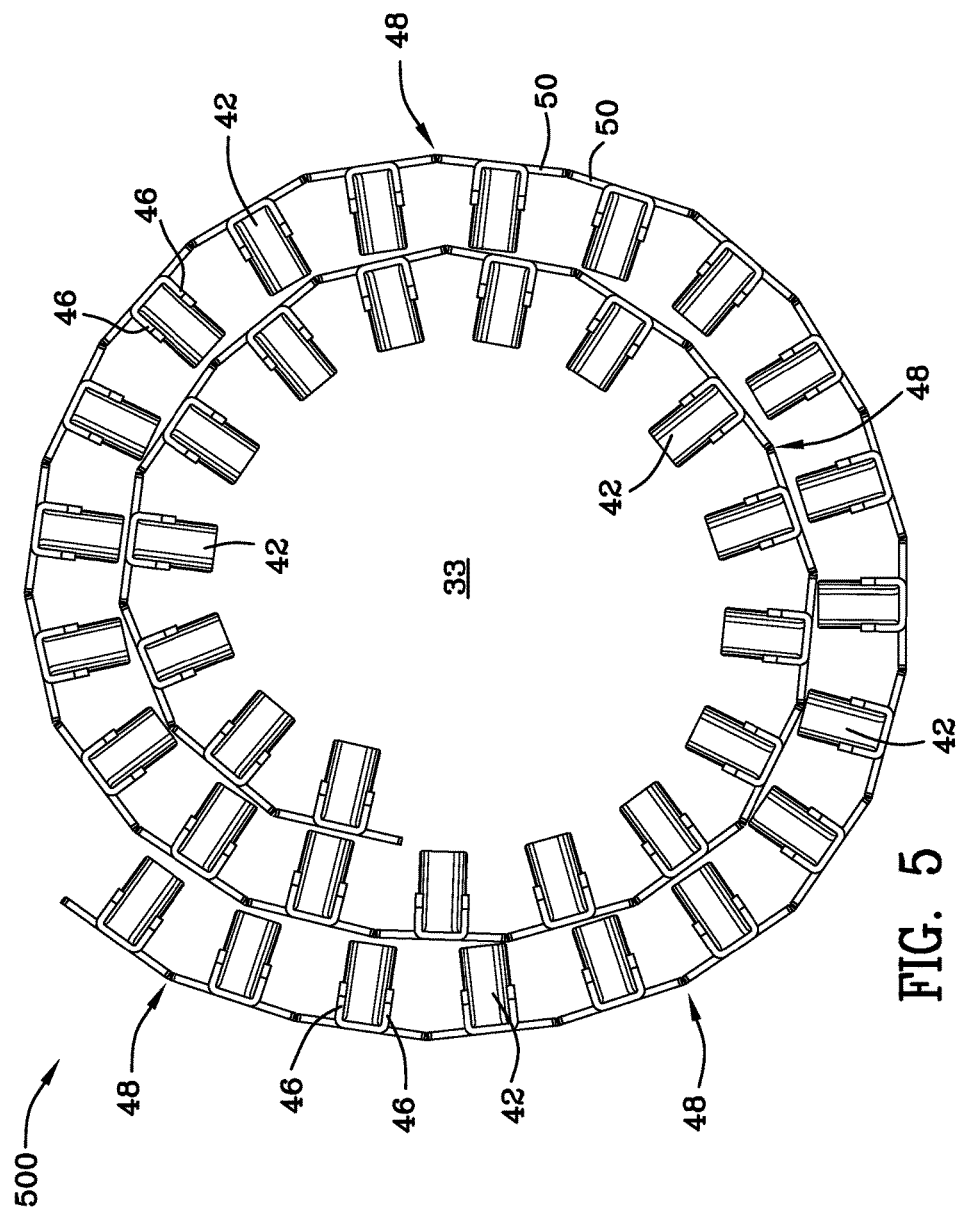
FIG. 5 is a schematic view illustrating the length of integrally connected T-Nuts as shown in FIGS. 4 through 4D as wound into a helical configuration for ease in shipping and/or manufacturing.
Figure 5A:
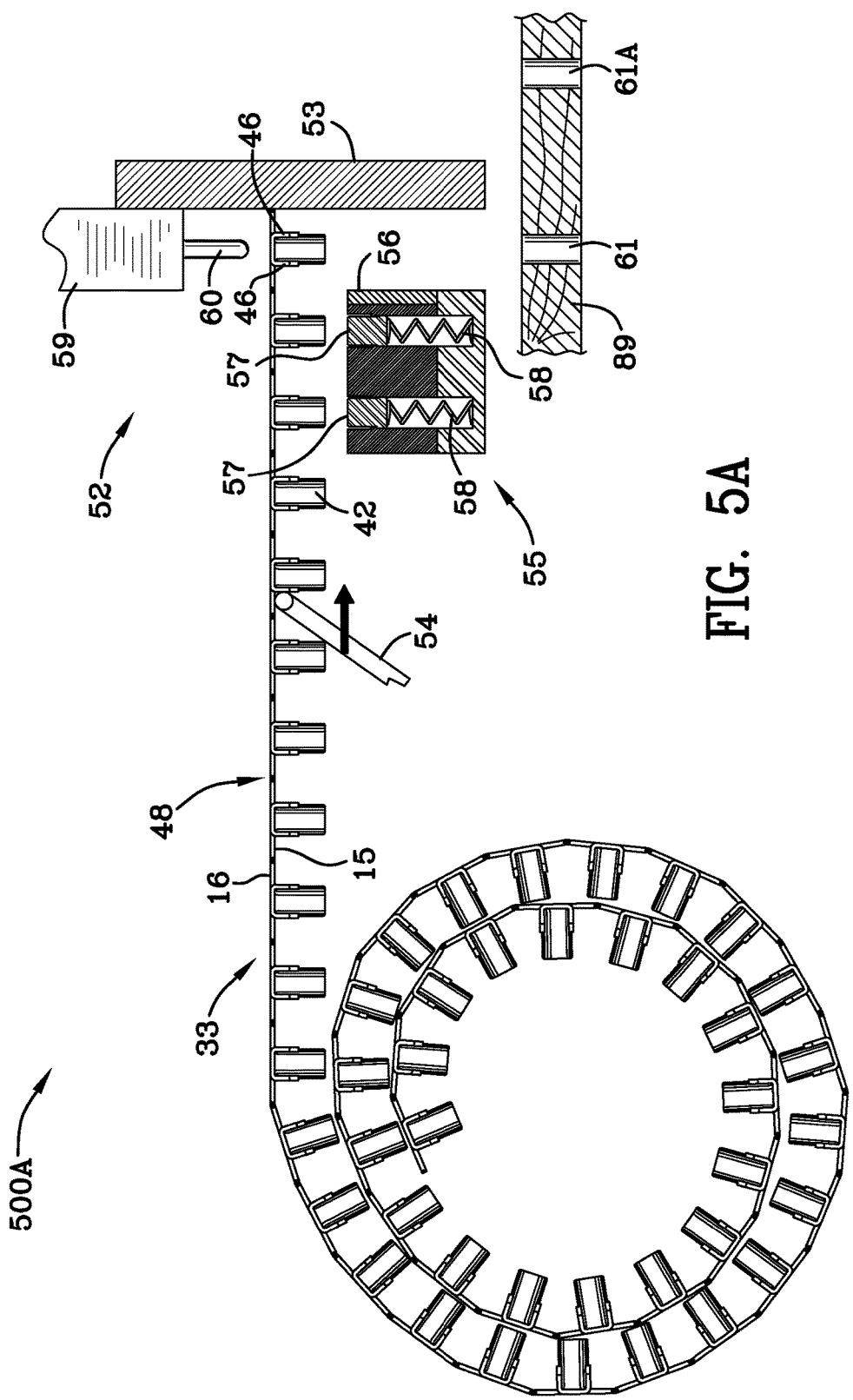
FIG. 5A is a schematic view of the T-Nuts shown in FIG. 5 in connection with one example of an apparatus to sever the endmost T-Nut from its strip and in position to be installed in a substrate.
Figure 5B:
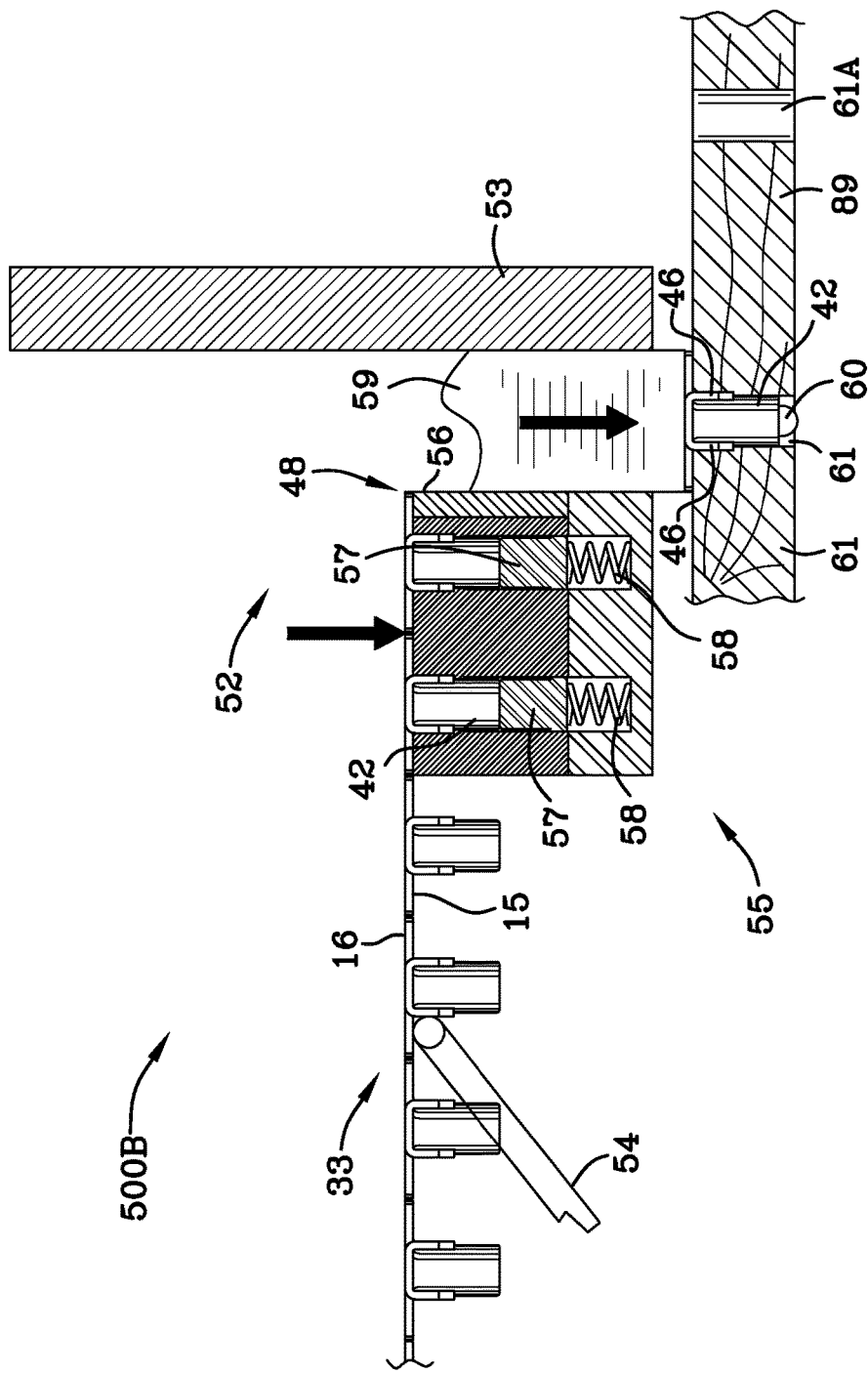
FIG. 5B is a schematic view of the apparatus of FIG. 5A severing the endmost T-Nut from its strip and placing it in an aperture in a substrate.
Figure 5C:
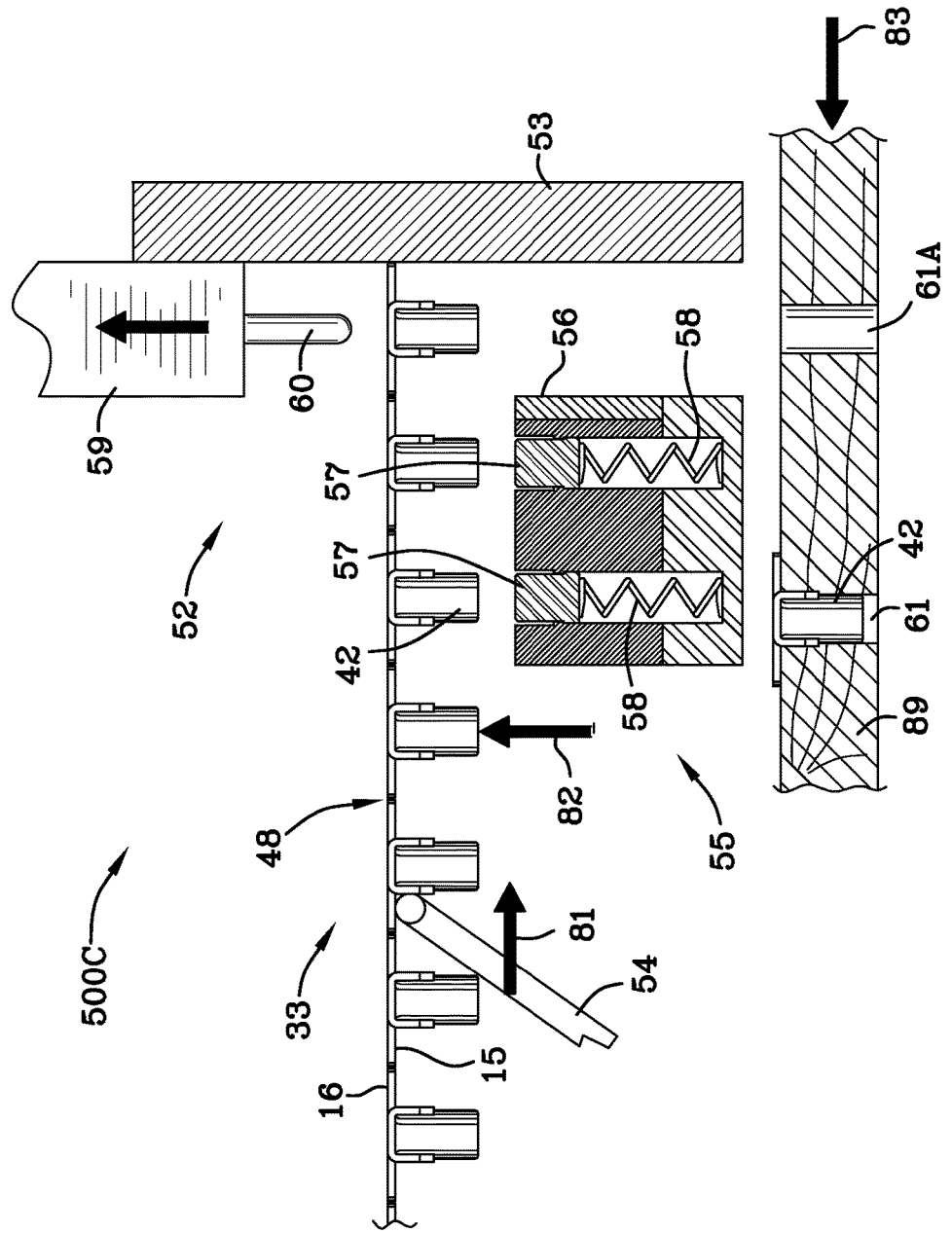
FIG. 5C is a schematic view of the apparatus of FIG. 5B moved back in position to install another T-Nut from the end of the strip into another aperture in a substrate.

FIG. 5 is a view 500 illustrating a length of integrally connected T-Nuts as shown in FIGS. 4 through 4E as wound into a helical configuration for ease in shipping and/or handling for further processing. FIG. 5A is a view 500A of the T-Nuts shown in FIG. 5 in connection with one example of an apparatus to sever the endmost T-Nut from completed strip 33 and position the endmost T-Nut for installation in a substrate. FIG. 5B is a view 500B of the apparatus of FIG. 5A severing the endmost T-Nut from its strip 33 and placing it in an aperture in a substrate. FIG. 5C is a view 500C of the apparatus of FIG. 5B moved back in position to install another T-Nut from the end of the strip into another aperture in a substrate.

Referring again to FIG. 5, the strip 33 of T-Nuts is wound in a helical pattern for shipment or to be placed on a mandrel in a manufacturing operation of placing the individual T-Nuts into a substrate to receive and hold a support screw in a fastener application. The frangible portion 48 enables the coil to be wound more readily because the frangible portion is a weakened portion. Because the frangible portion 48 is narrow in cross-section it is easily bent enabling a long strip 33 of T-Nuts to be wound in a coil. The frangible portion 48 need not include a slot or slit therein. See FIGS. 14, 15, 16, 17, 18 and 19. Coils having approximately 1100 T-Nuts can be wound and are stable.

FIGS. 5A, 5B and 5C are views 500A, 500B, 500C, respectively, illustrating the apparatus and method of use of the completed strip 33 of helically wound T-Nuts shown in FIG. 5. The apparatus includes a shearing station 52 and has a positioning abutment 53 adapted to engage and position the end of the strip 33 which is driven into the position of FIG. 5A by an advancement finger 54 which pivots on a torsion spring driven by a pneumatic cylinder, not shown. A shearing blade assembly 55 is located below the end of the strip 33 and includes a blade 56, and guide cylinders 57, each of which are biased upwardly by springs 58.

A shearing ram 59 is positioned above the end of strip 33 and has a guide finger 60 which is adapted to fit into the opening in the endmost T-Nut. The two T-Nuts next adjacent the endmost T-Nut are adapted to fit into and be supported by the guide cylinders 57 during a shearing operation by the downward movement of ram 59 causing the tab 48 of the endmost T-Nut to engage blade 56 and to be severed from the strip. The finger 60 carries the severed T-Nut to an opening 61 in a substrate 89 where it is to reside. The ram 59 is then returned to the position of FIG. 5C preparatory to another cycle. Reference numeral 81 signifies the horizontal movement of the continuous strip of T-Nuts, reference numeral 82 indicates the vertical movement of the continuous strip of T-Nuts, and reference numeral 83 indicates the horizontal movement of the substrate 89.

Figure 5E:
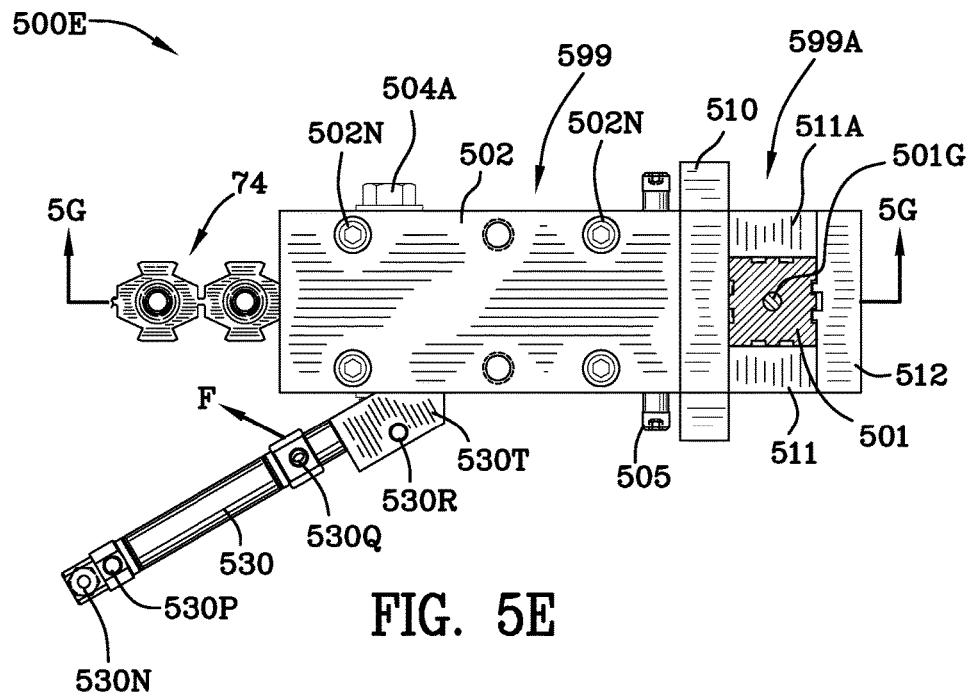
FIG. 5E is a schematic top view of a strip of collated T-Nuts in combination with the another example of an apparatus (an escapement) to sever the endmost T-Nut from its strip.
Figure 5D:
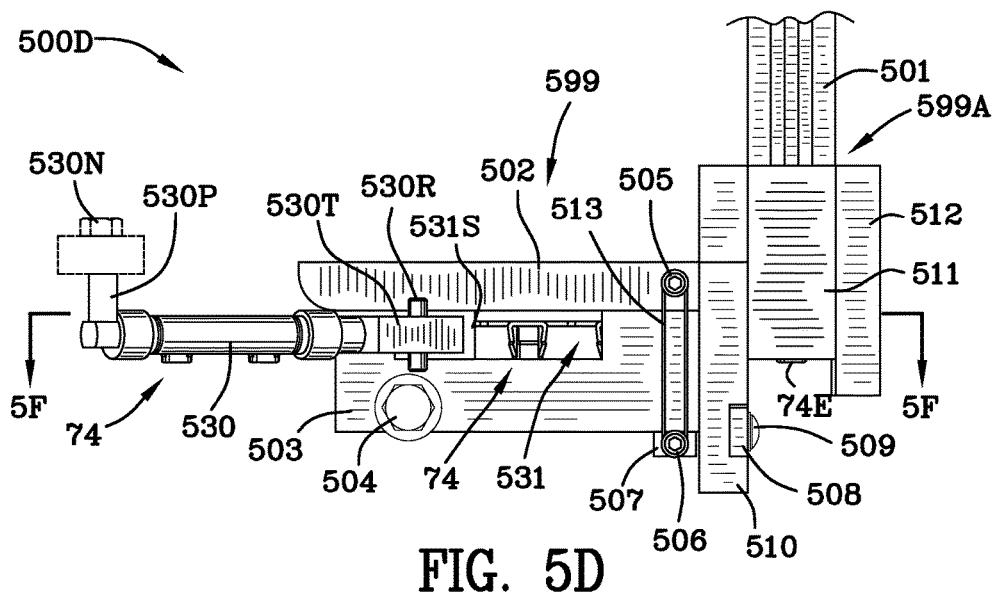
FIG. 5D is a schematic side view of a strip of collated T-Nuts in combination with another example of an apparatus (an escapement) to sever the endmost T-Nut from its strip.

Another apparatus for severing a T-Nut from the end of a strip of T-Nuts is disclosed in FIGS. 5D to 5J, and 5L. FIG. 5D is a schematic side view 500D of a strip 74 of collated T-Nuts in combination with another example of an apparatus 599 (an escapement) to sever the endmost T-Nut 74E from its strip 74. See FIG. 5K which is a schematic side view 500K of a coiled roll 598 of T-Nuts wound around core 597 with the barrels 142 oriented radially outwardly. The continuous strip 74 of T-Nuts is easily wound as the frangible portions 148 between carry tabs and flanges 150, 150 of adjacent T-Nuts is bendable without severing the adjacent T-Nuts from each other. Each T-Nut includes a barrel 142, a plurality of prongs 169A, 169B, 169C and 169D, a flange 150, carry tabs 194A, 194B, and a frangible portion 148 connected to adjacent T-Nuts.

Figure 5F:
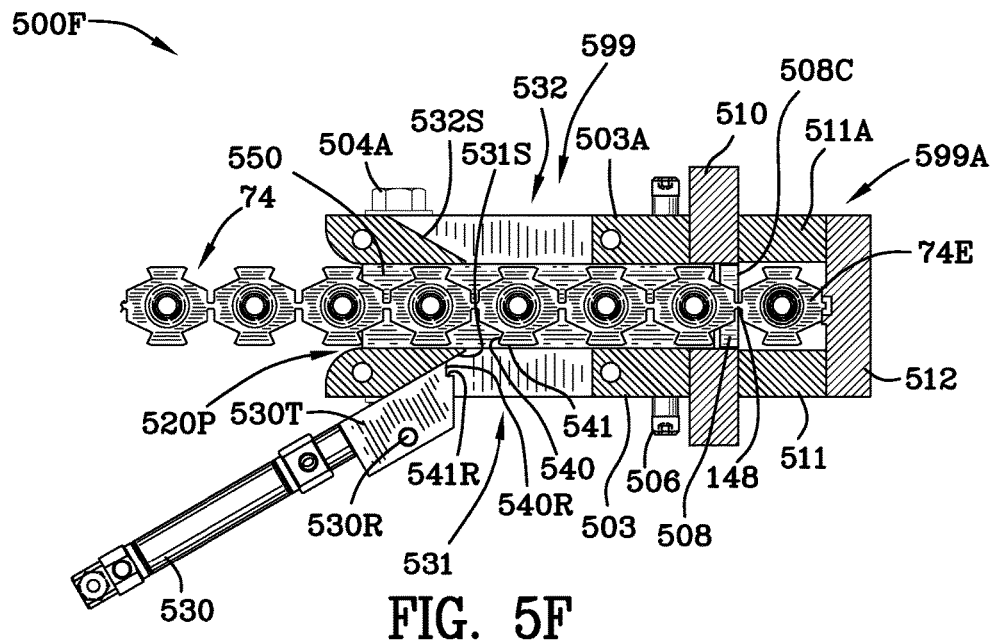
FIG. 5F is a schematic cross-sectional view of a strip of collated T-Nuts in combination with the another example of an apparatus (an escapement) to sever the endmost T-Nut from its strip taken along the lines 5F-5F of FIG. 5D illustrating the piston (shearing inbody) and the tool for advancing the strip, and, illustrating the endmost T-Nut in the chamber for separation from the strip.
Figure 5G:
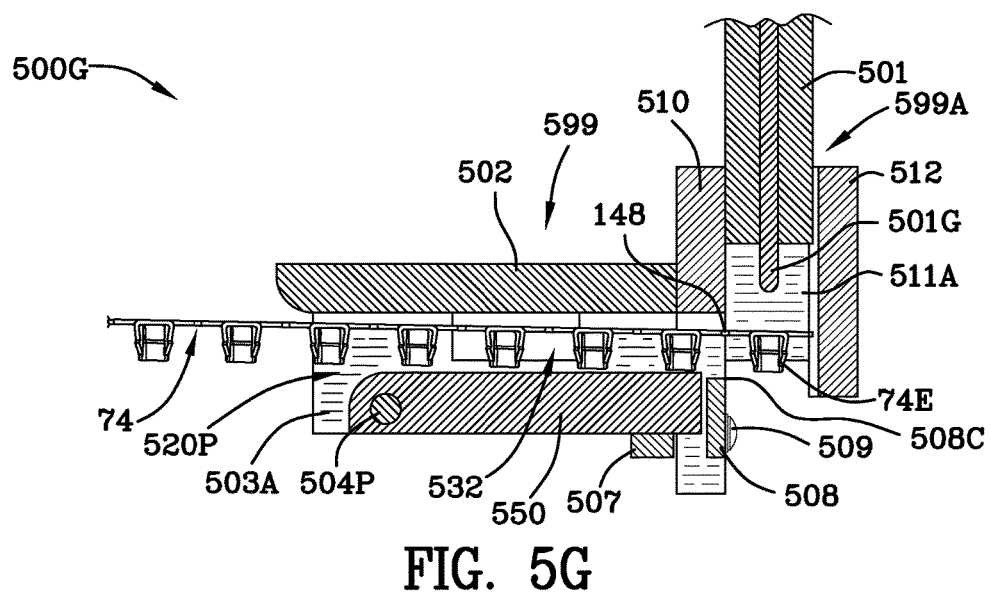
FIG. 5G is a schematic cross-sectional view of a strip of collated T-Nuts in combination with the another example of an apparatus (an escapement) to sever the endmost T-Nut from its strip taken along the lines of 5G-5G of FIG. 5E illustrating the endmost T-Nut in the chamber for separation from the strip and the shearing inbody (piston) and guide aligned with the endmost T-Nut.
Figure 5H:
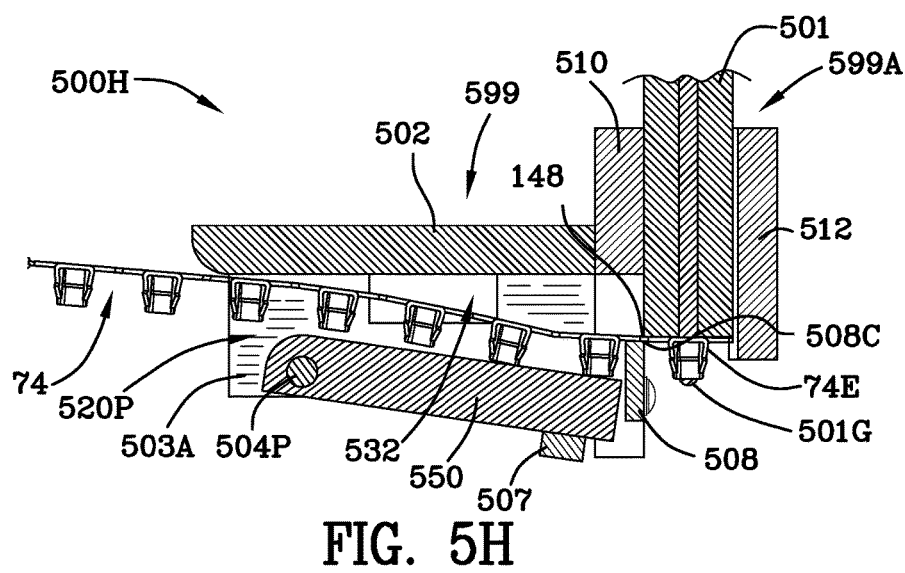
FIG. 5H is a schematic cross-sectional view of a strip of collated T-Nuts in combination with the another example of an apparatus (an escapement) to sever the endmost T-Nut from its strip illustrating the hinged bottom plate of the escapement rotated downwardly enabling the frangible connection of the endmost T-Nut in the chamber for separation from the strip.
Figure 5I:
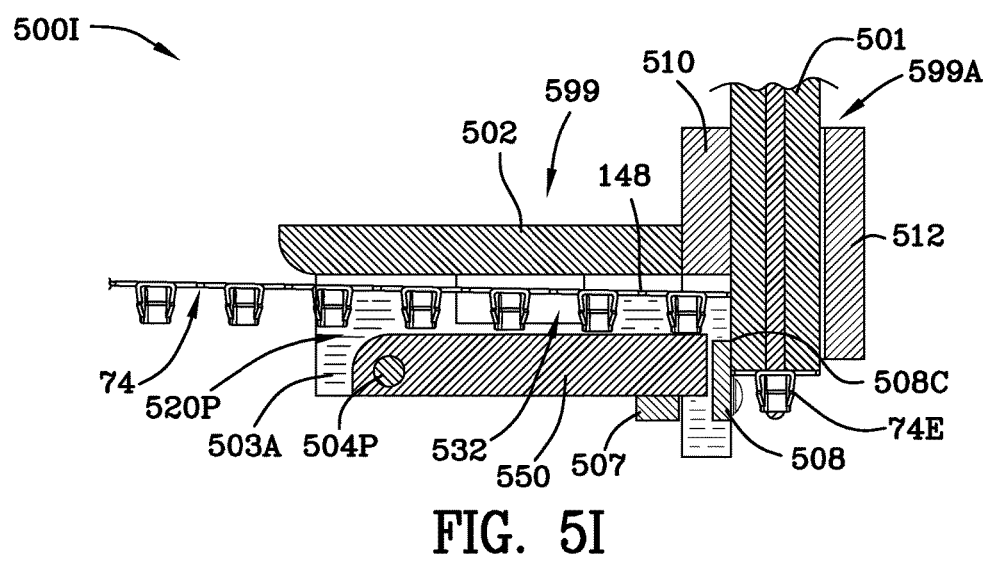
FIG. 5I is a schematic cross-sectional view of a strip of collated T-Nuts in combination with the another example of an apparatus (an escapement) to sever the endmost T-Nut from its strip illustrating the hinged bottom plate of the escapement returned to its home position supporting the strip of collated T-Nuts.
Figure 5J:
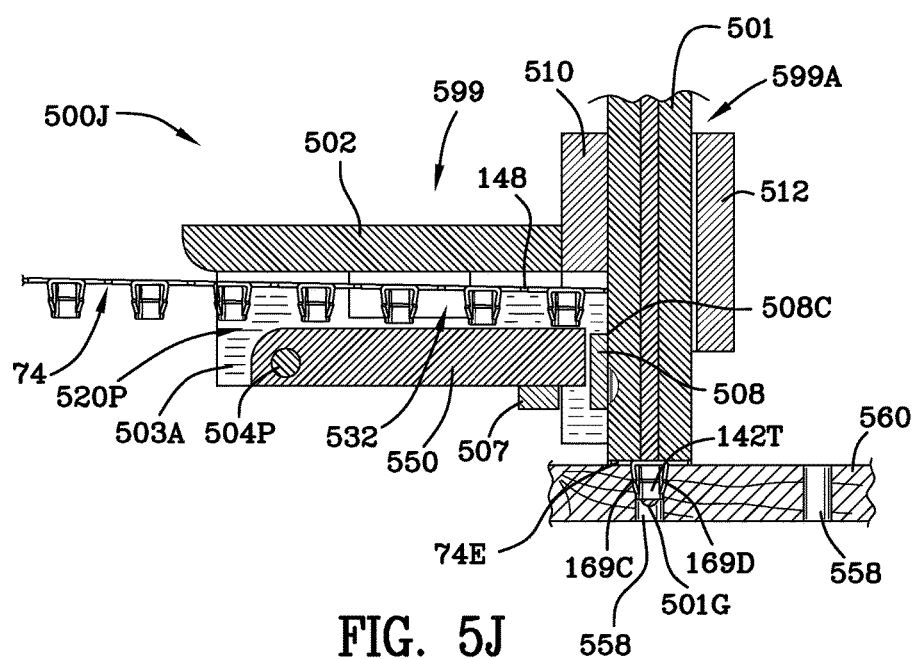
FIG. 5J is a schematic cross-sectional view of a strip of collated T-Nuts in combination with the another example of an apparatus (an escapement) to sever the endmost T-Nut from its strip illustrating the shearing inbody pushing and inserting the endmost T-Nut into a substrate.
Figure 5K:
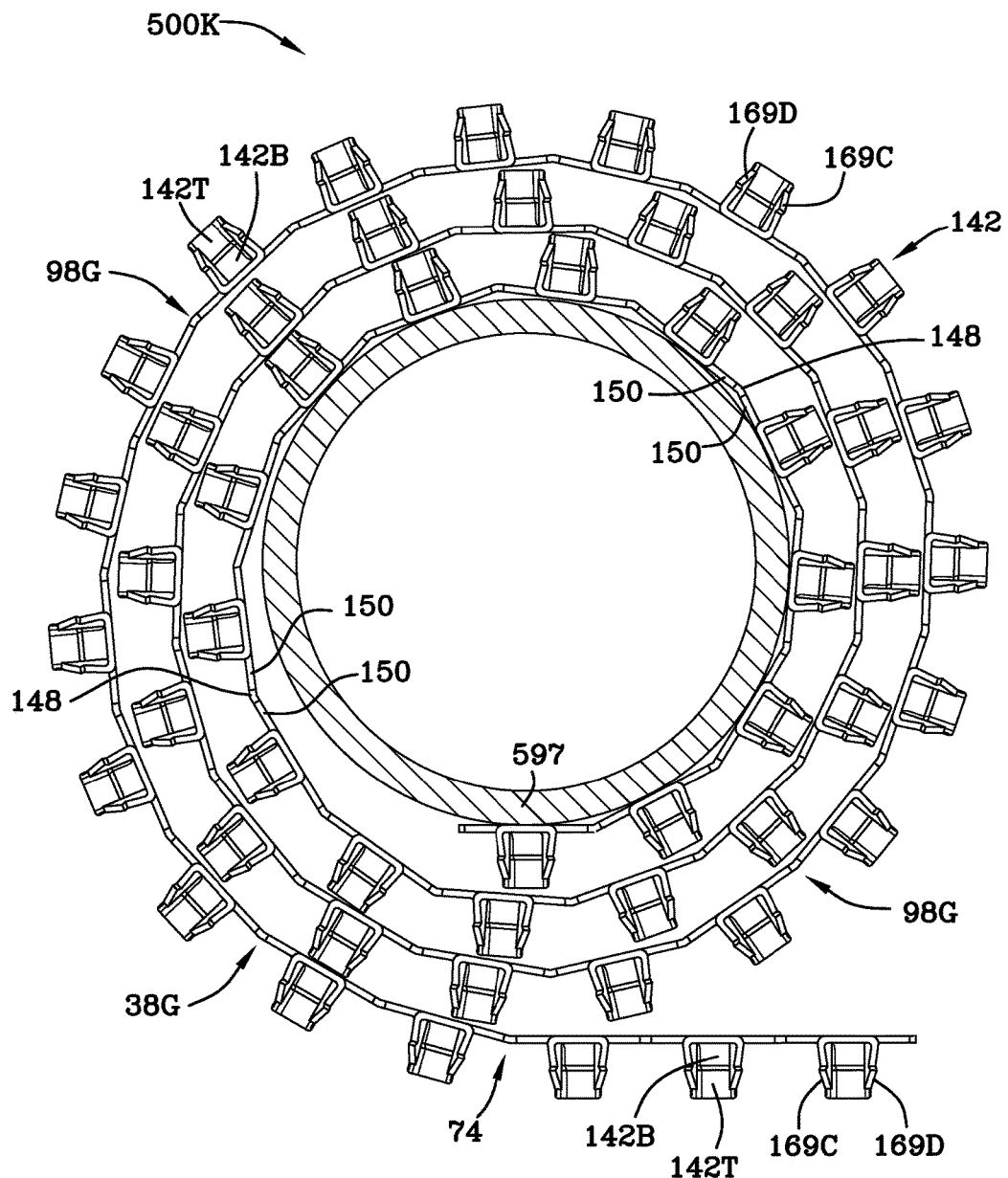
FIG. 5K is a schematic side view of a coiled roll of T-Nuts wound around core with the barrels oriented radially outwardly.

A common strip 74 of metal includes a plurality of T-Nuts thereon as illustrated in FIG. 5K. The strip 74 is fed into an escapement 599. Referring to FIGS. 5D, 5E, 5F, 5G, 5H and 5I, strip 74 includes a plurality of T-Nuts in escapement 599. Escapement 599 includes a chamber 599A where the endmost T-Nut 74E is severed.

Referring to FIG. 5D, shearing ram inbody 501 shears the endmost T-nut 74E from the strip 74 of integrally connected T-Nuts. Guide 501G of inbody 501 is illustrated in section in FIGS. 5E and 5G. Guide 501G engages the bore of the endmost T-Nut 74E in the severing process.

FIG. 5E is a schematic top view 500E of the strip 74 of collated T-Nuts in combination with the another example of an apparatus 599 (an escapement) to sever the endmost T-Nut 74E from its strip.

FIG. 5G is a schematic cross-sectional view 500G of the strip 74 of collated T-Nuts in combination with the another example of an apparatus 599 (an escapement) to sever the endmost T-Nut 74E from its strip 74 taken along the lines of 5G-5G of FIG. 5E illustrating the endmost T-Nut 74E in the chamber 599A for separation from the strip 74 and the shearing inbody 501 and guide 501G aligned with the endmost T-Nut 74E.

Figure 5L:
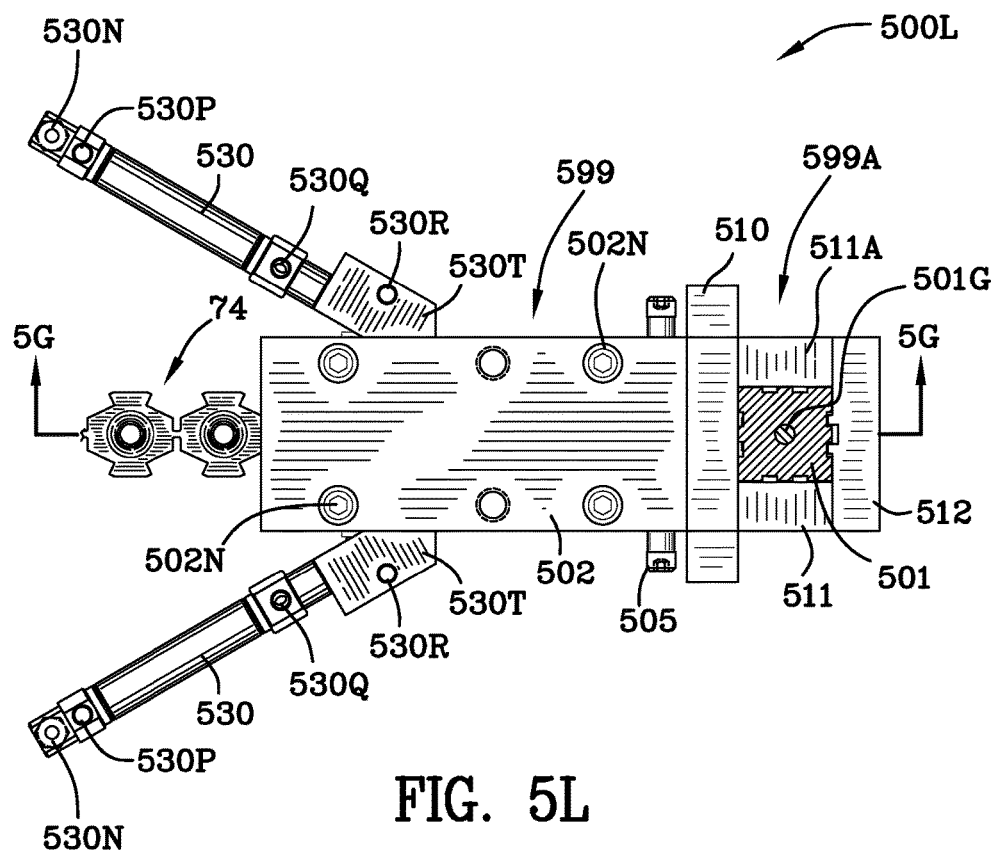
FIG. 5L is similar to FIG. 5E with the exception being that two pistons are illustrated for urging the T-Nuts into the chamber for insertion thereafter into a substrate.

FIG. 5F is a schematic cross-sectional view 500F of the strip 74 of collated T-Nuts in combination with the another example of an apparatus 599 (an escapement) to sever the endmost T-Nut 74E from its strip taken along the lines 5F-5F of FIG. 5D illustrating the piston 530 and the gripping tool 530T for advancing the strip 74, and, illustrating the endmost T-Nut 74E in the chamber 599A for separation from the strip 74. FIG. 5L is similar to FIG. 5E with the addition of a second piston 530A which resides in slot 532. See FIG. 5D for an illustration of open slot 531 in side wall 503 and open slot 532 in side wall 503A. Open slot in side wall 503 permits access of gripping tool 530T to pawls/prongs of T-Nuts on strip 74. Open slot in side wall 503A permits access of gripping tool 530T to pawls/prongs of T-Nuts on strip 74. Guiding surfaces 531S, 532S direct gripping tools 530T, 530T along side walls 503, 503A and into engagement with the prongs/pawls of the T-Nuts. Referring to FIG. 5F, surfaces 540R, 541R of tool 530T engage corresponding surfaces 540, 541 of the prong/pawl.

Gripping tool 530T resides in openings 531, 532 of the escapement and is positioned to alternately engage and disengage one pawl of the pair of pawls of one of the T-Nuts. Double acting piston 530 forcefully moves in a first direction urging the gripping tool 530T into engagement with one pawl of the pair of pawls of one of the T-Nuts urging the endmost T-Nut 74E into the chamber. See FIG. 5F. Double acting piston and the gripping tool affixed thereto retracts, in a second direction, away from and out of engagement with the one pawl of the pair of pawls of one of the T-Nuts of the plurality of T-Nuts of the common strip of T-Nuts.

Referring to FIGS. 5D and 5E, rod 530R of tool 530T is illustrated. When piston 530 is extended in the first direction toward the strip 74 of T-Nuts for engagement therewith, rod 530R is in sliding engagement with side wall 503 and pivots the arm clockwise when viewing FIGS. 5E and 5F against the force, F, applied by a spring. The spring operates between the piston 530 and a point affixed to the frame of which the escapement is a part thereof. Piston 530 pivots about shaft 530P and nut 530N is affixed to the shaft and rotates therewith. Pressure ports 530P, 530Q are illustrated in FIG. 5E and supply pressure to the double acting piston 530. Double acting piston 530 extends the gripping tool 530T in a first direction toward the strip 74 of T-Nuts and into engagement therewith. Double acting piston 530 also retracts the gripping tool 530T away from the strip 74 of T-Nuts. Force, F, of the spring or other biasing member such as an elastic band, ensures the proper orientation of the gripping tool 530T. Gripping tool 530T is affixed to a shaft of the piston and is moveable therewith.

Referring to FIGS. 5D and 5E, upper portion 502 and side wall 503 of the escapement is illustrated. FIG. 5F illustrates side wall 503A. Side walls 503, 503A are affixed to upper portion 502 of escapement 599. Bolts 502N illustrated in FIG. 5E affix the upper portion 502 of the escapement 599 to side walls 503, 503A. Hinged bottom of escapement 550 is illustrated in FIGS. 5F and 5G and fits substantially within walls 503, 503A. Hinged bottom 550 rotates about pivot 504P shown in FIG. 5G. Nuts 504, 504A shown in FIGS. 5D and 5F secure the pivot 504P to side walls 503, 503A. Referring to FIG. 5D, lower portion 507 of the hinged bottom 550 is illustrated. Lower pin 506 is affixed to the hinged bottom 550. Upper pin 505 is affixed to upper portion 502 of the escapement. Elastic band 531 operates between upper pin 505 and lower pin 506 and serves to restrain the rotation of the hinged bottom unless the strip 74 of T-Nuts is under the force of shearing inbody 501 as illustrated in FIG. 5H.

FIG. 5H is a schematic cross-sectional view 500H of a strip 74 of collated T-Nuts in combination with the another example of an apparatus 599 (an escapement) to sever the endmost T-Nut 74E from its strip illustrating the hinged bottom plate 550 of the escapement 599 rotated downwardly enabling the frangible connection 148 of the endmost T-Nut 74E in the chamber 599A to be separated from the strip 74. Chamber 599A includes plates 510, 511, 511A, 512 which form a square in cross-section. Other geometric chamber forms could be used, for example, rectangular, circular, etc. and other geometric shearing inbody forms could be used. The square shape has been found to sever the frangible connections 148 well.

FIG. 5I is a schematic cross-sectional view 500I of a strip 74 of collated T-Nuts in combination with the another example of an apparatus 599 (an escapement) to sever the endmost T-Nut 74E from its strip illustrating the hinged bottom plate 550 of the escapement 599 returned to its home position (first position) supporting the strip 74 of collated T-Nuts. FIG. 5J is a schematic cross-sectional view 500J of a strip 74 of collated T-Nuts in combination with another example of an apparatus 599 (an escapement) to sever the endmost T-Nut 74E from its strip 74 illustrating the shearing inbody 501 pushing and inserting the endmost T-Nut 74E into an opening 558 substrate 560. After the endmost T-Nut 74E has been fully inserted in the opening 558, the shearing inbody 501 is retracted to its home position (upper position) as illustrated in FIG. 5G above the strip 74 of T-Nuts. Shearing inbody 501, when moved from its lower position to its upper position, is then ready for another cycle of shearing and inserting the endmost T-Nut. The shearing inbody 501 is driven by a piston (not shown) and the action of the shearing inbody and the piston 530 is coordinated to properly deliver the endmost T-Nut to the chamber 599A at the appropriate time.

Referring to FIGS. 5D, 5F, 5G, 5H, 5I and 5J, cutting blade 508 is illustrated. In FIG. 5F, endmost T-Nut 74E is illustrated in chamber 599A. Frangible portion 148 connecting the endmost T-Nut with the next adjacent T-Nut is positioned in alignment with cutting surface 508C of cutting blade 508. In FIG. 5G, frangible portion 148 is aligned with cutting surface 508C of the cutting blade 508. Cutting blade 508 is affixed to plate 510 by bolt 509. In FIG. 5H, shearing inbody 501 is illustrated in engagement with the endmost T-Nut 74E pushing it downwardly and, simultaneously, shearing inbody pushes the adjacent T-Nut and the next several T-nuts downwardly against the bottom plate 550 of the escapement. Frangible portions 148 of the T-Nuts do not break apart or sever as viewed in FIG. 5H. Rather, the frangible portions are sufficiently strong so as to not separate when the shearing inbody (piston) 501 engages the endmost T-Nut 74E and pushes it down to the cutting surface 508C of the cutting blade 508. The force applied to the bottom plate 550 is resisted by the elastic band 513 illustrated in FIG. 5D. As bottom plate 550 rotates clockwise about pivot 504P, the elastic band stretches due to the force being applied to the strip 74 of T-Nuts by the shearing inbody 501. Once the frangible interconnection is broken or severed, then the strip 74 of T-Nuts and the bottom plate 550 are repositioned under the force of the elastic band 513 to an initial or home position as illustrated in FIG. 5I. Referring to FIGS. 5F and 5G, passageway 520P for strip 74 is illustrated and is formed by the upper portion 502, sidewalls 503, 503A and the pivotal bottom plate or portion 550.

FIGS. 6 through 11, and 14 through 19, illustrate various configurations of the collated strip 62, 64, 88, 68, 70, and 72 of integrally connected T-Nuts. All of these examples are made in accord with the teachings of the present invention. FIGS. 6, 6A, 6B and 6C are views 600, 600A, 600B and 600C, respectively, of another configuration of T-Nuts made in accordance with the present invention. FIG. 6 illustrates a strip of collated T-Nuts 62 with an oblong-shaped flanged head with a frangible connection portion 48A. The oblong-shaped flanged head is provided with holes 63 which provide a secondary support means for affixation to a substrate 89. Arrow 93A in FIG. 6 indicates the interconnection between adjacent T-Nuts. A frangible portion 48A in combination with carry tabs 94A, 94B join adjacent T-Nuts together enabling further processing. Carry tabs 94A, 94B and frangible portion 48A are used to join the T-Nuts together and enable further processing of the T-Nuts and installation of the T-Nuts into a substrate. FIG. 6D is an enlargement 600D of the frangible portion 48A which illustrates slot 90A in the upper portion of the frangible portion and vertical slots 91A, 91A on both sides of the frangible portion.

FIGS. 7, 7A, 7B and 7C are views 700, 700A, 700B and 700C, respectively, of a further configuration or example of T-Nuts made in accordance with the present invention with a frangible connection portion 48B. FIG. 7 illustrates a further variation in the head shape that can be applied to the strip 64 of collated T-Nuts and illustrates the provision of skives 65 on the exterior of the cylindrical shapes which enable the T-Nut to be more firmly attached to the substrate to which it is applied. Arrow 93B in FIG. 7 indicates the interconnection between adjacent T-Nuts. A frangible portion 48B in combination with carry tabs 95A, 95B join adjacent T-Nuts together enabling further processing. Carry tabs 95A, 95B and frangible portion 48B are used to join the T-Nuts together and enable further processing of the T-Nuts and installation of the T-Nuts into a substrate. FIG. 7D is an enlargement 700D of the frangible portion 48B which illustrates slot 90B in the upper portion of the frangible portion 48B and vertical slots 91B, 91B on both sides of the frangible portion.

FIGS. 8, 8A, 8B and 8C are views 800, 800A, 800B, 800C, respectively, of a still further configuration or example of T-Nuts made in accordance with the present invention with a frangible connection portion 48C. FIG. 8 shows a strip 66 of T-Nuts with a variation in the flange design and with attachment prongs 67 of different design than previously illustrated. Arrow 93C in FIG. 8 indicates the interconnection between adjacent T-Nuts. A frangible portion 48C in combination with carry tabs 96A, 96B join adjacent T-Nuts together enabling further processing. Carry tabs 96A, 96B and frangible portion 48C are used to join adjacent T-Nuts together and enable further processing of the T-Nuts and installation of the T-Nuts into a substrate. FIG. 8D is an enlargement 800D of the frangible portion 48C which illustrates the slot 90C in the upper portion of the frangible portion and vertical slots 91C, 91C on both sides of the frangible portion.

FIGS. 9, 9A, 9B and 9C are views 900, 900A, 900B, 900C, respectively, of yet another configuration or example of T-Nuts made in accordance with the present invention with a frangible connection portion 48D. FIG. 9 shows a strip of T-Nuts 68 with a still further flange head shape and a slightly different attachment prong 69 design. Arrow 93D in FIG. 9 indicates the interconnection between adjacent T-Nuts. A frangible portion 48D in combination with carry tabs 97A, 97B join adjacent T-Nuts together enabling further processing. Carry tabs 97A, 97B and frangible portion 48D are used to join adjacent T-Nuts together and enable further processing of the T-Nuts and installation of the T-Nuts into a substrate. FIG. 9D is an enlargement 900D of the frangible portion 48D which illustrates the slot 90D in the upper portion of the frangible portion and vertical slots 91D, 91D on both sides of the frangible portion.

FIGS. 10, 10A, 10B and 10C are views 1000, 1000A, 1000B, 1000C, respectively, of an additional configuration or example of T-Nuts made in accordance with the present invention with a frangible connection portion 48E. FIG. 10 illustrates another flange shape for a strip 70 of T-Nuts which have attachment prongs 71 similar to the ones previously shown. FIG. 10 also illustrates the variation in the frangible portion 48E which is used to connect adjacent T-Nuts together. Arrow 93E in FIG. 10 indicates the interconnection between adjacent T-Nuts. A frangible portion 48E in combination with carry tabs 98A, 98B join adjacent T-Nuts together enabling further processing. Carry tabs 98A, 98B and frangible portion 48E are used to join adjacent T-Nuts together and enable further processing of the T-Nuts and installation of the T-Nuts into a substrate. FIG. 10D is an enlargement 1000D of the frangible portion 48E. FIG. 10D illustrates the slot 90E in the upper portion of the frangible portion 48E and the vertical slots 91E, 91E on both sides of the frangible portion 48E.

FIGS. 11, 11A, 11B and 11C are views 1100, 1100A, 1100B, 1100C, respectively, of the final example of T-Nuts made in accordance with the present invention. FIG. 11 is a still further variation of a strip of T-Nuts 72 which are connected together by metal rails 73 by leaving a portion of the first and second portions of the metal strip intact or in place so that these thin or narrow portions are all that need be severed in putting the T-Nuts in place. Arrow 93F in FIG. 11 indicates the interconnection between adjacent T-Nuts. A frangible portion 48F in combination with carry tab 99A, 99B join adjacent T-Nuts together enabling further processing. Carry tabs 99A, 99B and frangible portion 48F are used to join adjacent T-Nuts together and enable further processing of the T-Nuts and installation of the T-Nuts into a substrate. FIG. 11D is an enlargement 1100D of the frangible portions 48F, 48F. FIG. 11 illustrates the slots 90F, 90F in the upper portion of the frangible portion 48E and the vertical slots 91F, 91F on both sides of the frangible portion.

FIGS. 14, 14A, 14B,14C, 14D, 14E and 14F are views 1400, 1400A, 1400B, 1400C, 1400D, 1400E, and 1400F, respectively, of a still further configuration or example of T-Nuts of the present invention with a frangible portion 148. The frangible portion 148 is a weakened connection which can be easily severed as illustrated in FIGS. 5D-5J. FIG. 14 shows a strip 74 of T-Nuts with a variation in the flange design 150 and with attachment prongs 169A, 169B, 169C, 169D of different design than previously illustrated. Arrow 93G in FIG. 14 indicates the interconnection between adjacent T-Nuts. Carry tabs 194A, 194B include a frangible portion 148. The frangible portion 148 in combination with carry tabs 194A, 194B join adjacent T-Nuts together enabling further processing. Carry tabs 194A, 194B and frangible portion 148 thereof are used to join adjacent T-Nuts together and enable further processing of the T-Nuts and installation of the T-Nuts into a substrate. Carry tabs 194A, 194B include the portion of the flange 150 proximate the frangible portion 148.

FIG. 14 is an isometric illustration 1400 of a length of the strip 74 of another example of collated T-Nuts slightly enlarged wherein the barrel 142 has a first diameter having a first circumference 142T and a second diameter having a second circumference 142B. FIG. 14A is a slightly enlarged top schematic view 1400A of the collated T-Nuts of FIG. 14 illustrating the frangible connection 148 between adjacent T-Nuts. FIG. 14B is a plan view 1400B of FIG. 14. Bores 152B through T-Nuts are illustrated well in FIGS. 14-14C. FIG. 14C is a cross-sectional view 1400C of FIG. 14B taken along the lines 14C-14C illustrating interior threads 1421 in the first diameter having a first circumference 142T. FIG. 14D is an end view 1400D of FIG. 14B taken along the lines 14D-14D.

FIG. 14E is a plan view 1400E similar to FIG. 14B with a frangible connection 148Z having a slight underside 48Z indentation. FIG. 14F is an enlargement 1400E of a portion of FIG. 14E illustrating frangible connection 148Z having a slight indentation 48Z. The indentation 48Z is sometimes a consequence of manufacturing the characteristics of the flange FIGS. 15, 15A, 15B, 15C, and 15D are views 1500, 1500A, 1500B, 1500C, and 1500D respectively, of a configuration or example of T-Nuts similar to those illustrated in FIG. 14. FIG. 15 is an isometric illustration 1500 of a length of the strip 74 of another example of collated T-Nuts slightly enlarged wherein the barrel 142 has a first diameter having a first circumference 142T and a second diameter having a second circumference 142B similar to FIG. 14, except with interior threads 1431 completely through the barrel 142. FIG. 15A is a slightly enlarged top schematic view 1500A of the collated T-Nuts of FIG. 15 illustrating the frangible connection 148 between adjacent T-Nuts. The frangible connection is a weakened portion which may be severed as illustrated in FIGS. 5D-5J. FIG. 15B is a plan view 1500B of FIG. 15. FIG. 15C is a cross-sectional view 1500C of FIG. 15B taken along the lines 15C-15C illustrating a fully threaded 1431 barrel 142. Bore 152B is illustrated well in FIGS. 15, 15A and 15C. FIG. 15D is an end view 1500D of FIG. 15B taken along the lines 15D-15D.

FIGS. 16, 16A, 16B,16C, and 16D are views 1600, 1600A, 1600B, 1600C, and 1600D respectively, of a configuration or example of T-Nuts similar to those illustrated in FIG. 14. FIG. 16 is an isometric illustration 1600 of a length of the strip 74 of another example of collated T-Nuts slightly enlarged wherein the barrel 142 has a first diameter having a first circumference 142T and a second diameter having a second circumference 142B similar to FIG. 14, except with interior threads 1441 residing in the portion of the barrel 142 having a second diameter having a second circumference 142B. FIG. 16A is a slightly enlarged top schematic view 1600A of the collated T-Nuts of FIG. 16 illustrating the frangible connection 148 between adjacent T-Nuts. The frangible connection or portion 148 is a weakened portion which may be easily severed as illustrated in FIGS. 5D-5J. FIG. 16B is a plan view 1600B of FIG. 16. FIG. 16C is a cross-sectional view 1600C of FIG. 16B taken along the lines 16C-16C illustrating interior threads 1441 in the second diameter having a second circumference 142B. FIG. 16D is an end view 1600D of FIG. 16B taken along the lines 16D-16D.

FIGS. 17, 17A, 17, 17C, and 17D are views 1700, 1700A, 1700B, 1700C, and 1700D, respectively, of a still further configuration or example of T-Nuts made in accordance with the present invention with a frangible portion 148. FIG. 17 shows a strip 76 of T-Nuts with a flange design 150 and with attachment prongs 169A, 169B, 169C, 169D of identical to those illustrated in FIG. 14. Arrow 93G in FIG. 17 indicates the interconnection between adjacent T-Nuts. Carry tabs 194A, 194B include a frangible portion 148. The frangible portion is a weakened portion which may be severed as illustrated in FIGS. 5D-5J. The frangible portion 148 in combination with carry tabs 194A, 194B join adjacent T-Nuts together enabling further processing. Carry tabs 194A, 194B and frangible portion 148 thereof are used to join adjacent T-Nuts together and enable further processing of the T-Nuts and installation of the T-Nuts into a substrate. Carry tabs 194A, 194B include the portion of the flange 150 proximate the frangible portion 148.

FIG. 17 is an isometric illustration 1700 of a length of the strip 76 of another example of collated T-Nuts slightly enlarged wherein the barrel 142 is cylindrically shaped 142S with interior threads 1451 in the upper portion of the bore 148B of the cylindrically shaped barrel 142S. FIG. 17A is a slightly enlarged top schematic view 1700A of the collated T-Nuts of FIG. 17 illustrating the frangible connection 148 between adjacent T-Nuts. FIG. 17B is a plan view 1700B of FIG. 17. FIG. 17C is a cross-sectional view 1700C of FIG. 17B taken along the lines 17C-17C illustrating interior threads 1451 in the upper portion of the bore 148B. FIG. 17D is an end view 1700D of FIG. 17B taken along the lines 17D-17D.

FIG. 18 is an isometric illustration 1800 of a length of the strip 76 of another example of collated T-Nuts slightly enlarged wherein the barrel 142 is cylindrically shaped 142S similar to FIG. 17, except with interior threads 146I completely through the bore 148B of the cylindrically shaped 142S barrel 148B. FIG. 18A is a slightly enlarged top schematic view 1800A of the collated T-Nuts of FIG. 18 illustrating the frangible connection 148 between adjacent T-Nuts. The frangible portion or connection 148 is easily severed as illustrated in FIGS. 5D-5J. FIG. 18B is a plan view 1800B of FIG. 18. FIG. 18C is a cross-sectional view 1800C of FIG. 18B taken along the lines 18C-18C illustrating interior threads 146i through the entire bore 148b of the cylindrically shaped 142S barrel 142. FIG. 18D is an end view 1800D of FIG. 18B taken along the lines 18D-18D.

FIG. 19 is an isometric illustration 1900 of a length of the strip 76 of another example of collated T-Nuts slightly enlarged wherein the barrel 142 is cylindrically shaped 142S with interior threads 1471 in the lower portion of the bore of the cylindrically shaped 142S barrel 142. FIG. 19A is a slightly enlarged top schematic view 1900A of the strip 76 of collated T-Nuts of FIG. 19 illustrating the frangible connection 148 between adjacent T-Nuts. FIG. 19B is a plan view 1900B of FIG. 19. FIG. 19C is a cross-sectional view 1900C of FIG. 19B taken along the lines 19C-19C illustrating interior threads in the lower portion of the bore. FIG. 19D is an end view 1900D of FIG. 19B taken along the lines 19D-19D.

Figure 12:
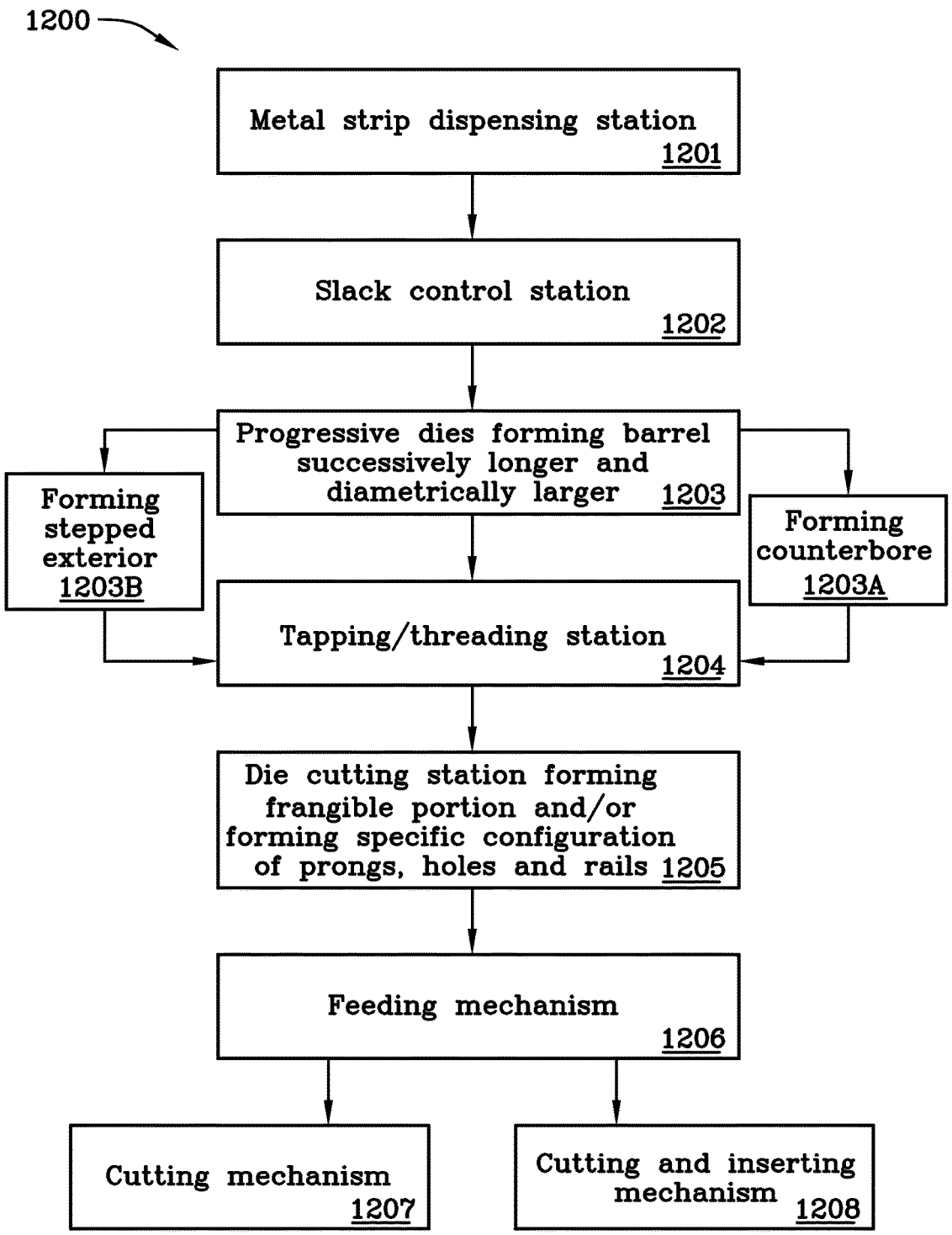
FIG. 12 is a block diagram of the processing of the metal strip.
Figure 13:
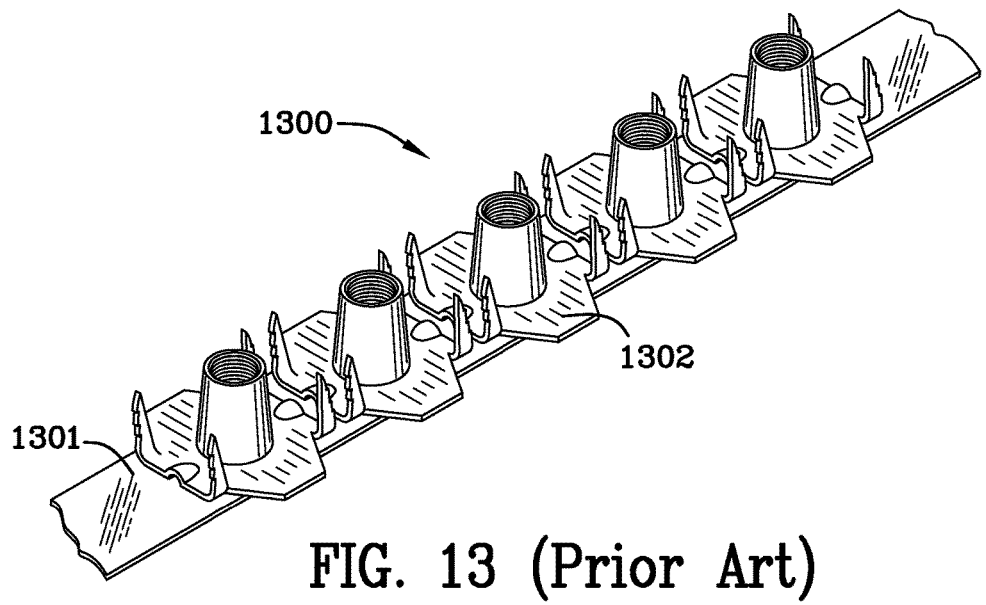
FIG. 13 illustrates a prior art backing strip securing individual T-Nuts thereto by means of adhesive as illustrated in U.S. Pat. No. 5,214,843.
Figure 13A:
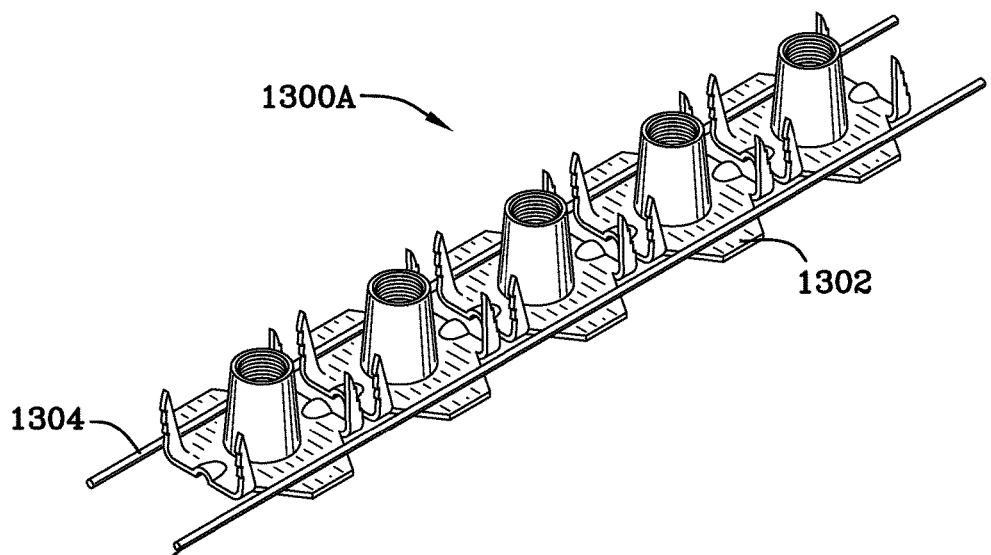
FIG. 13A illustrates a prior art device illustrated in U.S. Pat. No. 5,214,843 with wires welded to individual T-Nuts.

FIG. 12 is a block diagram 1200 of processing stations used to make the complete and finished metal strips 33, 62, 64, 66, 68. 70 and 72. The continuous metal strip dispensing station 1201 dispenses rolled steel or stainless steel which is dispensed to a slack control station 1202. The slack control station can be a weight which is slidably suspended from the unrolled steel intermediate the rolled/coiled station and the first progressive die of several progressive dies which form the barrel of the T-Nut successively longer and diametrically larger as the metal strip progresses through the dies. The progressive dies are described hereinabove. After the continuous metal strip has progressed through the last die forming station, a tapping/threading station 1204 forms interior threads in the barrel of the T-Nut. Alternatively, a step of forming a counterbore 1203A may be employed before tapping threads in the inner bore of the T-Nuts. Still alternatively, a stepped exterior 1203B may be formed before tapping threads in the inner bore of the T-Nuts. The remainder of the metal strip is then characterized after it leaves the tapping/threading station by a die cutting station 1205 which forms a frangible portion and/or forms specific configurations of the T-Nuts such as prongs, holes, welding bosses, slots and rails.

By specific configurations, it is meant the configuration as set forth in any of FIGS. 4, 6, 7, 8, 9, 10, 11, 14, 15, 16, 17, 18 and 19. FIG. 4A illustrates one example of the frangible portion 48 intermediate adjacent T-Nuts. The frangible portion 48 includes a slot or slit in the top portion 15 thereof. A feed mechanism 1206 includes the spring loaded advancement finger which positions the continuous metal strip of T-Nuts vertically and horizontally as desired. From the feed mechanism, the T-Nuts can be either cut using a cutting mechanism 1207 or a cutting and inserting mechanism 1208.

REFERENCE NUMERALS 100, 100A, 100B—illustrates a die press at a first die station in three successive positions in operating on a strip of metal in performing the method of the present invention.
100C—isometric illustration of the end of the strip of metal as it leaves the press illustrated in FIG. 1B.
100D—illustrates a die press at a second die station as operating on the strip of metal after it has left the position of FIG. 1B in the condition of FIG. 1C.
100E—isometric illustration of the end of the strip of metal as operated on in the press of FIG. 1D.
100E—illustrates a die press at a third die station as operating on the strip of metal after it has left the position of FIG. 1D in the condition of FIG. 1E.
100G—isometric illustration of the end of the strip of metal as operated on in the press of FIG. 1F.
100H—illustrates a die press at a fourth die station as operating on the strip of metal after it has left the position of FIG. 1F in the condition of FIG. 1G.
100I—isometric illustration of the end of the strip of metal as operated on in the press of FIG. 1H.

10—strip of deformable metal material
12—first side portion of 10
13—second side portion of 10
15—top portion of 10
16—bottom portion of 10
18—first die station
18A—die members of 18
19—second die station
19A—die members at 19
20—third die station
20A—die members at 20 (FIG. 1F)
21—fourth die station
21A—die members at 21 (FIG. 1H)
22—cylindrical shape at 18 (FIG. 1B)
22A—cylindrical shape at 19 (FIG. 1D)
22B—cylindrical shape at 20 (FIG. 1F)
22C—cylindrical shape at 21 (FIG. 1H)
24—fifth die station
25—sixth die station
25A—die
28—taps
33—strip of finished and completed T-Nuts ready for use/insertion
34—press
35—upper platform
36—lower platform
37—spring
38—spring
39—upper run
40—lower run
42—cylinder
44—threads
46—attachment prongs
48, 48A, 48B, 48C, 48D, 48E, 48F—frangible portions of strip between carry tabs of adjacent T-Nuts
50—flange
52—shearing station
53—positioning abutment
54—advancement finger
55—shearing blade assembly
56—blade
57—guide cylinder
58—springs
59—shearing ram
60—guide finger
61, 61A—openings in the substrate
62, 64, 66, 68, 70, 72, 74, 76—strips of finished and completed collated T-Nuts ready for use/insertion
63—holes in flanges
65—skives
67, 69, 71—prongs
73—rails
74E—endmost T-Nut of collated T-Nut strip 74, FIG. 14, FIGS. 5F and 5G
81—arrow indicating movement into engagement with positioning abutment
82—arrow indicating upward movement of continuous strip of T-Nuts
83—arrow indicating movement of substrate 89 leftwardly
89—substrate
90—top slot or slit of frangible portion 48, FIG. 4E
90A—top slot or slit of frangible portion 48A, FIG. 6D
90B—top slot or slit of frangible portion 48B, FIG. 7D
90C—top slot or slit of frangible portion 48C, FIG. 8D
90D—top slot or slit of frangible portion 48D, FIG. 9D
90E—top slot or slit of frangible portion 48E, FIG. 10D
90E—top slot or slit of frangible portion 48F of FIG. 11D
91—vertical slot or slit of frangible portion 48, FIG. 4E
91A—vertical slot or slit of frangible portion 48A, FIG. 6D
91B—vertical slot or slit of frangible portion 48B, FIG. 7D
91C—vertical slot or slit of frangible portion 48C, FIG. 8D
91D—vertical slot or slit of frangible portion 48D, FIG. 9D
91E—vertical slot or slit of frangible portion 48E, FIG. 10D
91F—vertical slot or slit of frangible portion 48F, FIG. 11D
92A, 92B—carry tabs joined together by frangible portion 48, FIG. 4
93—arrow indicating carry tabs 92A, 92B, FIG. 4
93A—arrow indicating carry tabs 94A, 94B, FIG. 6
93B—arrow indicating carry tabs 95A, 95B, FIG. 7
93C—arrow indicating carry tabs 96A, 96B, FIG. 8
93D—arrow indicating carry tabs 97A, 97B, FIG. 9
93E—arrow indicating carry tabs 98A, 98B, FIG. 10
93F—arrow indicating carry tabs 99A, 99B, FIG. 11
93G—arrow indicating carry tabs 194A, 194B
94A, 94B—carry tabs joined by frangible portion 48A, FIG. 6
95A, 95B—carry tabs joined by frangible portion 48B, FIG. 7
96A, 96B—carry tabs joined by frangible portion 48C, FIG. 8
97A, 97B—carry tabs joined by frangible portion 48D, FIG. 9
98A, 98B—carry tabs joined by frangible portion 48E, FIG. 10
99A, 99B—carry tabs joined by frangible portion 48F, FIG. 11
142—barrel of T-Nut
142B—bottom of barrel
142S—cylindrical barrel, FIGS. 17-19
142T—top of barrel
142I—threads in first end 142T of bore 152B, FIG. 14
143I—threads in second end 142B of bore 152B, FIG. 15
144I—threads in second end 142B of bore 152B, FIG. 16
145I—threads in upper portion of bore 148B
146I—threads completely through bore 148B
147I—threads in lower portion of bore 148B
148—frangible connection, FIGS. 14 through 19
148B—bore in T-Nut, FIGS. 17-19
152B—bore in T-Nut, FIGS. 14-16
169A, 169B, 169C, 169D—prongs (pawls), FIGS. 14-19
194A, 194B—carry tabs joined by frangible portion 48G, FIGS. 14, 15 and 16
200, 200A, 200B—illustrate a fifth die station at which the cylindrical members produced at the previous stations are tapped and provided with threads.
200C—an isometric illustration of the end of the strip of metal as operated on at the fifth die station of FIG. 2B.
300, 300A, 300B—illustrates a sixth station at which the strip of metal between the formed cylindrical members is die cut to produce the heads on the T-Nuts and produce various flange features such as attachment prongs as shown in FIG. 3B.
300C—an isometric illustration of the end of the strip of metal as operated on at the sixth die station of FIG. 3B.
400—an isometric illustration similar to FIG. 3B showing a slightly longer length of the connected and formed T-Nuts and slightly enlarged for detail.
400A—an enlarged portion of FIG. 4 illustrating the connection between adjacent T-Nuts and the location at which they will be severed at about their ultimate location of use.
400B—a plan view of FIG. 4.
400C—an elevational view of FIG. 4B.
400D—an end view of FIG. 4C.

500—a view illustrating the length of integrally connected T-Nuts as shown in FIGS. 4 through 4D as wound into a helical configuration for ease in shipping and/or manufacturing.

500A—a view of the T-Nuts shown in FIG. 5 in connection with apparatus to sever the endmost T-Nut from its strip and in position to be installed in a substrate.

500B—a view of the apparatus of FIG. 5A severing the endmost T-Nut from its strip and placing it in an aperture in a substrate.

500C—a view of the apparatus of FIG. 5B moved back in position to install another T-Nut from the end of the strip into another aperture in a substrate.

500D—a schematic side view of a strip of collated T-Nuts in combination with another example of an apparatus (an escapement) to sever the endmost T-Nut from its strip.

500E—a schematic top view of a strip of collated T-Nuts in combination with another example of an apparatus (an escapement) to sever the endmost T-Nut from its strip.

500F—a schematic cross-sectional view of a strip of collated T-Nuts in combination with another example of an apparatus (an escapement) to sever the endmost T-Nut from its strip taken along the lines 5F-5F of FIG. 5D illustrating the piston and the tool for advancing the strip, and, illustrating the endmost T-Nut in the chamber for separation from the strip.

500G—a schematic cross-sectional view of a strip of collated T-Nuts in combination with another example of an apparatus (an escapement) to sever the endmost T-Nut from its strip taken along the lines of 5G-5G of FIG. 5E illustrating the endmost T-Nut in the chamber for separation from the strip and the shearing inbody and guide aligned with the endmost T-Nut.

500H—a schematic cross-sectional view of a strip of collated T-Nuts in combination with another example of an apparatus (an escapement) to sever the endmost T-Nut from its strip illustrating the hinged bottom plate of the escapement rotated downwardly enabling the frangible connection of the endmost T-Nut in the chamber for separation from the strip.

500I—a schematic cross-sectional view of a strip of collated T-Nuts in combination with another example of an apparatus (an escapement) to sever the endmost T-Nut from its strip illustrating the hinged bottom plate of the escapement returned to its home position supporting the strip of collated T-Nuts.

500J—a schematic cross-sectional view of a strip of collated T-Nuts in combination with another example of an apparatus (an escapement) to sever the endmost T-Nut from its strip illustrating the shearing inbody pushing and inserting the endmost T-Nut into a substrate.

501—shearing ram inbody which shears the endmost T-nut from the strip of integrally connected T-Nuts 501G—guide of inbody 501

502—upper portion of the escapement 599

502N—nut of stud holding upper portion of the escapement to side walls 503

503, 503A—side wall of escapement 599

504, 504A—nut of pivot 504P

504P—pivot of hinged bottom 550 of escapement 599

505—upper pin for elastic band 513

506—lower pin located lower portion 507 of the hinged bottom 550 for elastic band 507—lower portion of the hinged bottom 550

508—cutting blade

508C—cutting surface of cutting blade 508

509—bolt for affixing the cutting blade to plate 510 of the escapement

510—plate of the escapement/cutting chamber 511, 511A—plate of the escapement/cutting chamber 512—plate of the escapement/cutting chamber 513—elastic band 520P—passageway for strip 74 within escapement 599

530—double acting piston

530N—pivot nut for piston 530

530T—gripping tool advancing strip 74 of T-Nuts 530P, 530Q—pneumatic connections to cylinder 530

530R—rod of tool 530T which engages side wall 503

531—open slot in side wall 503 for permitting access of gripping tool 530T to pawls of T-Nuts on strip 74

531S—guiding surface gripping tool 530T of side wall 503

532—open slot in side wall 503A for permitting access of gripping tool 530T to pawls of T-Nuts on strip 74

540, 541—surfaces on T-Nut engaged by surfaces 540R, 541R of gripping tool 530T 540R, 541R—gripping surfaces of tool 530T 550—hinged bottom of escapement 558—opening in substrate 560

560—substrate 558

597—core of coil, FIG. 5K

598—rolled coil of strip 74 of T-Nuts, FIG. 5K

599—escapement 600, 600A, 600B, 600C, 600D—another configuration/example of a strip of T-Nuts 700, 700A, 700B, 700C, 700D—views of a further configuration/example of a strip of T-Nuts 800, 800A, 800B, 800C, 800D—views of a still further configuration/example of a strip of T-Nuts 900, 900A, 900B, 900C, 900D—views of yet another configuration/example of a strip of T-Nuts 1000, 1000A, 1000B, 1000C, 1000D—views of an additional configuration/example of a strip of T-Nuts 1100, 1100A, 1100B, 1100C, 1100D—views of another example of a strip of T-Nuts.

1200—block diagram of processing stations

1201—metal strip dispensing station

1202—slack control station

1203—progressive dies forming barrel successively longer and diametrically larger 1203A—forming counterbore 1203B—forming stepped exterior 1203B 1204—tapping/threading station 1205—die cutting station forming frangible portion and/or forming specific configuration of prongs, holes and rails 1206—feeding mechanism 1207—cutting mechanism 1208—cutting and inserting mechanism 1300—prior art backing strip 1201 securing individual T-Nuts 1202 thereto by means of adhesive 1300A—a prior art device illustrated in U.S. Pat. No. 5,214,843 with wires 1304, 1305 welded to individual T-Nuts 1302.

1301—backing strip

1302—T-Nut 1304, 1305—wires 1400, 1400A, 1400B, 1400C, 1400D, 1400E—views of another example of a strip T-Nuts of having a stepped exterior diameters with a partially threaded bore at a first end portion of each of the T-Nuts 1500, 1500A, 1500B, 1500C, 1500D—views of another example of a strip of T-Nuts having a stepped exterior diameters with a fully threaded bore 1600, 1600A, 1600B, 1600C, 1600D—views of another example of a strip of T-Nuts having a stepped exterior diameters with a partially threaded bore at a second end portion of each of the T-Nuts 1700, 1700A, 1700B, 1700C, 1700D—views of another example of a strip of T-Nuts having a cylindrical barrel with a partially threaded bore in an upper portion of each of the T-Nuts 1800, 1800A, 1800B, 1800C, 1800D—views of another example of a strip of T-Nuts having a cylindrical barrel with a fully threaded bore 1900, 1900A, 1900B, 1900C, 1900D-1700D—views of another example of a strip of T-Nuts having a cylindrical barrel with a partially threaded bore in an lower portion of each of the T-Nuts F—force applied by a spring to tension piston 530 and gripping tool 530T The invention has been set forth by way of example only and those skilled in the art will readily recognize that changes to the examples may be made without departing from the spirit and the scope of the appended claims.

We claim:

1. The method of making T-Nuts from a continuous length of deformable metal material, comprising the steps of:
    selecting a continuous length of deformable metal material which is generally flat in configuration and which has first and second side portions and top and bottom portions;
    dispensing, using a dispensing station, said selected length of deformable metal material, said deformable metal material is rolled steel or stainless steel, to a slack control station;
    introducing said deformable metal material progressively into successive die stations successively forming said T-Nuts;
    forming, using a die station, spaced and generally hollow cylindrical configurations having a diameter and axial length on a metal surface of said deformable metal material;
    repeating said step of forming, using a successive die station, spaced and generally hollow cylindrical configurations having a greater diameter and greater axial length on said metal surfaces of said deformable metal material;
    moving said generally hollow cylindrical configurations to another station whereat a counterbore is formed in interior portions of said generally hollow cylindrical configurations and then interior threads are tapped/threaded on said interior portions of said generally hollow cylindrical configurations;
    moving said threaded generally cylindrical configurations progressively to a still further station wherein heads are formed for said T-Nuts in the nature of flanges which define a perimeter of said heads; forming centrally located carry tabs, said centrally located carry tabs include frangible connections between adjacent T-Nuts for ease in separation of said T-Nuts, each of said frangible connections of said carry tabs include a slit therein, and, said centrally located carry tabs affix said adjacent T-Nuts together;
    feeding, using a feeding mechanism, said feeding mechanism includes a spring loaded advancement finger which positions said T-Nuts vertically and horizontally, to a cutting mechanism; and,
    separating and cutting said T-Nuts fed from said feed mechanism.

2. The method of making T-Nuts from a continuous length of deformable metal material, as claimed in claim 1, further comprising the steps of:
    forming a stepped exterior before tapping threads in a barrel portion of said T-Nuts.

3. The method of making T-Nuts from a continuous length of deformable metal material, as claimed in claim 1, further comprising the step of:
    after the step of forming centrally located carry tabs, arranging said T-Nuts into a tight helical configuration for subsequent feeding.

4. The method of making T-Nuts from a continuous length of deformable metal material, as claimed in claim 1, further comprising the step of:
    after forming said centrally located carry tabs, forming a first and second pawl extending from said flange of each said T-Nut forming a first pair of pawls;
    after forming said centrally located carry tabs, forming a third and fourth pawl extending from said flange of each of said T-Nut forming a second pair of pawls;
    said first and second pairs of pawls oriented opposite each other;
    and, said carry tabs oriented opposite each other and at 90° with respect to said first and second pairs of pawls.

5. The method of making T-Nuts from a continuous length of deformable metal material, as claimed in claim 1, wherein each of said frangible connections is rectangular in cross-section.

6. The method of making T-Nuts from a continuous length of deformable metal material, as claimed in claim 5, wherein each of said frangible connections is a weakened portion.

7. The method of making T-Nuts from a continuous length of deformable metal material, as claimed in claim 1, wherein each of said frangible connections is a weakened portion.

8. The method of making T-Nuts from a continuous length of deformable metal material, comprising the steps of:
    selecting a continuous length of deformable metal material which is generally flat in configuration and which has first and second side portions and top and bottom portions;
    dispensing, using a dispensing station, said selected length of deformable metal material, said deformable metal material is rolled steel or stainless steel, to a slack control station;
    introducing said deformable metal material progressively into successive die stations which act to successively form spaced and generally hollow cylindrical configurations on said metal surface of said metal material of successively greater diameter and axial length;
    moving said generally hollow cylindrical configurations successively to another station whereat threads are formed on interior portions of said generally hollow cylindrical configurations;
    moving said threaded generally cylindrical configurations progressively to a still further station wherein rails are formed and wherein heads are formed for said T-Nuts in the nature of flanges which define a perimeter of said heads;
    forming a first and second pawl extending from said flange of each said T-Nut forming a first pair of pawls;
    forming a third and fourth pawl extending from said flange of each said T-Nut forming a second pawls;
    forming carry tabs, said carry tabs include frangible connections between said first pair of pawls of one T-Nut and said second pair of pawls of an adjacent T-Nut and said carry tabs include frangible connections between said flanges and said rails, each of said frangible connections of said carry tabs include a slit therein;

feeding, using a feeding mechanism which positions said T-Nuts vertically and horizontally, to a cutting mechanism; and, separating and cutting said T-Nuts from said feed mechanism.

9. The method of making T-Nuts from a continuous length of deformable metal material as claimed in claim 8 wherein said threads extend completely through said interior portions of said generally hollow cylindrical configuration.

10. The method of making T-Nuts from a continuous length of deformable metal material as claimed in claim 8 wherein said threads extend partially through said interior portions of said generally hollow cylindrical configuration.

11. The method of making T-Nuts from a continuous length of deformable metal material, comprising the steps of:

selecting a continuous length of deformable metal material which is generally flat in configuration and which has first and second side portions and top and bottom portions;

dispensing, using a dispensing station, said selected length of deformable metal material, said deformable metal material is rolled steel or stainless steel, to a slack control station;

introducing said deformable metal material progressively into successive die stations which act to successively form spaced and generally hollow cylindrical configurations on said metal surface of said metal material of successively greater diameter and axial length, each of said generally hollow cylindrical configurations includes a bore therethrough, and said generally hollow cylindrical formations of said T-Nuts defining barrels;

moving said threaded generally hollow cylindrical configurations progressively to a still further station wherein heads are formed for said T-Nuts in the nature of flanges which define a perimeter of said heads;

forming centrally located carry tabs, said centrally located carry tabs include frangible connections between adjacent T-Nuts for ease in separation of said T-Nuts, each of said frangible connections of said carry tabs include a slit therein, and, said centrally located carry tabs affix said adjacent T-Nuts together;

moving said generally cylindrical configurations to another station whereat a counterbore is formed in the bore of the T-Nuts and then interior threads are tapped/threaded in said bores therethrough;

feeding, using a feeding mechanism, said feeding mechanism includes a spring loaded advancement finger which positions said T-Nuts vertically and horizontally, to a cutting mechanism; and, separating and cutting said T-Nuts from said feed mechanism.

12. The method of making T-Nuts from a continuous length of deformable metal material, as claimed in claim 11, further comprising the steps of:

forming a stepped exterior before tapping threads in said bores of said T-Nuts.

13. The method of making T-Nuts from a continuous length of deformable metal material, as claimed in claim 11, further comprising the step of:

after the step of forming centrally located carry tabs, arranging said T-Nuts into a tight helical configuration for subsequent feeding.

14. The method of making T-Nuts from a continuous length of deformable metal material, as claimed in claim 11, further comprising the step of:

after forming said centrally located carry tabs, forming a first and second pawl extending from said flange of each said T-Nut forming a first pair of pawls;

after forming said centrally located carry tabs, forming a third and fourth pawl extending from said flange of each of said T-Nut forming a second pair of pawls;

said first and second pairs of pawls oriented opposite each other;

and, said carry tabs oriented opposite each other and at 90° with respect to said first and second pairs of pawls.

15. The method of making T-Nuts from a continuous length of deformable metal material, as claimed in claim 11, wherein each of said frangible connections is rectangular in cross-section.

* * * * *